(12) United States Patent
Devos

(10) Patent No.: US 12,203,275 B1
(45) Date of Patent: Jan. 21, 2025

(54) FLOOR BOARD AND METHOD FOR MANUFACTURING SUCH FLOOR BOARDS

(71) Applicant: i4F Licensing NV, Turnhout (BE)

(72) Inventor: Pieter Renaat Karel Devos, Koolskamp (BE)

(73) Assignee: i4F Licensing NV, Turnhout (BE)

( * ) Notice: Subject to any disclaimer, the term of this patent is extended or adjusted under 35 U.S.C. 154(b) by 0 days.

(21) Appl. No.: 18/618,343

(22) Filed: Mar. 27, 2024

(30) Foreign Application Priority Data

Dec. 28, 2023 (NL) ...................... 2036706

(51) Int. Cl.
*E04F 15/00* (2006.01)
*B32B 3/06* (2006.01)
(Continued)

(52) U.S. Cl.
CPC .......... *E04F 15/02038* (2013.01); *B32B 3/06* (2013.01); *B32B 3/30* (2013.01); *B32B 7/02* (2013.01); *B32B 21/02* (2013.01); *B32B 21/04* (2013.01); *E04F 15/02016* (2013.01); *E04F 15/107* (2013.01); *B32B 2307/7265* (2013.01); *B32B 2307/7376* (2023.05); *B32B 2419/04* (2013.01); *E04F 2201/0146* (2013.01); *E04F 2201/0161* (2013.01); *E04F 2201/023* (2013.01); *E04F 2201/042* (2013.01); *E04F 2201/043* (2013.01); *E04F 2201/044* (2013.01); *E04F 2201/0535* (2013.01)

(58) Field of Classification Search
CPC .......... E04F 15/02033; E04F 15/02038; E04F 15/02016; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/0161; E04F 2201/043; E04F 2201/0547; E04F 2201/0153; E04F 2201/0138; E04F 2201/044; B32B 3/06; B32B 3/30; B32B 7/02; B32B 21/04; B32B 2307/7376; B32B 2307/7265; B32B 2419/04
See application file for complete search history.

(56) References Cited

U.S. PATENT DOCUMENTS 9,151,062 B2 * 10/2015 Cappelle ................. E04F 15/02
9,695,600 B2 * 7/2017 Vandevoorde .......... B32B 29/06
(Continued)

FOREIGN PATENT DOCUMENTS

DE         9202976 U1    5/1992
EP         1441086 A1    7/2004
(Continued)

*Primary Examiner* — Chi Q Nguyen
(74) *Attorney, Agent, or Firm* — The Webb Law Firm

(57) ABSTRACT

A floor board including a decorative surface layer applied to a substrate, where the substrate is optionally MDF or HDF material at a side edge thereof, and at least one side edge together with a side edge opposite thereto forming a first pair of opposite side edges of said substrate. The first pair of opposite side edges includes mechanical first and second coupling parts, respectively, allowing the floor board to be coupled at the respective side edges with a similar floor board. Also, a floor board covering consisting of a plurality of the floor boards and a method for manufacturing such floor boards.

23 Claims, 13 Drawing Sheets

(51) Int. Cl.
  *B32B 3/30*      (2006.01)
  *B32B 7/02*      (2019.01)
  *B32B 21/02*     (2006.01)
  *B32B 21/04*     (2006.01)
  *E04F 15/02*     (2006.01)
  *E04F 15/10*     (2006.01)

(56) References Cited

U.S. PATENT DOCUMENTS

| | | | |
|---|---|---|---|
| 9,803,374 B2* | 10/2017 | Pervan | E04F 15/107 |
| 9,970,198 B2* | 5/2018 | Thiers | B44C 5/04 |
| 10,041,259 B2* | 8/2018 | Meersseman | B32B 27/08 |
| 10,190,323 B2* | 1/2019 | Meersseman | E04F 13/18 |
| 10,428,534 B2* | 10/2019 | Cappelle | E04F 15/02194 |
| 10,472,833 B2* | 11/2019 | Loncke | B32B 21/02 |
| 10,988,939 B2* | 4/2021 | Van Vlassenrode | B29C 70/08 |
| 2012/0266555 A1* | 10/2012 | Cappelle | E04F 15/02194 |
| | | | 52/309.1 |
| 2019/0032342 A1* | 1/2019 | Segaert | B32B 27/302 |
| 2019/0071879 A1* | 3/2019 | Thiers | E04F 15/02 |
| 2019/0153734 A1* | 5/2019 | Van Vlassenrode | B32B 3/06 |
| 2022/0154747 A1 | 5/2022 | Caselli et al. | |

FOREIGN PATENT DOCUMENTS

| | | |
|---|---|---|
| IT | PR20130057 A1 | 1/2015 |
| WO | 9747834 A1 | 12/1997 |

* cited by examiner

FLOOR BOARD AND METHOD FOR MANUFACTURING SUCH FLOOR BOARDS

CROSS-REFERENCE TO RELATED APPLICATION

This application claims priority to The Netherlands Patent Application No. 2036706 filed Dec. 28, 2023, the disclosure of which is hereby incorporated by reference in its entirety.

BACKGROUND OF THE INVENTION

Field of the Invention

This invention relates to decorative boards, such as floor boards or floor panels, and to a method for manufacturing such decorative boards, such as floor boards. More particularly, the invention relates to floor boards of the type which comprises a single- or multi-part substrate consisting at least partially of wood-based material, in particular of MDF or HDF (Medium Density Fiberboard or High Density Fiberboard), and which floor panels have a decorative surface layers as a top layer, such as prefabricated parquet or veneer parquet with a top layer usually being made on the basis of wood, or such as laminate floor panels usually having a top layer on the basis of synthetic material.

Description of Related Art

It is known that such floor boards can be applied for forming a floating floor covering. Herein, these floor boards during installation are coupled at their side edges, either by means of a classical tongue and groove connection, wherein these latter possibly are glued into each other, or by means of mechanical coupling parts providing for a mutual locking of the floor panels, for example, in horizontal as well as in vertical direction.

To this end, WO 97/47834, in particular from the form of embodiment represented in FIG. 23 of this document, discloses a floor board comprising a substrate and decorative surface layer, wherein the substrate, at least at two opposite edges, is provided with coupling parts allowing that several of such floor boards can be coupled to each other, whereby these floor boards, in coupled condition of two of such floor panels, provide in a locking in a first direction perpendicular to the plane of the floor panels, as well as in a second direction perpendicular to the respective edges and parallel to the plane of the floor panels, whereby said coupling parts comprise a tongue and a groove, whereby the groove is situated between an upper lip and a lower lip, whereby the lower lip extends beyond the upper lip, and whereby the coupling parts also comprise locking portions effecting a locking in said second direction and being formed at least by contact portions, which, in the coupled condition of two of such floor boards, can cooperate with each other, whereby one of these contact portions is situated in the upper side of the lower lip, in such a manner that this contact portion is located at least partially beyond the upper lip, and whereby both said contact portions are situated such that the floor panels, in coupled condition, are laterally forced towards each other with a tension force. By means of said tension force, also called "pretension", it is obtained that such floor panels, in coupled condition, adjoin each other at their visible upper side and that, when the floor panels, for which reasons whatsoever, are forced apart from each other, there will be a counteracting force for forcing the floor boards back towards each other.

The coupling parts can, however, not be integrated in ceramic tiles, stone tiles, and/or other rigid tiles. To this end, it is known to glue ceramic tiles onto a substrate, wherein the substrate is provided with coupling parts, such as shown in FIG. 23 of WO 97/47834. However, the application of these so-called 'angling in' coupling parts lead to installation difficulties as the relatively thick decorative tiles on top of the substrate hinders the angling-in coupling process. To solve this problem it is chosen to reduce the size of the tiles to be glued on top of the substrate, which results in wider grout lines formed in between ceramic tiles of interconnected floor boards. However, this solution is considered less attractive by consumers.

SUMMARY OF THE INVENTION

It is a first objective of the invention to provide an interconnectable floor board with a decorative tile on top which allows both easy installation and the formation of relatively narrow grout lines.

It is a second objective of the invention to provide a wood-based, in particular MDF or HDF based, decorative board, in particular floor board, having improved waterproof properties.

It is a third objective of the invention to provide an improved decorative board, in particular floor board, comprising a substrate of MDF or HDF, and aiming at minimizing the effects of moisture on said decorative board.

It is a fourth objective of the invention to provide an improved method of manufacturing of a wood-based, in particular MDF or HDF based, decorative board, in particular floor board, having improved waterproof properties.

It is a fifth objective of the invention to provide an improved decorative board, in particular floor board, counteracting the risk of the occurrence of creaking noises.

At least one of these objectives can be achieved by providing a floor board, comprising:

- a substrate having side edges and optionally a decorative surface layer applied to said substrate,
- at least one side edge together with a side edge opposite thereto forming a first pair of opposite side edges of said substrate; wherein said first pair of opposite side edges optionally comprises mechanical first and second coupling parts, respectively, allowing to couple said floor board at the respective side edges with a similar floor board, preferably by means of an angling down motion, such that, in a coupled condition, said floor board and a further floor board become locked both in a vertical direction perpendicular to a board plane defined by the intercoupled floor boards, as well as in a horizontal direction parallel to said board plane,
- wherein said optional first coupling part comprises a sideward tongue, wherein said sideward tongue comprises a front section, a rear section, and a middle section situated in between said front section and said rear section,
  - wherein, preferably, a bottom surface and/or a side surface of said front section of said sideward tongue is at least partially curved, wherein said bottom surface of said front section defines a front downward tongue contact portion,
  - wherein, preferably, a top surface of the front section of said sideward tongue is at least partially inclined downwardly in a direction away from the middle section and rear section, wherein said top surface of said front section, preferably, defines a front upward tongue contact portion, wherein, preferably, a bottom surface of said middle section of said sideward tongue defines a middle lower contact portion situated in between adjacent inactive portions of the middle section of the sideward tongue, wherein, preferably, a bottom surface and/or a side surface of said rear section of said sideward tongue is at least partially upwardly inclined in a direction away from the middle section and front section, wherein said inclined part of said bottom surface and/or said side surface of said rear section preferably defines a rear downward tongue contact portion, wherein, preferably, said rear section is configured to accommodate an upwardly protruding locking element of a second coupling part of a further floor board, wherein said optional second coupling part comprises a recess for accommodating at least a part of the sideward tongue of a further floor board, said recess being defined by an upper lip and a lower lip, wherein the lower lip extends beyond the upper lip, wherein said lower lip preferably comprises a front section, a rear section, and a middle section situated in between said front section and said rear section, wherein said upper lip is located above and connects to the front section of the lower lip, and wherein the lower lip being provided with a upwardly protruding locking element being located in the rear section of the lower lip, wherein, preferably, a bottom surface and/or a side surface of said front section of said lower lip is at least partially curved, wherein said bottom surface of said front section of said lower lip defines a front upward lip contact portion, wherein, preferably, a bottom surface of the upper lip is at least partially inclined downwardly in a direction away from the middle section and rear section of the lower lip, wherein said bottom surface of said front section preferably defines a front downward lip contact portion, wherein, preferably, a top surface of said middle section of said lower lip defines a middle upward lip contact portion situated in between adjacent inactive portions of the middle section of the lower lip, wherein, preferably, a top surface and/or a side surface of said rear section of said lower lip is at least partially upwardly inclined in a direction away from the middle section and front section of said lower lip, wherein said inclined part of said top surface and/or said side surface of said rear section preferably defines a rear upward lip contact portion, and wherein, preferably, said top surface and/or said side surface of said rear section of said lower lip partially defines said upwardly protruding locking element, wherein, in coupled condition of adjacent floor boards, the sideward tongue and lower lip optionally define at least three mutually spaced lower contact zones, wherein:

a front lower contact zone is defined by the co-action between the front downward tongue contact portion of said floor board and the front upward lip contact portion of another floor board, a middle lower contact zone is defined by the co-action between the middle downward tongue contact portion of said floor board and the middle upward lip contact portion of another floor board, and a rear lower contact zone is defined by the co-action between the rear downward tongue contact portion of said floor board and the rear upward lip contact portion of another floor board, and wherein, in coupled condition of adjacent floor boards, the sideward tongue and upper lip optionally define at least two mutually spaced upper contact zones, wherein:

a first upper contact zone is preferably defined by the co-action between the front upward tongue contact portion of said floor board and the front downward lip contact portion of another floor board, second upper contact zone is preferably defined by the co-action of a top side surface of the first coupling part of said floor board, and a side surface of the upper lip, located above the front downward lip contact portion, of another floor board, wherein decorative surface layer is preferably substantially rigid, wherein the thickness of the decorative surface layer is preferably at least 4 mm, and wherein the height of a side surface of the upper lip and/or the height of the upper lip at its distal end is preferably smaller than 1 mm.

The invention further relates to a method for manufacturing a floor board according to the invention, comprising the steps of:

A. providing a substrate, wherein the substrate optionally comprises MDF and/or HDF material and/or wood, B. affixing, directly or indirectly a decorative surface layer on top of said substrate, wherein said decorative surface optionally comprises a plurality of sublayers;

C. optionally profiling at least a first substrate edge and a second substrate edge to form a first coupling part and a second coupling part, respectively, D, wherein at least one edge, preferably at least one side edge, of the substrate is treated with at least one water barrier agent, wherein said water barrier agent is preferably water impermeable and/or moisture-repellent, and/or wherein at least a part of at least one edge, preferably at least one side edge, of the substrate is subjected to a thermal searing or ironing step to sear said edge at least partially.

The invention also relates to a floor board covering consisting of a plurality of, preferably interconnected, floor boards according to the invention.

Various embodiments of the method have been described above and will be described below.

Further embodiments of the invention are described in the non-limitative clauses presented below.

1. A floor board, comprising:

a substrate having side edges and, optionally, a decorative surface layer applied to said substrate, at least one side edge together with a side edge opposite thereto forming a first pair of opposite side edges of said substrate; wherein said first pair of opposite side edges optionally comprises mechanical first and second coupling parts, respectively, allowing to couple said floor board at the respective side edges with a similar floor board, preferably by means of an angling down motion, such that, in a coupled condition, said floor board and a further floor board become locked both in a vertical direction perpendicular to a board plane defined by the intercoupled floor boards, as well as in a horizontal direction parallel to said board plane, wherein said optional first coupling part comprises a sideward tongue, wherein said sideward tongue comprises a front section, a rear section, and a middle section situated in between said front section and said rear section, wherein a bottom surface and/or a side surface of said front section of said sideward tongue is at least partially curved, wherein said bottom surface of said front section defines a front downward tongue contact portion, wherein a top surface of the front section of said sideward tongue is at least partially inclined downwardly in a direction away from the middle section and rear section, wherein said top surface of said front section defines a front upward tongue contact portion, wherein a bottom surface of said middle section of said sideward tongue defines a middle lower contact portion situated in between adjacent inactive portions of the middle section of the sideward tongue, wherein a bottom surface and/or a side surface of said rear section of said sideward tongue is at least partially upwardly inclined in a direction away from the middle section and front section, wherein said inclined part of said bottom surface and/or said side surface of said rear section defines a rear downward tongue contact portion, wherein said rear section is configured to accommodate an upwardly protruding locking element of a second coupling part of a further floor board, wherein said optional second coupling part comprises a recess for accommodating at least a part of the sideward tongue of a further floor board, said recess being defined by an upper lip and a lower lip, wherein the lower lip extends beyond the upper lip, wherein said lower lip comprises a front section, a rear section, and a middle section situated in between said front section and said rear section, wherein said upper lip is located above and connects to the front section of the lower lip, and wherein the lower lip being provided with a upwardly protruding locking element being located in the rear section of the lower lip, wherein a bottom surface and/or a side surface of said front section of said lower lip is at least partially curved, wherein said bottom surface of said front section of said lower lip defines a front upward lip contact portion, wherein a bottom surface of the upper lip is at least partially inclined downwardly in a direction away from the middle section and rear section of the lower lip, wherein said bottom surface of said front section defines a front downward lip contact portion, wherein a top surface of said middle section of said lower lip defines a middle upward lip contact portion situated in between adjacent inactive portions of the middle section of the lower lip, wherein a top surface and/or a side surface of said rear section of said lower lip is at least partially upwardly inclined in a direction away from the middle section and front section of said lower lip, wherein said inclined part of said top surface and/or said side surface of said rear section defines a rear upward lip contact portion, and wherein said top surface and/or said side surface of said rear section of said lower lip partially defines said upwardly protruding locking element, wherein, in coupled condition of adjacent floor boards, the sideward tongue and lower lip optionally define at least three mutually spaced lower contact zones, wherein:

a front lower contact zone is defined by the co-action between the front downward tongue contact portion of said floor board and the front upward lip contact portion of another floor board, a middle lower contact zone is defined by the co-action between the middle downward tongue contact portion of said floor board and the middle upward lip contact portion of another floor board, and a rear lower contact zone is defined by the co-action between the rear downward tongue contact portion of said floor board and the rear upward lip contact portion of another floor board, and wherein, in coupled condition of adjacent floor boards, the sideward tongue and upper lip optionally define at least two mutually spaced upper contact zones, wherein:

a first upper contact zone is defined by the co-action between the front upward tongue contact portion of said floor board and the front downward lip contact portion of another floor board, second upper contact zone is defined by the co-action of a top side surface of the first coupling part of said floor board, and a side surface of the upper lip, located above the front downward lip contact portion, of another floor board.

2 Floor board according to clause 1, wherein a height level of the middle lower contact zone is positioned in between a lower height level of the front lower contact zone and a higher height level of the rear lower contact zone.

3. Floor board according to clause 1 or 2, wherein both the middle upward lip contact portion and the middle downward tongue contact portion are planar and together define a planar middle lower contact zone.

4. Floor board according to clause 3, wherein both the middle upward lip contact portion and the middle downward tongue contact portion are planar and extend in horizontal direction, and together define a horizontal planar middle lower contact zone.

5. Floor board according to any of the preceding clauses, wherein the middle lower contact zone is larger, preferably at least 1.5 times larger, than the front contact zone.

6. Floor board according to any of the preceding clauses, wherein the middle lower contact zone is smaller, preferably at least 2 times smaller, than the rear contact zone.

7. Floor board according to any of the preceding clauses, wherein the front lower contact zone is smaller, preferably at least three times smaller, than the rear contact zone.

8. Floor board according to any of the preceding clauses, wherein the height of the front lower contact zone is smaller, preferably at least ten times smaller, than the height of the rear lower contact zone.

9. Floor board according to any of the preceding clauses, wherein the width of each of the inactive portions of the middle section of the lower lip is larger, preferably at least two times larger, than the width of the middle upward lip contact portion.

10. Floor board according to any of the preceding clauses, wherein the inactive portion of the middle section of the lower lip, which is positioned in between the front upward lip contact portion and the middle upward lip contact portion, is a kinked inactive portion, and/or comprises at least one concavely shaped portion.

11. Floor board according to any of the preceding clauses, wherein the inactive portion of the middle section of the lower lip, which is positioned in between the front upward lip contact portion and the middle upward lip contact portion, is provided with a downwardly inclined upper surface in a direction towards front upward lip contact portion, which inclined upper surface connects to the middle upward lip contact portion.

12. Floor board according to any of the preceding clauses, wherein the inactive portion of the middle section of the lower lip, which is positioned in between the front upward lip contact portion and the middle upward lip contact portion, is provided with a horizontal upper surface which is positioned at a distance from both the front upward lip contact portion and the middle upward lip contact portion.

13. Floor board according to any of the preceding clauses, wherein the inactive portion of the middle section of the lower lip, which is positioned in between the front upward lip contact portion and the middle upward lip contact portion, defines a lowest point or zone of the lower lip.

14. Floor board according to any of the preceding clauses, wherein the inactive portion of the middle section of the lower lip, which is positioned in between the middle upward lip contact portion and the rear upward lip contact portion, is a kinked inactive portion, and/or comprises at least one concavely shaped portion.

15. Floor board according to any of the preceding clauses, wherein the inactive portion of the middle section of the lower lip, which is positioned in between the middle upward lip contact portion and the rear upward lip contact portion, is provided with an upwardly inclined upper surface in a direction away from the middle upward lip contact portion, which inclined upper surface connects to the rear upward lip contact portion.

16. Floor board according to any of the preceding clauses, wherein the inactive portion of the middle section of the lower lip, which is positioned in between the middle upward lip contact portion and the rear upward lip contact portion, is provided with a horizontal upper surface portion which connects to, and which is preferably integrally formed with, the middle upward lip contact portion.

17. Floor board according to any of the preceding clauses, wherein the inactive portion of the middle section of the lower lip, which is positioned in between the middle upward lip contact portion and the rear upward lip contact portion, is positioned at a higher height level than the inactive portion of the middle section of the lower lip, which is positioned in between the middle upward lip contact portion and the front upward lip contact portion.

18. Floor board according to any of the preceding clauses, wherein the inactive portion of the middle section of the lower lip, which is positioned in between the front upward lip contact portion and the middle upward lip contact portion, is configured to enclose an front middle gap with the inactive portion of the middle section of the sideward tongue positioned in between the front downward tongue contact portion and the middle downward tongue contact portion.

19. Floor board according to any of the preceding clauses, wherein the inactive portion of the middle section of the lower lip, which is positioned in between the middle upward lip contact portion and the rear upward lip contact portion, is configured to enclose an middle rear gap with the inactive portion of the middle section of the sideward tongue positioned in between the middle downward tongue contact portion and the rear downward tongue contact portion.

20. Floor board according to clause 18 and 19, wherein a cross-section of the front middle gap is larger, at least two times larger, than a cross-section of the middle rear gap.

21. Floor board according to any of the preceding clauses, wherein the inactive portion of the middle section of the sideward tongue, positioned in between the front downward tongue contact portion and the middle downward tongue contact portion, is a kinked inactive portion and/or comprises at least one concavely shaped portion.

22. Floor board according to any of the preceding clauses, wherein the inactive portion of the middle section of the sideward tongue, positioned in between the front downward tongue contact portion and the middle downward tongue contact portion, comprises a horizontal lower surface portion which connects to, and which is preferably integrally formed with, the middle downward tongue contact portion.

23. Floor board according to any of the preceding clauses, wherein the inactive portion of the middle section of the sideward tongue, positioned in between the front downward tongue contact portion and the middle downward tongue contact portion, comprises a downwardly inclined lower surface portion in a direction away from the middle downward tongue contact portion, which inclined surface portion is situated in between, and preferably at a distance from, the middle downward tongue contact portion and the front downward tongue contact portion.

24. Floor board according to any of the preceding clauses, wherein the inactive portion of the middle section of the sideward tongue, positioned in between the middle downward tongue contact portion and the rear downward tongue contact portion, comprises an upwardly inclined lower surface portion in a direction away from the middle downward tongue contact portion.

25. Floor board according to any of the preceding clauses, wherein the inactive portion of the middle section of the sideward tongue, positioned in between the middle downward tongue contact portion and the rear downward tongue contact portion, is a kinked inactive portion and/or comprises at least one concavely shaped portion.

26. Floor board according to any of the preceding clauses, wherein the second upper contact zone defines a vertical plane (VP), wherein the front lower contact zone is intersected by said vertical plane.

27. Floor board according to clause 26, wherein the vertical plane (VP) divides the recess in an inner area, enclosed by the upper lip and lower lip, and an opposite outer area, wherein the portion of the front lower contact zone positioned in outer area is larger, preferably at least two times larger, than the portion of the front lower contact zone positioned in inner area.

28. Floor board according to any of the preceding clauses, wherein the width of the lower lip exceeds the thickness of the substrate.

29. Floor board according to clause 27 and 28, wherein the width of a part of the lower lip located in the outer area exceeds the thickness of the substrate.

30. Floor board according to any of the preceding clauses, wherein the maximum width of the sideward tongue exceeds the thickness of the substrate.

31. Floor board according to any of the preceding clauses, wherein the side surface of the lower lip connecting to the upper lip comprises at least one inactive portion, such that, in coupled condition of adjacent floor boards, at least one lower front gap is formed in between the sideward tongue and said inactive portion of the lower lip.

32. Floor board according to any of the preceding clauses, wherein the side surface of the upper lip, preferably connecting to the lower lip, comprises at least one inactive portion, such that, in coupled condition of adjacent floor boards, at least one upper front gap is formed in between the sideward tongue and said inactive portion of the upper lip.

33. Floor board according to clause 32, wherein said upper front gap is positioned in between the first upper contact zone and the second upper contact zone.

34. Floor board according to any of the preceding clauses, wherein the top side surface of the first coupling part of said floor board, and the side surface of the upper lip, located above the front downward lip contact portion are configured to mutually enclose a tapered space which narrows in upward direction, which tapered space is preferably located above the upper front gap, and which tapered space results in the second upper contact zone being positioned at the upper surface of the substrate.

35. Floor board according to any of the preceding clauses, wherein the floor board is configured, to have the upwardly protruding locking element, in particular the rear upward lip contact portion, to exert a horizontal force to sideward tongue of another floor board, in coupled condition of adjacent floor boards, causing the second upper contact zone to become actively closed and/or causing the top side surface of the first coupling part to exert a horizontal force onto the side surface of the upper lip.

36. Floor board according to any of the preceding clauses, wherein, at the rear lower contact zone, both the rear downward tongue contact portion and the rear upward lip contact portion are inclined, and preferably run parallel, wherein an inclination angle between the board plane and each of the rear downward tongue contact portion and the rear upward lip contact portion is situated between and including 45 and 60 degrees.

37. Floor board according to any of the preceding clauses, wherein the rear section of the sideward tongue is provided with an accommodating space to accommodate the upwardly protruding locking element of another floor board, wherein the width of said accommodating space exceeds the width of the upwardly protruding locking element, such that, in coupled condition of intercoupled floor boards, a lower end gap is present between a distal end of the upwardly protruding element and a lower side surface of the first coupling part.

38. Floor board according to clause 37, wherein said lower side surface of the first coupling part connects to the rear section of the sideward tongue via a, preferably continuously, curved transition, wherein said curved transition preferably has a radius of between 0.5 and 1 centimetre.

39. Floor board according to any of the preceding clauses, wherein at the second contact zone, at least one edge of the substrate, and preferably of the floor board as such, is recessed and/or chamfered as to form a bevel or grout line.

40. Floor board according to any of the preceding clauses, wherein the front lower contact zone is a curved contact zone.

41. Floor board according to any of the preceding clauses, wherein the front lower contact zone is defined by the co-action between a curved front downward tongue contact portion of said floor board and a planar front upward lip contact portion of another floor board.

42. Floor board according to any of the preceding clauses, wherein the side surface of the upper lip comprises a substantially vertical top section and a, preferably at least partially inclined, bottom section positioned beneath said top section, wherein at least a part of said top section is configured to co-act with the top side surface of the first coupling part to define the second upper contact zone, wherein said bottom section of said side surface is positioned inwardly with respect to said top section of said side surface.

43. Floor board according to clause 42, wherein the height of said side surface is at least 1 mm, wherein the height of said bottom section is preferably larger than the height said top section.

44. Floor board according to clause 42, wherein the height of said side surface is less than 1 mm, wherein the height of said bottom section is preferably smaller than the height of said top section.

45. Floor board according to any of the preceding clauses, wherein distance between the top surface of the substrate and the front lower contact zone is less than 4 mm.

46. Floor board according to any of the preceding clauses, wherein the ratio between (i) the distance between the top surface of the substrate and the front lower contact zone and (ii) the height of the decorative surface layer is situated between 0.3 and 1.

47. Floor board according to any of the preceding clauses, wherein the thickness of the decorative surface layer is at least 5 mm and/or wherein the thickness of the decorative surface layer is at least the thickness of the substrate.

48. Floor board according to any of the preceding clauses, wherein the decorative surface layer is a rigid decorative surface layer.

49. Floor board according to any of the preceding clauses, wherein the decorative surface layer is at least partially made of at least one material chosen from the group consisting of: ceramic, stone, concrete, mineral porcelain, glass, mosaic, granite, limestone, marble, linoleum, and carpet.

50. Floor board according to any of the preceding clauses, wherein an upper side of the second upper contact zone defines a point of rotation during coupling of the floor boards, wherein the maximum rotation angle during coupling is determined by the thickness of the decorative surface layer and is situated between 3 and 10 degrees.

51. Floor board according to any of the preceding clauses, wherein the decorative surface layer partially covers the top surface of the substrate, wherein at least one side edge, preferably at least the first side edge, of the substrate remains uncovered by the decorative surface layer.

52. Floor board according to any of the preceding clauses, wherein, in coupled condition of adjacent floor boards, adjacent decorative surface layers are positioned at a distance from each other, preferably a distance smaller than 1.1 mm, to form one or more grout lines.

53. Floor board according to any of the preceding clauses, wherein the decorative surface layer comprises a plurality of sublayers, including a decorative print layer and at least one translucent or transparent protective layer covering said decorative print layer, wherein at least one protective layer preferably comprises a relief structure which preferably is at least partially aligned with the decorative print layer.

54. Floor board according to clause 53, wherein the decorative print layer comprises a carrier film, such as a paper film or polymer film, onto which a decorative image is printed.

55. Floor board according to clause 53 or 54, wherein the decorative print layer is formed from at least one or more paper layers treated with a thermosetting resin; or at least one or more wood veneer layers.

56. Floor board according to any of the preceding clauses, wherein the substrate comprises a second pair of opposite side edges, wherein said second pair of opposite side edges also comprises first and second coupling parts, respectively.

57. Floor board according to any of the preceding clauses, wherein the substrate comprises a second pair of opposite side edges, wherein said second pair of opposite side edges also comprises third and fourth coupling parts, respectively, allowing to couple said floor board at the respective side edges with a similar floor board by means of a lowering movement or horizontal shifting movement such that, in a coupled condition, said floor board and a further floor board become locked both in a vertical direction perpendicular to a board plane defined by the intercoupled floor boards, as well as in a horizontal direction parallel to said board plane.

58. Floor board according to clause 57, wherein one of the third and fourth coupling part is identical to the second coupling part.

59. Floor board according to any of the preceding clauses, wherein at least one pair of coupling parts is configured to exert a force onto each other, in coupled condition of adjacent floor board, actively urging the floor boards towards each other.

60. Floor board according to any of the preceding clauses, wherein the mechanical coupling parts are realized entirely of said substrate.

61. Floor board according to any of the preceding clauses, wherein an upper edge of the first and/or the second pair of opposite side edges are formed with a lowered edge surface.

62. Floor board according to any of the preceding clauses, wherein said substrate comprises MDF and/or HDF material and/or wood material.

63. Floor board according to clause 62, wherein said MDF or HDF material has an average density of more than 600 kg per cubic meter and comprises a higher density region at least near said decorative surface layer, wherein said higher density region has a density of 900 kilograms per cubic meter or more.

64. Floor board according to clause 62 or 63, wherein said MDF or HDF material comprises wood fibers glued by ureum formaldehyde glue or melamine ureum formaldehyde.

65. Floor board according to clause 62 or 63, wherein said MDF or HDF material comprises wood fibers glued by an adhesive which is substantially free of formaldehyde.

66. Floor board according to any of the preceding clauses, wherein a centre section of said substrate is more porous than a top section and/or bottom section of said substrate.

67. Floor board according to any of the preceding clauses, wherein at least one side edge of the substrate is treated with at least one water barrier agent, wherein said water barrier agent is preferably water impermeable and/or moisture-repellent.

68. Floor board according to clause 67, wherein said water barrier agent is at least partially impregnated into said at least one side edge, wherein said water barrier agent is preferably selected from the group consisting of: at least one MDI (methylene diphenyl di-isocyanate), at least one epoxy resin, at least one fluorocopolymer acetic anhydride, shellac, or a combination thereof.

69. Floor board according to clause 67 or 68, wherein said water barrier agent is at least partially coated onto said at least one side edge, wherein said water barrier agent is preferably selected from the group consisting of: nanoclay, microclay, microwax, polytetrafluoroethylene, or a combination thereof.

70. Floor board according to any of clauses 67-69, wherein said water barrier agent is a superabsorbing material, which preferably comprises crystals of sodium polyacrylate (SPA).

71. Floor board according to any of clauses 67-70, wherein at least one side edge of the substrate is treated with at least two different water barrier agents.

72. Floor board according to clause 71, wherein at least two different water barrier agents are different water barrier agent types, preferably chosen from the group consisting of: an impregnation agent, a coating, and a superabsorbing agent.

73. Floor board according to clause 71 or 72, wherein at least two different water barrier agents form a laminated coating onto the side edge.

74. Floor board according to any of clauses 67-73, wherein the concentration of said water barrier agent in a top section of the side edge is lower than the concentration of said water barrier agent in a lower section positioned underneath said top section.

75. Floor board according to any of clauses 67-74, wherein the concentration of said water barrier agent varies in thickness direction of the substrate.

76. Floor board according to any of clauses 67-75, wherein a top section of at least one side edge of the substrate is treated with at least one water barrier agent, wherein a bottom section of said side edge is free from water barrier agent.

77. Floor board according to any of clauses 67-76, wherein the maximum penetration depth of the water barrier agent into the substrate is between 3 and 10 mm.

78. Floor board according to any of clauses 67-77, wherein a top section of the side edge is provided with a bevel, preferably a pressed bevel.

79. Floor board according to clause 78, wherein a bevel surface is provided with a water impermeable bevel coating, preferably applied after treating the side edge with the at least one water barrier agent.

80. Floor board according to clause 79, wherein the water impermeable coating is applied onto and/or affixed to a water barrier agent impregnated bevel surface.

81. Floor board according to clause 79 or 80, wherein the entire bevel surface is impregnated with at least one water barrier agent.

82. Floor board according to any of clauses 79-81, wherein the water impermeable bevel coating is at least partially formed by the water barrier agent.

83. Floor board according to any of clauses 79-82, wherein the water impermeable bevel coating is at least partially formed by the water barrier agent, and is provided with at least one colourant, in particular a pigment.

84. Floor board according to any of clauses 67-83, (i) wherein a top section and/or a bottom section of the substrate comprises melamine, and wherein a centre section is preferably free of melamine; and/or (ii) wherein at least one side edge of the substrate comprises at least one portion, preferably a strip-shaped portion, which is free of water barrier agent, wherein said portion is enclosed by further portions of the side edge which comprise at least one water barrier agent to allow position-selective swelling of said side edge upon moisture absorption.

85. Floor board according to any of clauses 67-84, wherein at least one water barrier agent is chosen from the group consisting of: polyurea, polyurethane and/or at least one silicone, in particular at least one organopolysiloxane.

86. Floor board according to any of preceding clauses, wherein at least one side edge, such as the first side edge, of the substrate, is provided with a first reactant, and at least one other side edge, such as the second side edge, of the substrate, is provided with a second reactant, wherein the first reactant and second reactant are configured to react with each other upon contact during or after coupling of said side edges of adjacent floor boards to consequently form a water barrier agent in between said floor boards.

87. Floor board according to clause 86, wherein the first reactant comprises at least one isocyanate and wherein the second reactant comprises at least one polyol and/or at least one multifunctional amine.

88. Floor board according to any of the preceding clauses, wherein at least one side edge of the substrate is treated with a friction reducing substance, which substance preferably comprises magnesium oxide and/or hydrated magnesium silicate.

88. Floor board according to any of the preceding clauses, wherein at least one edge, in particular side edge, of the substrate is treated with at least one antimicrobial agent, preferably at least one water barrier agent having antimicrobial properties.

89. Floor board according to any of the preceding clauses, wherein at least a part of at least one exposed substrate surface, preferably side surface, is a heat seared surface, in particular ironed surface, and/or is provided with a heat seared skin, in particular ironed skin.

90. Floor board according to any of the preceding clauses, wherein the floor board has a rectangular or parallelogrammatic shape, and wherein the floor board is preferably oblong.

91. Floor board according to any of the preceding clauses, wherein at least one backing layer, in particular a balancing layer and/or a sound-dampening layer, is applied to a bottom surface of the substrate.

92. Floor board according to any of the preceding clauses, wherein the floor board is used and/or configured as wall board, and/or ceiling board, and/or furniture board.

93. Floor board according to any of the preceding clauses, wherein the decorative surface layer is substantially rigid.

94. Floor board according to any of the preceding clauses, wherein the height of a side surface of the upper lip and/or the height of the upper lip at its distal end is either smaller than 1 mm and/or less than 20% of the thickness of the substrate.

95. Floor board according to any of the preceding clauses, wherein at least one side edge of the substrate is provided with both at least one first reactant and at least one second reactant, wherein the first reactant and second reactant are configured to react with each other upon contact with each other to consequently form a water barrier agent onto and/or into said at least one said edge.

96. Floor board covering consisting of a plurality of, preferably interconnected, floor boards according to any of the preceding clauses.

97. Method for manufacturing a floor board according to any of the preceding clauses, comprising the steps of:
  A. providing a substrate, wherein the substrate optionally comprises MDF and/or HDF material and/or wood,
  B. affixing, directly or indirectly a decorative surface layer on top of said substrate, wherein said decorative surface optionally comprises a plurality of sublayers;
  C. optionally profiling at least a first substrate edge and a second substrate edge to form a first coupling part and a second coupling part, respectively,
  D, wherein at least one edge, preferably at least one side edge, of the substrate is treated with at least one water barrier agent, wherein said water barrier agent is preferably water impermeable and/or moisture-repellent, and/or wherein at least a part of at least one edge, preferably at least one side edge, of the substrate is subjected to a thermal searing or ironing step to sear said edge at least partially.

BRIEF DESCRIPTION OF THE DRAWINGS

The terms Fig., Figs., Figure, and Figures are used interchangeably in the specification to refer to the corresponding figures in the drawings.

The invention will be further elucidated by several illustrative examples and with reference to the appended non-limitative figures, wherein.

DESCRIPTION OF THE INVENTION

Figure 1:
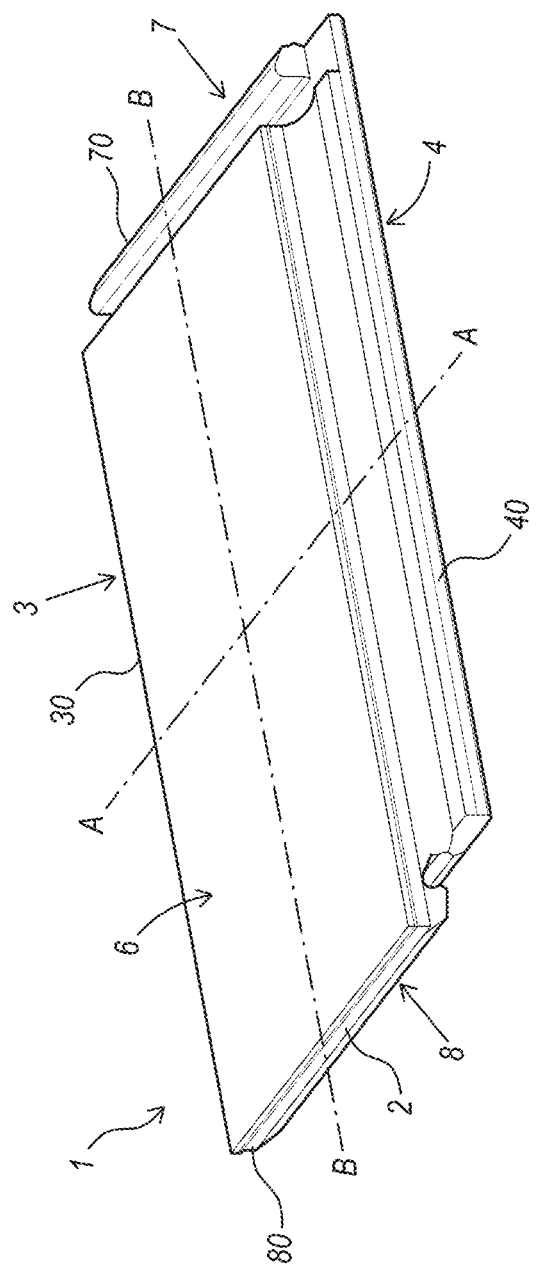
FIG. 1 schematically shows a floor board according to the present invention.

The inventive floor board comprises:
  a substrate having side edges and optionally a decorative surface layer applied to said substrate,
  at least one side edge together with a side edge opposite thereto forming a first pair of opposite side edges of said substrate; wherein said first pair of opposite side edges optionally comprises mechanical first and second coupling parts, respectively, allowing to couple said floor board at the respective side edges with a similar floor board, preferably by means of an angling down motion, such that, in a coupled condition, said floor board and a further floor board become locked both in a vertical direction perpendicular to a board plane defined by the intercoupled floor boards, as well as in a horizontal direction parallel to said board plane,
  wherein said optional first coupling part comprises a sideward tongue, wherein said sideward tongue comprises a front section, a rear section, and a middle section situated in between said front section and said rear section, wherein, preferably, a bottom surface and/or a side surface of said front section of said sideward tongue is at least partially curved, wherein said bottom surface of said front section defines a front downward tongue contact portion, wherein, preferably, a top surface of the front section of said sideward tongue is at least partially inclined downwardly in a direction away from the middle section and rear section, wherein said top surface of said front section, preferably, defines a front upward tongue contact portion, wherein, preferably, a bottom surface of said middle section of said sideward tongue defines a middle lower contact portion situated in between adjacent inactive portions of the middle section of the sideward tongue, wherein, preferably, a bottom surface and/or a side surface of said rear section of said sideward tongue is at least partially upwardly inclined in a direction away from the middle section and front section, wherein said inclined part of said bottom surface and/or said side surface of said rear section preferably defines a rear downward tongue contact portion, wherein, preferably, said rear section is configured to accommodate an upwardly protruding locking element of a second coupling part of a further floor board, wherein said optional second coupling part comprises a recess for accommodating at least a part of the sideward tongue of a further floor board, said recess being defined by an upper lip and a lower lip, wherein the lower lip extends beyond the upper lip, wherein said lower lip preferably comprises a front section, a rear section, and a middle section situated in between said front section and said rear section, wherein said upper lip is located above and connects to the front section of the lower lip, and wherein the lower lip being provided with a upwardly protruding locking element being located in the rear section of the lower lip, wherein, preferably, a bottom surface and/or a side surface of said front section of said lower lip is at least partially curved, wherein said bottom surface of said front section of said lower lip defines a front upward lip contact portion, wherein, preferably, a bottom surface of the upper lip is at least partially inclined downwardly in a direction away from the middle section and rear section of the lower lip, wherein said bottom surface of said front section preferably defines a front downward lip contact portion, wherein, preferably, a top surface of said middle section of said lower lip defines a middle upward lip contact portion situated in between adjacent inactive portions of the middle section of the lower lip, wherein, preferably, a top surface and/or a side surface of said rear section of said lower lip is at least partially upwardly inclined in a direction away from the middle section and front section of said lower lip, wherein said inclined part of said top surface and/or said side surface of said rear section preferably defines a rear upward lip contact portion, and wherein, preferably, said top surface and/or said side surface of said rear section of said lower lip partially defines said upwardly protruding locking element, wherein, in coupled condition of adjacent floor boards, the sideward tongue and lower lip optionally define at least three mutually spaced lower contact zones, wherein:

a front lower contact zone is defined by the co-action between the front downward tongue contact portion of said floor board and the front upward lip contact portion of another floor board, a middle lower contact zone is defined by the co-action between the middle downward tongue contact portion of said floor board and the middle upward lip contact portion of another floor board, and a rear lower contact zone is defined by the co-action between the rear downward tongue contact portion of said floor board and the rear upward lip contact portion of another floor board, and wherein, in coupled condition of adjacent floor boards, the sideward tongue and upper lip optionally define at least two mutually spaced upper contact zones, wherein:

a first upper contact zone is preferably defined by the co-action between the front upward tongue contact portion of said floor board and the front downward lip contact portion of another floor board, second upper contact zone is preferably defined by the co-action of a top side surface of the first coupling part of said floor board, and a side surface of the upper lip, located above the front downward lip contact portion, of another floor board, wherein decorative surface layer is preferably substantially rigid, wherein the thickness of the decorative surface layer is preferably at least 4 mm, and wherein the height of a side surface of the upper lip and/or the height of the upper lip at its distal end is preferably smaller than 1 mm.

One aspect of the invention is that the floor board comprises (modified) 'angling in' coupling parts, which allows easy coupling and uncoupling of said floor board with respect to another floor board, while the insertion angle (installation angle) is reduced to the relatively high positioning of the sideward tongue, which as such allows the decorative surface layer (decorative tile) to be positioned closer to the edge(s) of the first coupling part and/or second coupling part. This latter allows the formation of relatively narrow grout lines, in particular grout lines having a width of 1 mm or less. Preferably, the height of a side surface of the upper lip and/or the height of the upper lip at its distal end is less than 20%, preferably less than 15% of the thickness of the substrate. For example, in case the substrate thickness would be 6 mm, then the height of the upper lip at its distal end is preferably less than 0.9 mm. This restricted upper lip height leads to a relatively high positioning of the sideward tongue compared to the embodiment wherein the height of the side surface is at least 1 mm. As mentioned above, this high positioning of the sideward tongue can be favourable in case a relatively thick decorative surface layer with a thickness of at least 1 mm, such as at least 2, at least 3, 4, 5, 6, 7, 8, 9, or 10 millimetre is applied on top of the substrate. Preferably, the decorative surface layer is at least 4 mm, more preferably at least 5 mm, most preferably at least 6 mm, such as 7 mm. This relatively thick decorative surface layer is also referred to as decorative tile and protects the vulnerable side edges of the substrate, making the robustness of these vulnerable side edges less critical, and which therefore allows a relatively high positioning of the sideward tongue.

As indicated above, such a relatively high positioning of the sideward tongue facilitates the coupling of the floor boards as the insertion angle can be reduced this way, for example to an insertion angle of 3 to 10 degrees (instead of significantly higher insertion angles). Here, an upper side of the second upper contact zone preferably define a point of rotation during coupling of the floor boards, wherein the maximum rotation angle (insertion angle) during coupling is determined by the thickness of the decorative surface layer and is situated between 3 and 10 degrees. In particular in case a relatively thick decorative surface layer with a thickness of at least 4 millimetre is applied, the insertion angle will become limited as the decorative surface layers will contact each other during an angling in movement, which restricts the insertion angle. In particular for these embodiments, a relatively high positioning of the sideward tongue will be favourable. For the same reason, it may be preferred that the distance between the top surface of the substrate and the front lower contact zone is less than 4 mm. The ratio between (i) the (vertical) distance between the top surface of the substrate and the front lower contact zone and (ii) the (vertical) height of the decorative surface layer is situated between 0.3 and 1. This facilitates a smooth insertion with a restricted insertion angle of the sideward tongue of a floor board into a recess of an adjacent floor board, in particular in case a relatively thick decorative surface layer (larger than 1 mm, typically larger than 4 mm) is applied. It is imaginable that the thickness of the decorative surface layer is equal to or even greater than the thickness of the substrate. For example, the thickness of the substrate May 6 mm, while the decorative surface layer on top may have a thickness of 7 mm. Irrespective of the thickness of the decorative surface layer, the decorative surface layer is preferably a rigid decorative surface layer. The decorative surface layer is at least partially made of at least one material chosen from the group consisting of: ceramic, stone, concrete, mineral porcelain, glass, mosaic, granite, limestone, metal, cork, marble, linoleum, wood, and carpet. In case of a rigid tile, such as a ceramic tile, a stone tile, a glass tile, etcetera, one or more side edges of said rigid tile may extend in a direction which is perpendicular to a plane defined by said tile. Hence, the tile may be provided with regular straight, vertical upright side edges. However, it is also imaginable that one or more side edges of said rigid tile are inclined with respect to a plane defined by said tile. This inclined edge or tilted edge may, for example, enclose an angle with said tile plane which is situated between (and including) 15 and 75 degrees, preferably between (and including) 30 and 60 degrees. The inclined edge may be planar, curved, or otherwise shaped. It is imaginable that opposite side edges of a decorative tile run in parallel or that these opposite side edges mutually enclose an angle, such as an angle of between 15 and 90 degrees. Adjacent tiles of interconnected floor boards may form a grout line which runs in vertical direction and/or which runs in inclined direction with respect to a plane defined by the tiles. The grout line width may be constant or may vary, e.g. increase, in upward direction (away from the substrate). This latter would lead to a grout line having a diverging (V-shaped) cross-section in upward direction. By applying inclined edges wider or more narrow grout lines may be created and/or the minimum grout line width may be reduced in between adjacent, preferably interconnected, floor boards and/or a smaller insertion angle can be allowed to interconnect coupling parts of adjacent floor boards (compared to the situation wherein a conventional vertical side edge orientation is applied). As soon from a top view, the decorative tile applied on top of the substrate may be smaller than the substrate. This allows one or more peripheral portions of the top surface of the substrate to remain uncovered by the tile. This latter facilitates the formation of grout lines in between adjacent, preferably interconnected, floor boards. The exposed (uncovered) portion of the top surface of the substrate may become hidden when (optionally) filling up the grout line with grout (mortar) and/or when applying a decorative tile with inclined edges on top which could cover and hence could take away the sight on the exposed portion of the top surface of the substrate. Preferably, decorative tile may connect to the distal side edge of the upper lip, while the decorative tile is positioned at a distance from the distal side edge of the sideward tongue (or vice versa). This leads to the situation wherein the seam formed in between floor boards is aligned with and/or connects to the decorative tile and is therefore eccentrically positioned with respect to the grout line (to be) formed. This reduces the vulnerability of at least one side edge of the substrate prior to installation.

In general, in the floor board according to the invention it is imaginable that the decorative surface layer (only) partially covers the top surface of the substrate, wherein at least one side edge, preferably at least the first side edge, of the substrate remains uncovered by the decorative surface layer. These one or more uncovered parts of the substrate may e.g. be used to created one or more bevels and/or one or more grout lines, wherein it is also imaginable that the one or more bevels are formed by locally removing a part of the decorative surface layer. Preferably, one side edge is left uncovered by the decorative surface layer, while an opposite side edge is covered by the decorative surface layer. This is often preferred from a manufacturing point of view. Moreover, in this manner, the seam formed in between panels is eccentrically positioned at a side edge of the grout line or bevel and is therefore less clearly positioned in the direct line of sight, which, in particular in case of the application of bevels (chamfers), is attractive from an aesthetic point of view.

The side surface and/or distal end of the upper lip may be rectilinear, curved, stepped, or otherwise shaped. Although the height of a side surface of the upper lip and/or the height of the upper lip at its distal end is preferably smaller than 1 mm, it is not excluded that this height may be at least 1 mm. Preferably, the side surface of the upper lip comprises a substantially vertical top section and a, preferably at least partially inclined, bottom section positioned beneath said top section, wherein at least a part of said top section is configured to co-act with the top side surface of the first coupling part to define the second upper contact zone, wherein said bottom section of said side surface is positioned inwardly with respect to said top section of said side surface. Here, the bottom section may be provided with at least one cut-out portion to create space. Preferably, the height of said bottom section is preferably larger than the height said top section. This provides sufficient robustness to said surface which significantly reduces the risk of breakage during coupling and during use. The preferred height of at least 1 mm is in particular advantageous in case the decorative surface layer is relatively thin, such as thinner than 1 mm, as in this case the decorative surface layer does not seriously shield or protects the substrate from breaking at its side edge(s).

With the floor boards of the above-mentioned type, it was found that, when walking upon a floor covering that is composed of such floor panels, occasionally it may occur that an undesired sound, more particularly a creaking noise, is produced. As a rule, such floor panels mostly are provided on an elastically compressible underfloor, which either is installed beforehand, or is present below the floor panels in a prefabricated manner, and which may serve for various purposes, such as noise reduction, thermal insulation, levelling of the underfloor, vapor barrier, and so on. As a consequence thereof, when walking on such floor covering, minor movements, mostly mutual tilting movements, will occur among the floor panels, as a result of which noises can be created by the coupling parts chafing against each other. Also, in the coupling parts themselves certain deformations may occur as a result of a varying external load, thus also when the floor covering is being walked upon.

Moreover, the above described coupling mechanism aims to find a balance between position-selective contact portions, and gaps or spaces, defined as inactive portions, formed in between said contact portions. Here, the application of no less than five contact portions and four intermediate gaps or space results in a solid and firm positioning, and hence coupling, of the coupling parts in coupled condition of adjacent floor boards. This coupling is aimed to be a free-of-play coupling, wherein the coupling parts are mutually fixated and locked in coupled condition of the coupling parts. By means of this fixation is obtained that the coupling parts of two mutually coupled floor boards, at the height of the contact portions, can no longer perform any mutual shifting. When a floor covering composed of said interconnected floor boards is being walked upon, tiny mutual movements can be prevents. As most of these noises are produced at the height of the aforementioned contact portions, this mutual floor board fixation thus also has as a result that the risk that such sounds are created, is considerably reduced, if not the occurrence thereof is completely excluded. Hence, the design of the profiles of the coupling parts is such that the risk of said undesired noises is reduced even if no sliding agent is applied, which, however, does not exclude that a sliding agent still can be applied on the coupling parts of the floor panels according to the invention.

Further embodiments of the floor board according to the invention are presented below. As a preliminary remark it is noted that the floor board according to the invention may also be applied onto walls or ceilings and/or may be part of a furniture covering and may therefore also qualify and be regarded as a wall board, wall panel, ceiling board, ceiling panel, furniture board, or furniture panel. Hence, in the disclosure below the expression "floor board" is interchangeable with one of these equivalent expressions for alternative applications. As the floor board is typically provided with a decorative surface layer on top of the substrate of the floor board, the floor board qualifies as decorative floor board.

In a preferred embodiment, a height level of the middle lower contact zone is positioned in between a lower height level of the front lower contact zone and a higher height level of the rear lower contact zone. In this manner stepped lower contact zones are created. This allows the front section of the sideward tongue to be design in a robust manner which reduces the vulnerability and fragility of the sideward tongue, both during insertion into the recess as well as in coupled condition. A more robust front section of the sideward tongue (also) allows absorption of greater (clamping) forces. The stepped lower contact zones also allow the lower lip, in particular the middle section and rear section of the lower lip to be design in a relatively robust manner, which reduces the vulnerability and fragility of these section. A more robust middle section may moreover lead to desired dimension and shape stability to stably support the sideward tongue, which will contribute to prevent creaking noises when exerting a load onto the coupling parts, even in case said load is exerted in a direction which is perpendicular to a plane defined by the floor boards.

Preferably, a least a part of the middle upward lip contact portion and at least a part of the middle downward tongue contact portion are planar and together define a planar middle lower contact zone. Such a planar contact zone secure permanent engagement of the middle upward lip contact portion and the middle downward tongue contact portion in coupled condition of adjacent floor boards. Moreover, by applying a planar middle lower contact zone, the contact surface area can be predefined relatively accurately, and normally more accurately in case, for example, a curved middle lower contact zone would be applied as such a curved contact surface area may be more sensitive for tolerance differences during manufacturing which may lead to cavities and/or a reduced contact surface area, which increases the creation of creaking noise when exerting a load onto said coupling parts. However, this does not exclude the use or application of a middle lower contact zone which has a different shape than a planar shape. Preferably, at least a part of the middle upward lip contact portion and at least a part of the middle downward tongue contact portion are planar and extend in horizontal direction, and together define a substantially horizontal planar middle lower contact zone. This orientation results in the situation that the middle lower contact zone does not, or practically not, contribute to exerting a force or pressure in a direction which is parallel to a plane defined by the floor boards. This consequently results in the situation that a force or pressure, if any, to push the floor boards to each other in coupled condition to close a seam formed in between the floor boards, is caused by the rear lower contact zone defined by the co-action between the downward tongue contact portion of said floor board and the rear upward lip contact portion and/or upwardly protruding locking element of another floor board. Preferably, the rear lower contact zone may be inclined, such as inclined in a curved manner and/or inclined in a planar manner.

The middle lower contact zone is preferably larger, more preferably at least 1.5 times larger, than the front contact zone. Applying a relatively large middle lower contact zone provides a reliable support of a critical part of the sideward, which reduces the risk of noise creation. Applying a relatively small front contact zone facilitates the insertion of the (front section of the) sideward tongue in the recess due to less frictional forces during the coupling process.

The middle lower contact zone is preferably smaller, preferably at least 2 times smaller, than the rear lower contact zone. As indicated above, the rear lower contact zone normally plays an important role in keeping a seam, formed in between interconnected floor boards, closed. By applying a relatively large rear lower contact zone a closed seam can be secured in a more reliable manner. For the same reasons, said the front lower contact zone is preferably smaller, more preferably at least three times smaller, than the rear contact zone. The height of the front lower contact zone is smaller, preferably at least ten times smaller, than the height of the rear lower contact zone. In most embodiments, this also implies that the rear lower contact zone runs steeper than the front lower contact zone (with respect to a plane defined by the floor boards).

Preferably, the width of each of the inactive portions of the middle section of the lower lip is larger, preferably at least two times larger, than the width of the middle upward lip contact portion. This implies that the middle lower contact zone is positioned closer to the rear lower contact zone than to the front lower contact zone. This positioning of the middle lower contact zone further contributes to secure a stable and fixated coupling between the coupling parts in coupled condition. In the middle and rear section the effective support surface in vertical direction (perpendicular to a plane defined by the floor boards) is preferably realized by the combination of the horizontal footprint of the, preferably horizontal, preferably planar, middle lower contact zone and the horizontal footprint of the normally inclined rear lower contact zone. Preferably, the horizontal footprint of the rear lower contact zone is larger than the horizontal footprint of the middle lower contact zone. The horizontal footprint of the front lower contact zone is preferably smaller than the horizontal footprint of the middle lower contact zone. The horizontal footprint of a contact zone means a horizontal project of said contact zone in a plane parallel to a plane defined by the floor boards.

The inactive portion of the middle section of the lower lip, which is positioned in between the front upward lip contact portion and the middle upward lip contact portion, is preferably a kinked inactive portion, and/or comprises at least one concavely shaped portion. The inactive portion of the middle section of the lower lip, which is positioned in between the front upward lip contact portion and the middle upward lip contact portion, is preferably provided with a downwardly inclined upper surface in a direction towards front upward lip contact portion, which inclined upper surface connects to the middle upward lip contact portion. This allows the middle lower contact zone to be positioned at a higher level than the front lower contact zone to realize a (gradually) increasing thickness of the lower lip in the direction of the rear section, and/or allows a relatively robust front section of the sideward tongue. The inactive portion of the middle section of the lower lip, which is positioned in between the front upward lip contact portion and the middle upward lip contact portion, is preferably provided with a horizontal upper surface which is positioned at a distance from both the front upward lip contact portion and the middle upward lip contact portion. The inactive portion of the middle section of the lower lip is preferably configured as guiding surface and sliding surface to facilitate smooth and/or sliding insertion of the sideward tongue into the recess. The embodiments describe in this paragraph contribute to facilitating this smooth insertion of the sideward tongue into the recess.

The inactive portion of the middle section of the lower lip, which is positioned in between the front upward lip contact portion and the middle upward lip contact portion, and/or the front lower contact zone preferably defines a lowest point (deepest point) or lowest zone (deepest zone) of the lower lip.

Preferably, the inactive portion of the middle section of the lower lip, which is positioned in between the middle upward lip contact portion and the rear upward lip contact portion, is a kinked inactive portion, and/or comprises at least one concavely shaped portion. Preferably, the inactive portion of the middle section of the lower lip, which is positioned in between the middle upward lip contact portion and the rear upward lip contact portion, is provided with an upwardly inclined upper surface in a direction away from the middle upward lip contact portion, which inclined upper surface connects to the rear upward lip contact portion. This allows that the rear lower contact zone is positioned at a higher level than each of the front lower contact zone and middle lower contact zone.

The inactive portion of the middle section of the lower lip, which is positioned in between the middle upward lip contact portion and the rear upward lip contact portion, is preferably provided with a horizontal upper surface portion which connects to, and which is preferably integrally formed with and/or planar to, the middle upward lip contact portion. This simplifies the design of the lower lip and facilitates the manufacturing of the lower lip.

The inactive portion of the middle section of the lower lip, which is positioned in between the middle upward lip contact portion and the rear upward lip contact portion, is preferably positioned at a higher height level than the inactive portion of the middle section of the lower lip, which is positioned in between the middle upward lip contact portion and the front upward lip contact portion. This allows the application of the aforementioned stepped lower contact zones while keeping the coupling part(s), in particular the lower lip, as robustly a possible.

The inactive portion of the middle section of the lower lip, which is positioned in between the front upward lip contact portion and the middle upward lip contact portion, is preferably configured to enclose an front middle gap with the inactive portion of the middle section of the sideward tongue positioned in between the front downward tongue contact portion and the middle downward tongue contact portion. The inactive portion of the middle section of the lower lip, which is positioned in between the middle upward lip contact portion and the rear upward lip contact portion, is preferably configured to enclose an middle rear gap with the inactive portion of the middle section of the sideward tongue positioned in between the middle downward tongue contact portion and the rear downward tongue contact portion. Preferably, a cross-section of the front middle gap is larger, at least two times larger, than a cross-section of the middle rear gap. This provides more space for the sideward tongue during insertion of the sideward tongue into the recess which facilitates the coupling process.

The inactive portion of the middle section of the sideward tongue, positioned in between the front downward tongue contact portion and the middle downward tongue contact portion, is preferably a kinked inactive portion and/or comprises at least one concavely shaped portion. This creates space at the bottom surface of the middle section of the sideward tongue to secure a smooth insertion of the sideward tongue into the recess.

The inactive portion of the middle section of the sideward tongue, positioned in between the front downward tongue contact portion and the middle downward tongue contact portion, preferably comprises a horizontal lower surface portion which connects to, and which is preferably integrally formed with and/or planar to, the middle downward tongue contact portion. This simplifies the design of the sideward tongue and hence facilitates the manufacturing of the sideward tongue.

The inactive portion of the middle section of the sideward tongue, positioned in between the front downward tongue contact portion and the middle downward tongue contact portion, preferably comprises a downwardly inclined lower surface portion in a direction away from the middle downward tongue contact portion, which inclined surface portion is situated in between, and preferably at a distance from, the middle downward tongue contact portion and the front downward tongue contact portion. As indicated above, such this feature creates space at a bottom side of the sideward tongue, which facilitates insertion of the sideward tongue into the recess during coupling of two floor boards.

The inactive portion of the middle section of the sideward tongue, positioned in between the middle downward tongue contact portion and the rear downward tongue contact portion, preferably comprises an upwardly inclined lower surface portion in a direction away from the middle downward tongue contact portion. Preferably, this upwardly inclined lower surface portion is at least partially configured to co-act with the lower lip to define the front lower contact zone.

The inactive portion of the middle section of the sideward tongue, positioned in between the middle downward tongue contact portion and the rear downward tongue contact portion, is preferably a kinked inactive portion and/or comprises at least one concavely shaped portion. This creates, more or less instantaneously, space underneath the sideward tongue to realize an inactive portion at that location.

The inactive portions and gaps formed in between are purposively created and located to prevent co-action between coupled parts at these location, which forces and stimulates and only allows desired contact at the at least five predefined contact zones of the floor boards in coupled condition.

The second upper contact zone preferably defines a vertical plane (VP), wherein the front lower contact zone is intersected by said vertical plane. The vertical plane (VP) preferably divides the recess in an inner area, enclosed by the upper lip and lower lip, and an opposite outer area, wherein the portion of the front lower contact zone positioned in said outer area is larger, preferably at least two times larger, than the portion, if any, of the front lower contact zone positioned in inner area. It is (also) imaginable that the front lower contact zone is entirely positioned in said outer area.

The width of the lower lip preferably exceeds the thickness of the substrate. It is even imaginable and even preferred that the width of a part of the lower lip located in the outer area preferably exceeds the thickness of the substrate. Although this leads to more serious material loss during profiling of the coupling parts, this relatively long lower lip allows the contact zones to be positioned adequately and/or allows the contact zones to be dimensioned sufficiently large to realise a stable, fixated, and noise-free coupling between the coupling parts. Likewise, in a preferred embodiment, the maximum width of the sideward tongue exceeds the thickness of the substrate.

Preferably, the side surface of the lower lip connecting to the upper lip comprises at least one inactive portion, such that, in coupled condition of adjacent floor boards, at least one lower front gap is formed in between the sideward tongue and said inactive portion of the lower lip. This prevents that a terminal portion, in fact a tip of a nose, of the sideward tongue contacts the lower lip. Preferably, the side surface of the upper lip, preferably connecting to the lower lip, comprises at least one inactive portion, such that, in coupled condition of adjacent floor boards, at least one upper front gap is formed in between the sideward tongue and said inactive portion of the upper lip. Said upper front gap is preferably positioned in between the first upper contact zone and the second upper contact zone.

The top side surface of the first coupling part of said floor board, and the side surface of the upper lip, located above the front downward lip contact portion are preferably configured to mutually enclose a tapered space which narrows in upward direction, which tapered space is preferably located above the upper front gap, and which tapered space results in the second upper contact zone being positioned at the upper surface of the substrate. The angle enclosed by the top side surface of the first coupling part of said floor board, and the side surface of the upper lip, located above the front downward lip contact portion is may be small and is preferably less than 10 degrees, preferably in between 4 and 6 degrees, such as 5 degrees. It is imaginable that one or both of the top side surface of the first coupling part of said floor board, and the side surface of the upper lip, located above the front downward lip contact portion are oriented vertically (perpendicular to the plane defined by the floor boards), but it is also imaginable that at least one of the top side surface of the first coupling part of said floor board, and the side surface of the upper lip, located above the front downward lip contact portion is slight inclined with respect to the vertical plane (VP) defined by the seam of the floor boards (which is perpendicular to the (horizontal) plane defined by the floor boards a such), wherein this inclination is preferably smaller than 10 degrees.

The floor board is preferably configured, to have the upwardly protruding locking element, in particular the rear upward lip contact portion, to exert a horizontal force to sideward tongue of another floor board, in coupled condition of adjacent floor boards, causing the second upper contact zone to become actively closed and/or causing the top side surface of the first coupling part to exert a horizontal force onto the side surface of the upper lip. This will lead to an actively closed seam formed in between interconnected floor boards. Preferably, at least a part of this horizontal (closing) force is caused by a horizontal force (component) exerted by the rear upward lip contact portion of a first floor board onto the rear downward tongue contact portion of a second floor board, hence at the location of the rear lower contact zone.

Preferably, the rear lower contact zone, both the rear downward tongue contact portion and the rear upward lip contact portion are inclined, and preferably run parallel, wherein an inclination angle between the board plane and each of the rear downward tongue contact portion and the rear upward lip contact portion is situated between and including 45 and 60 degrees. This inclination preferably runs upwardly in a direction away from the front section of the sideward tongue and away from the upper lip, respectively. An inclination angle less than 45 degrees may affect the desired horizontal locking effect (in the plane defined by the floor boards) to prevent drifting apart interconnected floor boards. An inclination angle larger than 60 degrees often hinders a smooth insertion of the sideward tongue into the recess.

The rear section of the sideward tongue is preferably provided with an accommodating space to accommodate the upwardly protruding locking element of another floor board, wherein the width of said accommodating space exceeds the width of the upwardly protruding locking element, such that, in coupled condition of intercoupled floor boards, a lower end gap is present between a distal end of the upwardly protruding element and a lower side surface of the first coupling part. Such a lower end gap also contributes to a smooth coupling between the sideward tongue and the recess. Preferably, said lower side surface of the first coupling part connects to the rear section of the sideward tongue via a, preferably continuously, curved transition, wherein said curved transition preferably has a constant and/or shifting radius of between 0.5 and 1 centimetre. Such a rounded (curved) transition significantly reduces the risk of crack formation in the first coupling part during insertion of the sideward tongue of a floor board into the recess of an adjacent floor board.

At the second contact zone, preferably at least one edge of the substrate, and more preferably of the floor board as such, is recessed and/or chamfered as to form a bevel or grout line. Both upper portions of opposite side edges of the floor board may be lower, recess, or chamfered, which allow, in coupled condition of floor boards, for example the realization of a V-shaped groove (V-shape bevel) and/or a U-shaped grout line. This/these recessed edge(s) can be realized for example by removing material of said side edge(s) and/or by (com) pressing said side edges in case the substrate would be made of a compressible material (to some extent), such as MDF or HDF for example.

The front lower contact zone is preferably an at least partially curved contact zone. This is often advantageous as a bottom surface of the front section of the sideward tongue is often curved or rounded to facilitate smooth insertion of the sideward tongue into the recess of another floor board. The front lower contact zone may be defined by the co-action between a curved front downward tongue contact portion of said floor board and a planar and/or inclined (uncurved) front upward lip contact portion. Additionally or alternatively, the front lower contact zone may be defined by the co-action between a front downward tongue contact portion of said floor board and a upwardly protruding ridge of the upward lip contact portion.

The decorative surface layer preferably comprises a plurality of sublayers, including a decorative print layer and at least one translucent or transparent protective layer covering said decorative print layer, wherein at least one protective layer, such as a wear layer, preferably comprises a relief structure which preferably is at least partially aligned with the decorative print layer. The decorative print layer preferably comprises a carrier film, such as a paper film or polymer film, onto which a decorative image is printed. The decorative surface layer may have a thickness less than 0.75 millimetre, or even less than 0.5 millimetre. It is also imaginable that the decorative print layer is printed directly onto the substrate and/or onto another layer, such as a primer layer and/or a, preferably white, basecoat layer already applied to the substrate. The decorative print layer may be formed from at least one or more paper layers treated with a thermosetting resin; or at least one or more wood veneer layers. In the case of a surface layer at least partially formed from one or more paper layers, preferably a so-called DPL (direct pressure laminate) panel is concerned, wherein these paper layers are impregnated with a thermohardening resin, such as with a melamine based resin. This will typically be preferred in case the substrate is at least partially composed of MDF or HDF.

In a preferred embodiment, the substrate comprises a second pair of opposite side edges, wherein said second pair of opposite side edges also comprises first and second coupling parts, respectively. This could lead to so-called angle-angle floor boards, wherein each pair of sides, in particular both the short sides and the long sides in case of an oblong floor board, are configured to be coupled to another floor board by means of an angling down movement (rotational movement). However, it is also imaginable that the substrate comprises a second pair of opposite side edges, wherein said second pair of opposite side edges also comprises third and fourth coupling parts, respectively, allowing to couple said floor board at the respective side edges with a similar floor board by means of a lowering movement or horizontal shifting movement such that, in a coupled condition, said floor board and a further floor board become locked both in a vertical direction perpendicular to a board plane defined by the intercoupled floor boards, as well as in a horizontal direction parallel to said board plane. Here, it is imaginable that the one of the third and fourth coupling parts is identical to the second coupling part. In case of polygonal floor boards with four sides, such as a rectangular or parallelogrammatic floor board, this would lead to three different types of coupling profiles, in particular one female type (i.e. the second coupling part) and two different male types (i.e. the first coupling part and the third (or fourth) coupling part).

In a preferred embodiment, the third coupling part comprises: an upward tongue, at least one upward flank lying at a distance from the upward tongue, an upward groove formed in between the upward tongue and the upward flank wherein the upward groove is adapted to receive at least a part of a downward tongue of a fourth coupling profile of an adjacent panel, and preferably at least one first locking element, preferably provided at a distant side of the upward tongue facing away from the upward flank, and wherein the fourth coupling part comprises: a downward tongue, at least one downward flank lying at a distance from the downward tongue, a downward groove formed in between the downward tongue and the downward flank, wherein the downward groove is adapted to receive at least a part of an upward tongue of said third coupling part of an adjacent floor board, and preferably at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled floor board for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces.

In the abovementioned embodiment, it is imaginable that the third coupling part and fourth coupling part are configured such that in coupled condition a pretension is existing, which forces coupled floor boards at the respective edges towards each other, wherein this preferably is performed by applying overlapping contours of the third coupling part and the fourth coupling part, in particular overlapping contours of downward tongue and the upward groove and/or overlapping contours of the upward tongue and the downward groove. Such a "pretension" in coupled condition of adjacent floor boards can analogously also be present between the first coupling part and second coupling part. Hence, at least one pair of coupling parts is configured to exert a force or force onto each other, in coupled condition of adjacent floor board, actively urging the floor boards towards each other.

The mechanical coupling parts may be realized entirely of said substrate. It is also imaginable that at least a part of at least one coupling part is formed by a separate piece which is attached to the substrate. More in particular, it is imaginable that at least one coupling part, such as e.g. the third coupling part, comprises at least one locking strip configured to co-act with a locking groove of an adjacent fourth coupling part of another floor board. The locking strip may, for example, by accommodated in a channel or groove application in the upward flank, while the locking groove may for example be applied in a distal side of the downward tongue. The locking strip is typically at least partially made of a resilient polymer, and may, for example, be composed of different segments which are pivotably connected to each other. The locking strip normally—in unloaded state-preferably extends beyond a vertical plane defined by the third and fourth coupling part in coupled condition. A distal end of the locking strip will commonly deform towards the vertical plane during the coupling process and will normally at least partially return to or towards its initial position in coupled state. Hence, the locking strip can be considered as separate insert that resiliently moves inwardly and subsequently outwardly to catch and lock the adjacent coupling part during a downward motion when coupling two floor boards.

Optionally, an upper edge of the first and/or the second pair of opposite side edges are formed with a lowered edge surface. This can be done to realize a (micro) bevel, and/or a grout line. As indicated before, this can be realized by cutting or milling away, but may also be realized by (com) pressing the side edge to locally shape and lower the edge(s). This latter may lead to an increased density at the lowered edge surfaces. In particular in case the substrate and/or the side edges is/are at least partially composed of a moisture-sensitive material, such as MDF or HDF, such an increase of the local density can significantly improve the water barrier properties at the edges.

In case of an MDF or HDF substrate, said MDF or HDF material preferably has an average density of more than 600 kg per cubic meter and comprises a higher density region at least near said decorative surface layer, wherein said higher density region has a density of 900 kilograms per cubic meter or more. Preferably, the MDF or HDF substrate has a substantially parabolically varying density from bottom surface to top surface, with the highest density regions in the top and bottom section of the substrate and a lower density region in a centre section of the substrate. Preferably, melamine resin is penetrated into the top section of the substrate. The higher density region, the melamine resin penetration, and the pressed side edges may make the substrate at this location relatively water tight (waterproof).

As for the MDF/HDF material preferably a MDF/HDF material is used comprising wood fibers glued by means of ureum formaldehyde (UF) glue, melamine ureum formaldehyde (MUF) and/or polymeric methylene diphenyl di-isocyanate (PMDI). Preferably, the substrate and/or the MDF/HDF material of the substrate comprises at least one formaldehyde scavenger to decrease the formaldehyde emission from the substrate. Mostly, aqueous solutions of urea (40% or 45% solids content) are applied in this respect. Additionally or alternatively, agents like sodium metabisulfite ($Na_2S_2O_5$), ammonium bisulphite (($NH_4$)$HSO_3$), or ammonium phosphates, may also be used. The MDF/HDF composition can be made more waterproof (more moisture-resistant) by applying a MUF based glue, wherein the melamine content is approximately 12-23%, in particular 12-15%. The glue content is in the range of 12-13% by weight, based on dry wood.

Said MDF or HDF material comprises wood fibers glued by an adhesive which is preferably substantially free of formaldehyde due to the toxicity and volatility of formaldehyde. This can e.g. be realized by using (PMDI) as adhesive. However, PMDI may still pose in the future issues due to the petrochemical origin of most of the commercially used isocyanates. Therefore, one or more bio-based adhesives may become more and more preferred in MDF or HDF substrates. A bio-based adhesive used in the MDF or HDF substrate is preferably derived from at least one of proteins, cottonseed, soy, lignin, and tannin.

The primary attractiveness of using tannin in MDF or HDF is its similarity both in reactivity and crosslinking chemistry behaviour with formaldehyde, phenol, and resorcinol. Preferably, condensed tannins is used, being polyphenolic materials and generally comprise oligomeric flavonoid-type structures that are predominantly sourced from either the heartwood or bark of a variety of tree species.

Lignin is usually found in lignocellulosic materials such as wood and agricultural residues, among others. Usually, it is a high-molecular-weight polymer based on aromatic phenylpropane units found in a densely crosslinked structure. Mixed with the other major types of polymeric chains found in the lignocellulose structure, lignin acts as the glue that binds cellulose and hemicellulose chains together, thus providing increased rigidity to the structure, as well as higher microbial resistance to the cell wall.

Said MDF or HDF material is preferably made fire-retardant by the addition of at least one fire-retarding agent to the MDF or HDF, such as monoammonium and diammonium phosphate, boric acid and/or borax. Typically, these fire-retarding agents are used in combination with a MUF adhesive, preferably with 15-18% melamine content by weight.

In a preferred embodiment, such MDF or HDF material (or other substrate material) comprises, in addition to wood fibers or optionally instead of wood fibers, fibers and/or particles of at least one other material than wood. Said material (other than wood) is preferably chosen from the group consisting of: paper, cork, bamboo, hemp, linen, flax, jute, sisal, coconut fibers, palm fibers, banana fibers, plant fibers, cotton, felt, and (synthetic and/or genuine) leather. Hence, this material (other than wood) is preferably (also) a natural material. Various of these fibers, like bamboo fibers, palm fibers, and/or coconut fibers, have improved water resistant properties compared to wood fibers which typically leads to a relatively water resistant substrate. Coconut fiber is typically obtained from unripe coconut, and is a natural fiber extracted from the husk of coconut. The coconut is steeped in hot seawater, and subsequently, the fibers are removed from the shell by combing and crushing, the same process as jute fiber. Normally, the individual fiber cells are narrow and hollow with thick walls made of cellulose, and each cell is about 0.8-1.2 mm long and approximately 10-20 μm in diameter. Due to a typically relatively high lignin content, coconut fiber is relatively elastic, durable, and resistant to rotting, and may therefore preferably be incorporated in the substrate and/or in one or more other panel layers of the decorative board according to the invention. Bamboo, in particular Andong bamboo (*Gigantochloa pseudoarundinacea*), Betung bamboo (*Dendrocalamus asper*), Sembilang bamboo (*D. giganteus*) and Kuning bamboo (*B. vulgaris* Var *striata*), also have a relatively high lignin content of at least 25% by weight of bamboo material. Bamboo has a natural moisture resistance due to the presence of a substance called "bamboo kun," an antimicrobial bio-agent that helps resist moisture-related issues, such as rotting and decay. Therefore, bamboo is typically more resistant to water damage than wood, as a result of which it may be preferred to incorporate bamboo material, in particular bamboo fibers, in the substrate (and/or in one or more other layers) of the decorative board. The substrate may be entirely free of wood fibers, in particular in case one or more of the above alternative (non-wood) fibers are applied and/or in case one or more alternative fillers are applied. Such alternative filler is preferably at least one additive chosen from the group consisting of: talc, chalk, wood, calcium carbonate, titanium dioxide, calcined clay, porcelain, glass particles, glass fibres, carbon particles, silicon particular, a(nother) mineral filler, rice, textile fibers, such as cotton fibers, and another natural filler.

Preferably, a centre section of said substrate, in particular said MDF or HDF substrate, is more porous than a top section and/or bottom section of said substrate, in particular said MDF or HDF substrate. This implies that the centra section is capable to absorb more liquid material than the top section and/or bottom section. In case this liquid would be moisture (water), this may lead to a variety of undesired effects, such as upstanding edges or premature wear. To reduce or even eliminate this risk and the make the MDF or HDF substrate more water-resistant (more waterproof), preferably at least one side edge of the substrate and/or of the floor board as such is treated with at least one water barrier agent, wherein said water barrier agent is preferably water impermeable and/or moisture-repellent.

Preferably, said water barrier agent is at least partially impregnated into said at least one side edge, wherein said water barrier agent is preferably selected from the group consisting of: at least one (polymeric) MDI (methylene diphenyl di-isocyanate), at least one epoxy resin, at least one fluorocopolymer acetic anhydride, shellac, linseed oil, or a combination thereof. Shellac is a natural biocompatible polymer that is a mixture of polyesters and monoesters that are insoluble in water but soluble in ethanol or ether. For example, shellac can be dissolved in 95% alcohol to prepare a shellac solution with a concentration of 10-20% by weight. Like linseed oil, shellac can improve the stability of MDF or HDF. Both agents display a good permeability in MDF and HDF materials, and the swelling coefficients of wood in the tangential and radial directions decrease markedly, which improved the dimensional stability of wood, and hence of the MDF or HDF material as such. The penetration depth is the impregnating water barrier agent is preferably less than 10 mm, and is preferably between 3 and 10 mm. The substrate and/or the side edge(s) to be treated may be heated prior to and/or during impregnation to open or widen pores in the substrate which facilitates impregnation and by means of which a deeper impregnation can be achieved. The temperature to which substrate and/or the side edge(s) to be treated are heated may vary, but are preferably situated in between 3° and 100° C. When treating only a top section of the substrate (above its centreline), then a substantially parabolic impregnation depth profile can be seen, partially caused by the less permeable (less porous) upper part of said top section. As compared to the thickness of the substrate, the impregnation depth is preferably between 10 and 100%, or between 20 and 75%.

It is additionally or alternatively also imaginable that said water barrier agent is at least partially coated onto said at least one side edge, wherein said water barrier agent is preferably selected from the group consisting of: nanoclay, microclay, microwax, polytetrafluoroethylene (Teflon), or a combination thereof. It may for example relate to particles of bentonite clay or amorphous silica. Preferably, the particles of such coating agent have an average particle diameter of less than 100 micron, and preferably less than 30 micron.

Additionally or alternatively, said water barrier agent is a superabsorbing material, which preferably comprises crystals of sodium polyacrylate (SPA). The term "superabsorbent materials" refers to water-swellable, water-insoluble organic or inorganic materials including superabsorbent polymers and superabsorbent polymer compositions capable, under the most favourable conditions, of absorbing at least about 10 times their weight, or at least about 15 times their weight, or at least about 25 times their weight in an aqueous solution containing 0.9 weight percent sodium chloride.

At least one side edge of the substrate may be treated with at least two different water barrier agents. Here, at least two different water barrier agents may be different water barrier agent types, preferably chosen from the group consisting of: an impregnation agent, a coating, and a superabsorbing agent. It is also imaginable that at least two water barrier agents of the same type are used, such as for example two or more coating layers. In this latter case, at least two different water barrier agents preferably form a laminated coating onto the side edge. Such a multi-layered coating may be applied to secure a complete covering of the most moisture-sensitive parts of the side edges with water barrier agent. Optionally, a primer layer may be applied to the side edges prior to applying one or more water barrier agent based coating layers.

Preferably, the concentration of said water barrier agent in a top section of the side edge is lower than the concentration of said water barrier agent in a lower section positioned underneath said top section. The concentration of said water barrier agent may thus vary in thickness direction of the substrate. Preferably, the impregnation depth profile is parabolically and or droplet shaped.

In a preferred embodiment, a top section of at least one side edge of the substrate is treated with at least one water barrier agent, wherein a bottom section of said side edge is free from water barrier agent. As the top section is the most critical part of the side edges of the substrate, as water (moisture) often seeps from a top surface of the floor board into the seam (joint) of adjacent, preferably interconnected floor boards, it is preferred to treat this section with water barrier agent. In order to save materials and cost, the bottom section may remain free from water barrier agent.

The water barrier agent may be sprayed onto the substrate part(s) to be treated. Spraying-on may be preferred, because in this way more liquid can be applied. Additionally or alternatively, the water barrier agent may be coated onto the substrate part(s) to be treated. The water barrier agent may be applied by rolling, for example by means of at least one transfer roller. This transfer roller is rotatable about its axis and may apply the water barrier agent onto the side edge(s) and/or bevel(s) and/or other parts of the substrate to be treated with the water barrier agent. The transfer roller may for example pick up the water barrier agent by rotating in a bath containing the water barrier agent. Additionally or alternatively, the water barrier agent may be applied by means of a vacuum technique, for example as described in DE9202976U.

It is imaginable that at least a fraction of the water barrier agent is printed, preferably digitally printed, onto the side edge(s) and/or bevel(s) and/or other parts of the substrate to be treated with the water barrier agent. This allows precise a positioning of the water barrier agent onto the substrate. This allows full covering with the water barrier agent at location on the substrate where this would be desired, while remaining portions, where the water barrier agent is not needed could remain free of water barrier agent. Moreover, by printing the water barrier agent, wastage of water barrier agent can be reduced. In case of printing, the water barrier agent forms a constituent of an ink composition used for printing. Hence, in this embodiment the ink composition used for printing the water barrier agent comprises at least one water barrier agent and/or is formed by at least one printable water barrier agent. This ink composition may comprise at least one colourant, such as a pigment, to provide colour to the ink composition, which can be used to locally colour the substrate, for example at one or more bevel(s) (chamfers) and/or grout lines of the substrate. In this manner, the bevels and/or grout lines may be given a desired colour during manufacturing, which colour is still visible in the eventual decorative floor board. Optionally, after applying/printing the, preferably coloured, ink composition, the ink composition may be covered by at least one protective coating, which protective coating is preferably transparent or translucent. It is imaginable that the water barrier agent applied onto the bevel(s) and/or any other substrate part(s) is configured to act as coating, in particular water impermeable coating, optionally provided with a colour of choice. Preferably, the protective coating is water impermeable. A part of the protective coating may be applied to the (substantially vertical) side of the substrate to also cover and therefore protect the side edges (corners) of the bevels. The protective coating may be applied in liquid state and cured, preferably UV cured, afterwards. Optionally, said protective coating is applied onto the printed ink composition when the ink composition is still at least partially in liquid state, after which during a curing step, both the ink composition and the protective coating are collectively cured at least partially. It is also imaginable that said protective coating is applied in liquid state onto the printed ink composition when the ink composition is dry and/or cured, after which during a curing step, the protective coating is cured at least partially. It is imaginable that the ink composition used to print the water barrier agent onto the substrate, in particular onto one or more bevels of the substrate, is configured to act as primer layer to facilitate and/or improve adhesion of said at least one protective coating applied on top. Alternatively or additionally, the coating is not applied in liquid state, but is applied in solid state, for example by means of transfer printing.

As mentioned above, the floor board has at at least on one pair of edges a lower edge region in the top surface, preferably in the form of a straight or curved bevel (chamfer). Preferably, this bevel is a so-called pressed—in bevel, more preferably obtained during a same pressing operation with which decorative surface layer is applied onto the substrate. During this pressing action and/or during bevel formation, the bevel may at least partially be covered by the decorative surface layer or may be left uncovered by the decorative surface layer. This latter embodiment allows efficient impregnation of the bevels as well to provide the bevel with a different appearance, such as a different colour. A pressed bevel has as an additional advantage that the density will be increased during the pressing action, which as such normally improves the moisture resistance of the bevel, and by additionally treating the bevel with at least one water barrier agent and optionally at least one protective coating, the moisture resistance of the bevels is further increased and improved.

Preferably, at least one water barrier agent is chosen from the group consisting of: polyurea, polyurethane, at least one silicone, in particular at least one organopolysiloxane (silicone), a hydrophobic polymer with an aliphatic hydrocarbon group, preferably with between 6 and 34 carbon atoms, at least one acrylate, at least one alkyd resin, an alkyd modified with polyurethane, an alkyd modified with fluorine, an epoxy resin, such as a fluorinated epoxy resin, a styrene butadiene copolymer, and combinations of two or more of these water barrier agents. In case an acylate is used, this may, for example be, an acrylate, a methacrylate, a fluorinated acrylate, a fluorinated methacrylate, a fluorinated acrylate copolymer, a (per)fluoroalkyl (meth)acrylate or a (per)fluoroalky (meth)acrylate copolymer, a styrene acrylate, a urethane acrylate when using a (per)fluoroalkyl (meth)acrylate or a (per)fluoroalky (meth)acrylate copolymer. The fluorinated side chains, if applied, preferably comprise four, five or six carbon atoms that comprise fluorine atoms and/or preferably at least some of the fluorinated side groups are based on perfluorobutane sulphonic acid.

Typically, the water barrier is applied in liquid state and/or solvent-based state. The solvent preferably comprises at least one constituent chosen from the group consisting of: water, glycol ether, propylene glycol methyl ether, propylene glycol methyl ether acetate, hydrocarbons, preferably aliphatic hydrocarbons and/or preferably isohydrocarbons, butyl acetate, propyl acetate—for example 3-methoxy-3-methyl-Ibutyl acetate (MMB-AC) or 1-methoxy-propyl acetate (MPA), a dibasic ester, a glycol diether, a benzoate ester, and/or a tetramethoxy-ether. For safety reasons, the solvent preferably has a flash point above 30° C., more preferably above 35° C., even more preferably above 55° C., most preferably above 60° C.

Additionally or alternatively, the water barrier agent preferably comprises at least one hydrophobic polymer, at least one hydrophobic polycarbodiimide, and/or at least one hydrophobic polyurethane or at least one hydrophobic acrylate polymer. Preferably, the hydrophobic polymer comprises an aliphatic hydrocarbon group, preferably with between 6 and 40 carbon atoms. Preferably the hydrocarbon group comprises at least 8 carbon atoms, even more preferably at least 10 carbon atoms, and most preferably at least 12 carbon atoms. Also preferably, the hydrocarbon group comprises at most 30 carbon atoms, even more preferably at most 28 carbon atoms, and most preferably at most 26 carbon atoms. Thus, the hydrocarbon group may comprise for example 12 carbon atoms, 16 carbon atoms, for example a hexadecyl group ($C_{16}H_{33}$), 18 carbon atoms, for example an octadecyl group ($C_{18}H_{37}$), or 22 carbon atoms. It is possible to use one type of hydrophobic polymers comprising at least one, two or more aliphatic hydrocarbon groups, wherein these aliphatic hydrocarbon groups preferably comprise between 6 and 40 carbon atoms. Thus, it is possible for example to use only a hydrophobic polycarbodiimide with at least one, two or more aliphatic hydrocarbon groups. It is also possible to use several types of hydrophobic polymers, for example mixtures comprising hydrophobic polycarbodiimides and hydrophobic acrylate polymers. A hydrocarbon group may also be indicated with the term 'hydrocarbon group'. An aliphatic hydrocarbon group indicates a nonaromatic hydrocarbon group. Preferably, a hydrocarbon group indicates a group with exclusively hydrogen (H) and carbon (C). However, halogenated hydrocarbon groups, with for example one, two or more fluorine atoms, are also possible. At least one hydrocarbon chain may be a linear chain. At least one hydrocarbon chain may be a branched chain. If applied, the aliphatic hydrocarbon group may be a cycloaliphatic hydrocarbon group (alicyclic hydrocarbon group).

In case at least one hydrophobic polymer is used as water barrier agent or as part of said water barrier agent, said hydrophobic polymer is preferably selected from the group comprising: a hydrophobic polyurethane, a hydrophobic acrylate, a hydrophobic vinyl acetate, a hydrophobic alkyd, a hydrophobic methacrylate, a hydrophobic polyester resin, a hydrophobic hybrid alkyd-acrylic resin, a hydrophobic hybrid polyurethane-acrylic resin, a long oil low-viscosity alkyd resin based on drying vegetable fatty acids, a hydrophobic polycarbodiimide or a hydrophobic polyvinyl alcohol. The hydrophobic polymer may be a hydrophobic polymer consisting of 3 to 10 units. The aliphatic hydrocarbon group may form part of an acrylate group or a methacrylate group. It is imaginable that the hydrophobic polymer is a hydrophobic polyurethane comprising between 2 and 12 acrylate groups and/or methacrylate groups, wherein these acrylate groups and/or methacrylate groups each comprise aliphatic hydrocarbon groups, which are or are not different from each other and preferably with between 2 and 40 carbon atoms, wherein preferably at least one of these aliphatic hydrocarbon groups comprises at least 8 carbon atoms. The hydrophobic polymer may be free from fluorine atoms. Preferably, the hydrophobic polymer forms part of a mixture that is completely free from fluorine atoms. Embodiments wherein the mixture comprises a limited amount of fluorine, being for example less than 1 percent by weight (1 wt %) of fluorine, preferably less than 0.5 wt %, even more preferably less than 0.1 wt % or even less than 0.01 wt %, are also possible. Fluorine may be in the form of organic or inorganic fluorine-containing compounds. The hydrophobic polymer may be a silicon-containing compound, such as a siloxane, a silicone or a silane, such as an organosilane, for example a silane comprising for example a hexadecyl group and/or an alkoxysilane. The hydrophobic polymer may be a hydrophobic polycarbodiimide derived from a carbodiimidization reaction (being a reaction that forms (N=C=N) groups) of a carbodiimidization reaction mixture that comprises at least one oligomer, wherein said oligomer comprises at least one (usually one) isocyanate end group and at least two repeating units, wherein each of the at least two repeating units has at least one (typically one) hydrocarbon group that comprises at least 4 carbon atoms (and in certain embodiments up to 60 carbon atoms or up to 30 carbon atoms). The hydrophobic polycarbodiimide may be derived from a carbodiimidization reaction of a carbodiimidization reaction mixture comprising 4,4'-methylenebis (phenylisocyanate) and an acrylate oligomer in a molar ratio from 2:1 to 10:1, the acrylate oligomer prepared by reaction of an oligomerization reaction mixture that contains mercaptoethanol and octadecyl acrylate in a molar ratio from 1:4 to 1:20, or an oligomerization reaction mixture that comprises mercaptoethanol and a reaction product of octadecyl isocyanate with 2-hydroxyethyl (meth)acrylate or octadecyl isocyanate with 2-isocyanatoethyl (meth)acrylate, wherein the mercaptoethanol and the reaction product are converted in a molar ratio from 1:4 to 1:20. It is imaginable that said hydrophobic polycarbodiimide is derived from dehydrodesulfurization of ureas, such as thioureas and/or from a carbodiimidization reaction of isocyanates. Here, "oligomers" preferably means compounds with at least 2 and up to 20 repeating units. According to a certain embodiment, the oligomer has 3 to 15 repeating units. According to another embodiment, the oligomer has 4 to 15 repeating units. In certain embodiments an oligomer has an average molecular weight up to 50 000 g/mol. These oligomers may also be called polymers, for example short polymers.

It is possible to use one type of hydrophobic polymer with an aliphatic hydrocarbon group with between 6 and 40 carbon atoms. However, it is also possible to use two or more types of hydrophobic polymers each with at least one aliphatic hydrocarbon group with between 6 and 40 carbon atoms. Thus, it may for example be selected from a combination of two or more of the following hydrophobic polymers: hydrophobic polyurethanes, hydrophobic acrylates, hydrophobic vinyl acetates, hydrophobic alkyd, hydrophobic silicon-containing compounds, a hydrophobic methacrylate, a hydrophobic polyester resin, a hydrophobic hybrid alkyd-acrylic resin, hydrophobic polycarbodiimides or a hydrophobic hybrid polyurethane-acrylic resin. It is also possible to use two or more hydrophobic polymers of the same type, but that differ from each other. Thus, it is possible to use hydrophobic polyurethanes comprising different hydrocarbon groups.

The aforesaid aliphatic hydrocarbon group or aliphatic hydrocarbon groups of the hydrophobic polymer will, after the hydrophobic polymer has been applied on a decorative panel, preferably be directed away from the panel, for example be directed outwards, and thus ensure water-repellent/water-resistant properties of the decorative panel. The more carbon atoms the aliphatic hydrocarbon group comprises, the greater are the water-repellent properties. These hydrophobic polymers ensure that water cannot pass through the seams between panels and/or they ensure that water cannot penetrate into porous components of the panel. The water-repellent/water-resistant properties are obtained without the need for fluorine atoms. These aliphatic hydrocarbon groups do not have any negative effect on the environment and human health. Thus, they are not persistent in the environment and do not give rise to bioaccumulation. Hydrophobic polymers comprising one or more aliphatic hydrocarbon groups with 8, 12, 16, 18 or 22 carbon atoms have good moldability. The hydrophobic polymer can bond directly or indirectly to a decorative panel, for example with the edges or some other surface of the decorative panel. In a specific embodiment, a said aliphatic hydrocarbon group is a linear aliphatic hydrocarbon chain preferably with the formula $C_nH_{2n+1}$ where n is between 6 and 40. These linear hydrocarbon chains are normally directed linearly away from the decorative panel and so are very well able to repel water, without several aliphatic hydrocarbon chains for example causing steric hindrance to each other. In this way, the quantity of hydrophobic polymers that is used to attain the necessary water resistance/water repellency may be limited. In a specific embodiment, the hydrophobic polymer comprises two or more said linear aliphatic hydrocarbon chains, wherein these linear aliphatic hydrocarbon chains are or are not different. In a much preferred embodiment, the hydrophobic polymer is free from fluorine atoms. much preferred embodiment, paraffin, such as paraffin wax, is also present in the mixture and preferably the mass ratio of (hydrophobic polymer, such as polycarbodiimide, +paraffin) to (the aforementioned polymer selected from alkyd resins, acrylate resins, polyurethane modified polyesters, silanes, siloxanes or mixtures thereof) is 10:90 to 90:10, preferably 70:30 to 95:5. Preferably, the hydrophobic polymer forms part of a solvent-based mixture, or alternatively a water-based mixture.

Optionally, the water barrier agent comprises one or more additives, such as one or more additives for example selected from surface-active substances, antifreeze agents, coagulating agents, cosolvents, emulsifiers or stabilizers, drying agents, catalysts, colourants, and biocides (antimicrobial agents) against one or more microorganisms.

In a preferred embodiment, the water barrier agent comprises a mixture of MDI (methylene diphenyl di-isocyanate) and at least one fluorocopolymer. Preferably per 100 parts of MDI, less than 20 parts of fluorocopolymer are applied in said mixture, or even less than 10 or less than 5 parts. Fluorocopolymer tends to fill areas of the MDF/HDF that are untreated by the MDI. According to a variant of this special embodiment firstly an water barrier agent is applied mainly comprising MDI and possibly a solvent, and subsequently an impregnation agent is applied mainly comprising fluorocopolymer and possibly a solvent, wherein preferably the fluorocopolymer is available in a dose lower than 20 parts per 100 parts of solvents. According to this variant the subsequent treatment is able to better fill the areas untreated by the MDI, since it will be attracted in a more efficient way to such areas after the MDI has already been impregnated into the 60 MDF/HDF material at least to some extent. Said solvent may, for example, comprise or be formed by a butylacetate or propylacetate, such as 3-methoxy-3-Methyl-1-butylacetate (MMBAC) or 1-methoxy-propylacetate (MPA), a dibasic ester, a glycol diether, such as dipropylene glycol dimethyl ether, a benzoate ester, a diphenylmethane or diphenylethane, such as butyl diphenyl methane and/or butyl diphenyl ethane, or, a tetramethoxyether. It has been found that the use of a non-water solvent leads to deeper penetration of the water barrier agent into the side edge of the floor boards substrate. The above listed solvents also possess a high flash point, there by making it safe to be used in an industrial environment. When the flash point is considered less important, one may use acetone or ethyl acetate as well.

As indicated above, it is imaginable that the water barrier agent comprises at least one super absorbing material. Preferably, said super absorbing material comprises crystals of sodium polyacrylate (SPA). Such crystals may be very small, e.g., with a mean particle diameter of less than 150 micron, preferably less than 100 micron in not-swollen condition, such that that they hardly interfere with the joint geometry, such as a joint geometry with mechanical coupling parts. Preferably the mean particle size is 5 micron or more such that they are prevented from entering the interstices between the fibers of the MDF/HDF material. According to another example said particles of absorbing material may relate to particles of bentonite clay, amorphous silica or fuller earth, such as palygorskite and/or attapulgite. Preferably, the super absorbing materials may be applied in a step separate from the step of applying at least one water barrier agent, such as an impregnation agent. Especially in the case the impregnation agent is an MDI, this may prove beneficial, since the super absorbing material, particularly SPA, tends to increase the viscosity of the MDI-SPA mixture, thereby leading to a less deep penetration of the impregnation agent. Preferably, the super absorbing materials, e.g., the above-mentioned SPA crystals, are applied in a liquid dispersion, or by means of powder coating or sprinkling operations.

It another preferred embodiment, at least one side edge, such as the first side edge, of the substrate, is provided with a first reactant, and at least one other side edge, such as the second side edge, of the substrate, is provided with a second reactant, wherein the first reactant and second reactant are configured to react with each other upon contact during and/or after coupling of said side edges of adjacent floor boards to consequently form a water barrier agent in between said floor boards. The first reactant may for example comprise at least one isocyanate and wherein the second reactant may for example comprise at least one polyol and/or at least one multifunctional amine. This allows formation of the water barrier agent during and/or after coupling of adjacent floor boards. The water barrier agent formed by a chemical reaction this way may additionally lead to additional fixation of the interconnected floor boards, as the water barrier agent may e.g. also act as adhesive. Compared to solventborne water barrier agents, this plural (reactive) component approach, also referred as 2K, may have significant advantages, like relatively low energy costs, a relatively short process time, a relatively low (or even free of any) volatile organic compound (VOC) content, and the availability of high quality chemistries.

In another preferred embodiment, at least one side edge, such as the first side edge and/or the second side edge, of the substrate, preferably each side edge of the substrate, is provided with a water impermeable coating. This coating may be or comprise, for example, at least one coating selected from the group consisting of: a silicone coating, an epoxy coating, a rubber coating, an acrylic coating, a polyurea coating, a polyurethane coating, in particular a thermosetting polyurethane coating, and a hydrophobic coating. The coating may a chemical reaction product directly formed onto the side edge after application of the chemical reactants needed to form this coating. For example, in case of a polyurea coating, this coating is preferably is prepared through a chemical reaction between an isocyanate component and a resin blend component which preferably at least partially takes place when applied on the side edge(s). The reaction is typically carried out using specialized spray equipment, allowing for a fast and seamless application. Here, the isocyanate component is typically a diisocyanate, which is a compound containing two isocyanate functional groups. Common examples include diphenylmethane diisocyanate (MDI) and hexamethylene diisocyanate (HDI).

The resin blend component consists of a combination of amine-terminated or hydroxyl-terminated components. These components react with the isocyanate to form the polyurea polymer. And in case of a thermosetting polyurethane coating, the reactants to form such coating include polyols, isocyanates, and crosslinking agents. Polyols are compounds with hydroxyl (OH) groups, and isocyanates have isocyanate (NCO) groups, while the crosslinking agent often contains multiple functional groups, such as hydroxyl or amine groups. The polyols and isocyanates are mixed to form a pre-polymer. This mixture can be further combined with crosslinking agents. The reaction between polyols and isocyanates results in the formation of urethane linkages, and creates a three-dimensional network of crosslinked polyurethane, leading to the thermosetting behaviour of the coating. In case of these coatings formed by a chemical reaction, it is imaginable to premix two (or more) components (reactants) prior to application the components onto the side (edges) and/or to the sequentially apply two (or more) components (reactants) to the side edge(s) prior to application. At least a major part of the chemical reaction may be finalized within seconds, even within one second. Dependent on the ratio of the components and/or the application method used, a surface of the coating may be relatively smooth or relatively coarse. A smooth coating surface typically facilitates the coupling process between adjacent decorative boards at their side edges, which is typically preferred. A more coarse coating surface may also be preferable in case facing and typically engaging coatings applied onto interlocking side edges of different floorboards should form a water barrier and/or water labyrinth in between said coatings to inhibit water penetration in a seam formed in between interconnected floorboards. The water impermeable coating may cover the entire side edge or merely a part thereof. Additionally or alternatively, the water impermeable coating may at least partially cover a bevel and/or grout line of at least one side edge and/or connecting to at least one side edge. Additionally or alternatively, the water impermeable coating may cover another part of the substrate (other than the side edge(s)).

It may be favourable that the substrate is a plasma treated substrate. This means that at least a part of the substrate, such as one or more side edges, of the substrate, and/or another substrate surface is/are subjected to a plasma treatment to improve the adhesion and performance of impregnation agents and coatings on the substrate and/or to improve the antibacterial and waterproof properties of the substrate. The plasma treatment can be used either to increase hydrophilicity and wettability for enhanced adhesion of impregnation agents and/or coatings and/or to increase hydrophobicity of the substrate as a protective measure. This could be in particularly advantageous in case of wood based substrates, such as MDF or HDF substrates. Although the plasma treatment can be carried out in a vacuum environment, it is commonly more preferred from a practical, logistic, and economic point of view that the plasma treatment is carried out at atmospheric pressure. For example, plasma treatment at atmospheric pressure using a dielectric barrier discharge can be carried out to increase the surface hydrophilicity of the, preferably wood based substrate. Contact angle measurement typically shows an increase in the polar component of surface energy and in total surface energy following plasma treatment. Typically, the plasma treatment may also lead to the generation of polar groups and consequently an increase in oxygen-carbon ratio. This improves the wettability of the substrate which is in favour of a smooth application and good bonding of the water barrier agent applied afterwards. Additionally or alternatively, with plasma polymerization on wood based substrates at atmospheric pressure water-repellent characteristics of the substrate can be improved. For example, an atmospheric-pressure plasma jet using hexamethyldisiloxane and/or hexadecyltrimethoxysilane and/or perfluorooctyltriethoxysilane (and/or another silane) as precursor and air as process gas can be used for a thin-layer deposition. By means of atomic force microscopy it can be seen that this plasma treatment typically leads to a closed surface layer and/or coating consisting of (or comprising) silicon, oxygen, carbon and hydrogen that exhibited low water permeability. Optionally, the plasma is enriched with one or more additives, such as an antibacterial additives, in particular (nano) particles of titanium dioxide, to provide said surface layer or coating with antibacterial properties. A plasma device commonly comprises two electrodes of which one electrode is grounded and the other electrode is connected to an alternating high-voltage pulse generator, for example with a frequency of 17 kHz and a pulse length of 2 µs. The electrodes enclose a discharge gap, wherein a process gas (e.g. Argon loaded with a precursor, such as hexadecyltrimethoxysilane) is blown through the discharge gap towards the substrate. A typically distance between the substrate and the plasma device, in particular a plasma jet outlet opening, is preferably 1-4 mm. An increase in the power level of the plasma device leads to a decrease in water permeability of the substrate, wherein this power level is preferably at least 80 W, more preferably at least 90 W, and most preferably at least 100 W. An air to (hexadecyltrimethoxysilane-argon) ratio of between 7.5:1 and 12.5:1, preferably 10:1, commonly yields the best water impermeability of the substrate.

Instead of or in addition to using a plasma, the (nano) particles of titanium dioxide dispersed in a liquid, like hexadecyltrimethoxysilane, ethanol or a mixtures thereof, may also be applied by means of spraying, preferably high-pressure electric sprayer to evenly spray the antibacterial and waterproof reagent on the surface of the substrate to form a coating. This coating is preferably subsequently dried, for example by using a blast dryer at 70-100° C. for an appropriate period of time.

The plasma treatment of at least a part of a wood based substrate surface may also be used to etch cell walls of the wooden material, which increases the porosity, which may have positive effect on (hydrophobic) coating penetration in order to make the substrate more waterproof. For example, a water-vapor plasma pre-treatment typically improves the moisture-resistance of a solvent-borne polyurethane coating applied to a wood based substrate. The ability of plasma to etch pits (openings), and increase the porosity of the wood based surface plays a role here positively influencing the performance of a solvent-borne coating on plasma-modified wood based substrates.

Optionally, prior to treating at least a part of the substrate by plasma and/or spraying, the substrate is clean, preferably ultrasonically cleaned, for example by using ethanol to remove impurities. Preferably, the substrate is subsequently dried, for example by using a blast dryer, for further treatment.

In a preferred embodiment, at least one side edge of the substrate and/or at least one coupling part is at least partially treated with at least one friction reducing substance, which substance preferably comprises magnesium oxide and/or hydrated magnesium silicate, and may for example be formed and/or comprise serpentine (powder). Serpentine powder is derived from crushing and grinding natural rock-forming serpentine mineral. An ideal formula of serpentine is $Mg_6(Si_4O_{10})(OH)_8$, wherein it is noted that also derivates may be used, such as
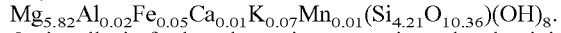
Optionally, in further alternative serpentines, the aluminium fraction and/or iron fraction and/or calcium fraction and/or potassium fraction and/or manganese fraction may be omitted, and/or the molar ratio of the above cited atoms (or oxides) may be different. Such a friction reducing substance allows the adjustment of the friction coefficient to a desirable level, in particular to facilitate coupling of the coupling parts of adjacent floor boards and to prevent damaging of the coupling parts during coupling. The friction reducing substate function as lubricant. Optionally, the friction reducing substrate may also act as water barrier agent.

Additionally or alternatively, it may be preferred that at least a part of at least one exposed (MDF/HDF) substrate surface, preferably side surface, is a heat seared surface, in particular a lasered surface and/or an ironed surface, and/or is provided with a heat seared skin, in particular ironed skin. This can for example be realized by means of a heated iron, e.g. at a temperature of about 180° C., which can be pressed against at least one side edge and/or at least one bevel of the substrate for a short period of time, typically between 1 and 8 seconds. This thermal treatment locally closes pores or other openings in the substrate surface, and often simultaneously eliminates the phenomenon of fiber erection. This leads to a closing, in particular, a sealing of the ironed substrate surface, which renders the water permeability more difficult and even impossible. Additionally or alternatively, a laser may be used to locally change the structure and/or chemical composition of a skin of the treated substrate surface, which results in a sealing (and/or searing) effect which renders moisture penetration more difficult.

Apart from locally (position-selectively) subjecting a MDF/HDF substrate to a thermal treatment, as discussed above, it is also imaginable that the entire substrate is subjected to a thermal treatment prior to affixing the surface decorative layer on top. To this end, the substrate can be compressed by means of a, preferably hydraulic press for a short period of time, typically between 5 and 10 minutes, during which the substrate is subjected to a heat treatment, typically at a temperature of between 17° and 250° C. Above 250° C., the urea-formaldehyde adhesive optionally used in the MDF/HDF substrate may degrade, which is undesired. The dimensional stability and waterproofness (moisture resistance) of MDF can significantly be improved this way, in particular in case the substrate is thermally post-treated (after the manufacturing of the board and prior to the application of the decorative surface layer) at a temperature of approximately 225° C. during a time period of approximately 10 minutes.

In a preferred embodiment, a top section and/or a bottom section of the substrate comprises melamine, and wherein a centre section (as seen in vertical direction of the substrate) is preferably free of melamine. Preferably the bevel(s) of the substrate, if applied, are free of melamine. Preferably, the top section of the substrate comprises melamine in a middle portion, and water barrier agent at peripheral edge portion, preferably where one or more bevels are located. The water barrier agent may form an interface with the melamine within the substrate. In case of a rectangular panel, and seen from a top view, the top section of the substrate would comprise a circumferential edge with water barrier agent enclosing a middle portion with melamine. The melamine also contributes to the water impermeability of the substrate and typically also improves the mechanical properties and/or dimensional stability of the substrate.

The floor board according to the invention typically has a rectangular or parallelogrammatic shape (as seen from a top view). Preferably, the floor board is oblong, although square panels are also imaginable.

Preferably, the substrate is at least partially made of at least one MDF (or HDF) layer, wherein a majority of the wood fibers of the MDF material is oriented (aligned). This can for example be realized by applying an electric field during manufacturing of the substrate and/or by physical manipulation during manufacturing of the substrate. The realization of fiber oriented MDF or HDF substrate is known as such and is often abbreviates as oriented MDF or oriented HDF. In MDF (and HDF), fiber orientation is mainly horizontal, with in-plane orientations. These in-plane orientation can be random orientations or partially aligned orientations. As wood fibers tend to swell in transversal direction rather than in longitudinal direction upon absorption of moisture, it is preferred for oblong substrate (and oblong floor boards) that the pair of long edges, preferably provided with the first and second coupling part, runs in a direction which is substantially perpendicular to the orientation of the majority of the wood fibers in the substrate and/or runs in a direction which is substantially perpendicular to a dominant longitudinal axis of the wood fibers of the substrate. As the long sides of the floor boards are, due to their length, typically most vulnerable for visible swelling, this orientation of the long edges with respect to the average or dominant fiber orientation is preferred. Preferably, the in-plane fiber orientation is such that the fraction of fibers extending in x direction ($a_x$) and the fraction of fibers extending in y direction ($a_y$) comply with the ratio $a_x:a_y>1$, wherein x represents an x direction which is preferably perpendicular to one pair of side edges, in particular the pair of long side edges, and wherein y represents a y direction which is preferably perpendicular to another pair of side edges, in particular the pair of short side edges. Preferably, the fraction of fibers ($a_z$) extending in transversal direction (z direction or vertical direction) is significantly smaller than the fraction of fibers which are oriented in-plane. Preferably $a_z$ is preferably smaller than $a_y$ (and hence also preferably smaller than $a_x$).

In a preferred embodiment, the substrate comprises a plurality of substrate layers. Different substrate layers may have a different material composition. It is imaginable that at least two substrate layer have the same composition. In case of an MDF (or HDF) based substrate, it may be preferred that the substrate comprises at least two MDF based substrate layers and at least one intermediate layer positioned in between adjacent MDF based substrate layers. Said intermediate layer is preferably a reinforcement layer. This reinforcement layer preferably has an open structure (mesh or net like structure) to allow adhesive, such as UF glue, to penetrate through said reinforcement layer to chemically bond (glue) adjacent MDF based substrate layers. The reinforcement layer may, for example, be a net, a woven, or a non-woven layer. The intermediate layer may e.g. be at least partially composed of at least one of the following materials: metal, such as aluminium and/or stainless steel, rubber, a synthetic material, glass, in particular glass fibers, carbon, in particular carbon fibers, flax, a natural material, textile, in particular natural fibers, and/or graphite. It may be preferred that at least one intermediate layer, in particular the reinforcement layer, is embedded in an epoxy resin or other resin prior to manufacturing of the substrate. This allows a better bonding between the intermediate layer and adjacent substrate layers. Preferably, at least one reinforcement layer is positioned in an upper half of the substrate's thickness. More preferably, at least one reinforcement layer is placed at a location from an upper side of the substrate which equals to 10 to 40% of the substrate's thickness. Preferably, the substrate comprises a top, preferably MDF based, substrate layer, and a bottom, preferably MDF based, substrate layer, and optionally a centre, preferably MDF based, substrate layer. Preferably, the thickness of the top substrate layer (which may e.g. be 2 to 4 mm) is smaller than the thickness of the sum of the one or more substrate layers positioned underneath said top substrate layer. The reinforcement layer will strengthen the substrate and may prevent that the substrate will deform upon moisture absorption in an upward direction. It is imaginable that at least one side of the top substrate layer is treated with at least one water barrier agent. It is imaginable and it may even be preferred that one or more substrate layers, preferably MDF based substrate layers, positioned underneath the substrate layer are not treated with a water barrier agent. This not only saves water barrier agent, but normally it would be sufficient to only treat the upper substrate layer to make adjacently installed, preferably interconnected, floor boards sufficiently waterproof. And even in case an excess of water seeps through the seam (the joint) formed in between adjacently installed, preferably interconnected, and would come in contact with a lower MDF based substrate layer, a possible swelling of this lower substrate layer at one or more edges will predominantly be in an in-plane direction (hence within a plane defined by the floor boards) due to the presence of at least one reinforcement layer positioned above said lower substrate layer. This swelling is normally not visible at the top surfaces of the floor boards, and moreover an in-plane swelling may further close and even seal the joined formed in between adjacent floor boards, thereby creating an additional water barrier in between said floor boards. Hence, by applying at least one reinforcement layer, the swelling direction of the lower substrate layer(s) can be controlled to some extent and normally to sufficient extent. The natural creation of an additional water barrier in between adjacent floor boards due to a permitted swelling of a portions of the side edges of said floor boards in a direction towards each other may be advantageous and may, in addition to or instead of the use of at least one reinforcement, also be achieved other ways, for example by treating a portion of a side edge of the substrate with at least one water barrier agent, while leaving within said portion at least one strip untreated with said water barrier agent. Upon contact with water, the treated part(s) of said portion will practically not swell, while the untreated part of said portion will likely swell and may create an additional water barrier in between adjacent floor boards. Said portion may be a vertical portion, but may also be an otherwise shaped portion, wherein, for example, the untreated part of said portion is inclined and/or extends more compared to the treated parts of said portion. This allows to control the swelling direction of the untreated part of the side edge of the substrate to form said water barrier in between adjacent floor boards. This water barrier formation due to local swelling of substrate material may be combined with the application of one or more super absorbing materials, wherein this super absorbing material may e.g. be applied on (at least a part of) the untreated part of at least one side edge of the substrate.

In a preferred embodiment, at least one backing layer, in particular a (counter) balancing layer and/or a sound-dampening layer, is applied to a bottom surface of the substrate. This backing layer may be a synthetic layer, e.g. composed of thermoplastic material, and/or may comprise a paper sheet impregnated with thermosetting resin. Other backing layers, such as a cork-based backing layer or rubber backing layer may also be applied.

As indicated above extensively, the substrate may comprises MDF or HDF. However, additionally or alternatively, the substrate may comprises one or more other materials. The substrate may, for example, comprise magnesium oxide (MgO) or other mineral-based materials. Also one or more edges of substrate at least partially composed of one or more of these materials may be treated by one or more water barrier agents. Examples of other mineral-based substrates are for example gypsum-based substrates, cement-based substrates, etc. Additionally or alternatively it is imaginable that the substrate comprises at least one thermoplastic material, such as polypropylene (PP), polyurethane (PU), thermoplastic polyurethane (TPU), polystyrene (PS), polyethylene (PE), polyethylene terephthalate (PET), and/or polyvinyl chloride (PVC), polylactic acid (PLA), and/or polyvinyl butyral (PVB). In case one or more of these thermoplastic materials is/are used for manufacturing the substrate, this thermoplastic material may be virgin, recycled, or a mixture thereof.

The overall thickness of the substrate may vary, wherein the thickness is preferably between 5 and 12 millimetre, and even better between 6.5 and 9.5 millimetre.

As indicated above, the floor board according to the invention may be used and/or may be configured as wall board, and/or ceiling board, and/or furniture board.

The invention also relates to a floor board covering consisting of a plurality of, preferably interconnected, floor boards according to the invention.

The invention further relates to a method for manufacturing a floor board according to the invention, comprising the steps of:

A. providing a substrate, wherein the substrate optionally comprises MDF and/or HDF material and/or wood, B. affixing, directly or indirectly a decorative surface layer on top of said substrate, wherein said decorative surface optionally comprises a plurality of sublayers;

C. optionally profiling at least a first substrate edge and a second substrate edge to form a first coupling part and a second coupling part, respectively, D, wherein at least one edge, preferably at least one side edge, of the substrate is treated with at least one water barrier agent, wherein said water barrier agent is preferably water impermeable and/or moisture-repellent, and/or wherein at least a part of at least one edge, preferably at least one side edge, of the substrate is subjected to a thermal searing or ironing step to sear said edge at least partially.

Various embodiments of the method have been described above and will be described below.

FIG. 1 schematically shows a floor board 1 according to the present invention. The floor board 1 comprises a substrate 2 or a core layer. On the upper side of the substrate 2, the floor board 1 comprises a decorative surface layer 7. The shown floor board 1 is of a substantially rectangular shape, however other shapes are also imaginable. The floor board 1 has a length extending longitudinally along line B-B, and a width extending transversally along line A-A. The plane of the floor board is hence determined by the combination of lines A-A and B-B. The floor board 1 comprises four side edges 3, 4, 5, 6. A first pair of opposite side edges 3, 4 is formed by a first side edge 3 and a second side edge 4 opposite thereto. The first side edge 3 is provided with a first coupling part 30 and the second side edge 4 is provided with a second coupling part 40. The first 30 and second coupling parts 40 allow similar floor boards to be coupled at the respective side edges 3,4. The floor board 1 further comprises a second pair of opposite side edges 5, 6 formed by a third side edge 5 and a fourth side edge 6 opposite thereto. The third side edge 5 is provided with a third coupling part 70 and the fourth side edge 6 is provided with a fourth coupling part 60. The third 70 and fourth coupling parts 60 allow similar floor boards to be coupled at the respective side edges 5, 6.

Figure 2:
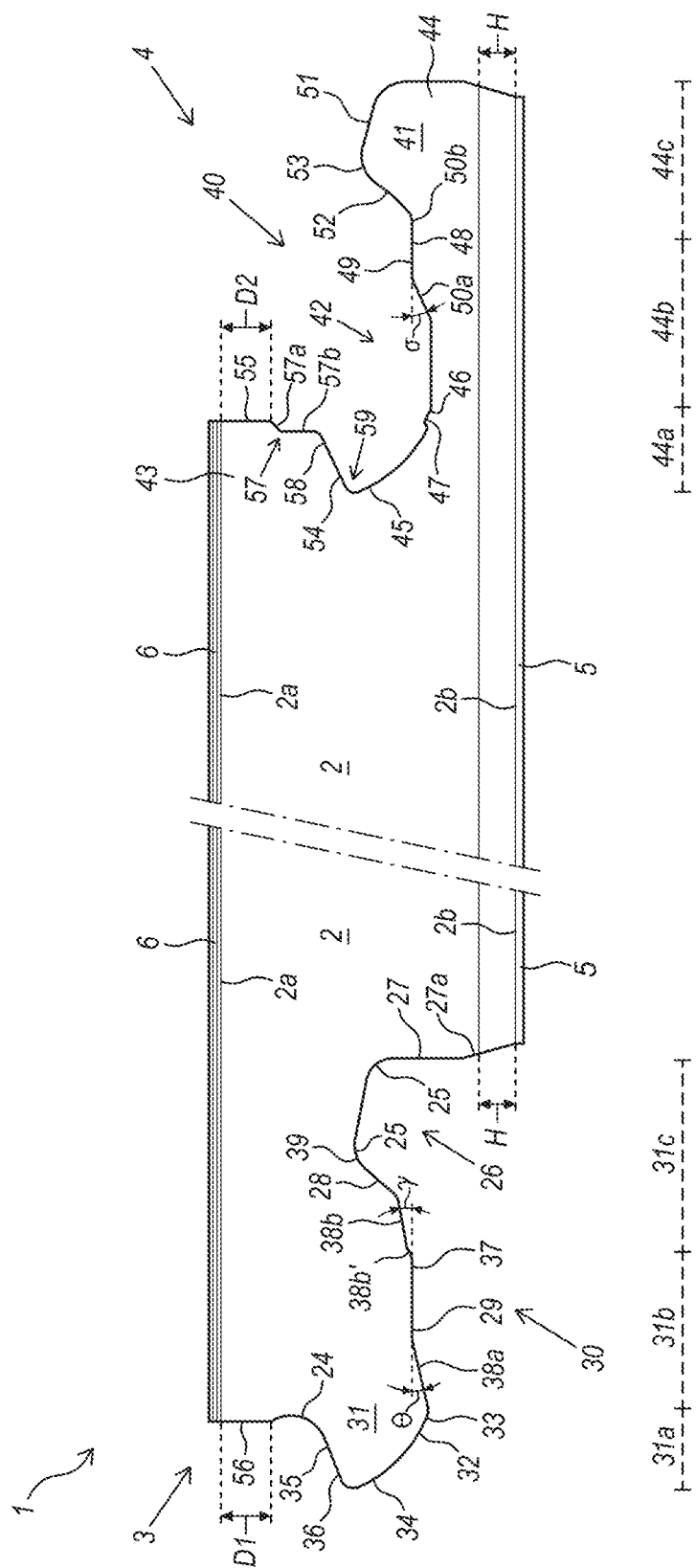
FIG. 2 schematically shows a transversal cross-section along line A-A in FIG. 1, of respective side edges.

FIG. 2 schematically shows a transversal cross-section along line A-A in FIG. 1, of respective side edges 3, 4. The shown floor board 1 comprises a substrate 2 comprising an upper side 2a or top surface and a lower side 2b or bottom surface. A decorative surface layer 7 is, directly or indirectly, affixed to the upper side 2a of the substrate 2. The decorative surface layer 7 may have a laminated structure, for example comprising a printed layer and/or at least one protective (top) layer covering the printed layer and/or the decorative surface layer 7. The floor board 1 may further comprise a backing layer 5 which is, directly or indirectly, affixed to the lower side 2b of the substrate 2. The thickness of the substrate 2 may be adjustable, for example by adding or removing a thickness H to or from the substrate 2 of the floor board 1. FIG. 2 shows on the left a transversal cross-section of the first coupling part 30 at the first side edge 3 is shown. On the right, a transversal cross-section of the second coupling part 40 at the second side edge 4 is shown.

The first coupling part 30 comprises a sideward tongue 31 and a top side surface 56. The top side surface 56 is located above the sideward tongue 31. The top side surface 56 may be substantially planar. In the shown embodiment, the top side surface 56 extends in a substantially vertical direction. Between the top side surface 56 and the sideward tongue 31, the shown first coupling part 30 comprises an indentation 24. The shown indentation 24 forms a transition between the top side surface 56 and the sideward tongue 31. The shown indentation 24 is curved, in particular circularly shaped. The sideward tongue 31 comprises a front section 31a, a rear section 31c, and a middle section 31b situated in between said front section 31a and said rear section 31c. The shown distribution of the different sections 31a-31c of the sideward tongue 31 may be shifted along the transversal direction of the sideward tongue 31. It is imaginable that the different sections 31a-31c overlap, in particular that the front section 31a and/or that the rear section 31c overlap with the middle section 31b.

The front section 31a comprises a bottom surface 33 and a side surface 34. In the shown embodiment, the side surface 34 is at least partially curved. Preferably, the radius of curved part of the side surface 34 is larger than the radius of the indentation 24. The bottom surface 33 defines a front downward tongue contact portion 32. The front section 31a of the sideward tongue 31 further comprises a top surface 35. The top surface 35 is at least partially inclined downwardly in a direction away from the middle section 31b and the rear section 31c. The top surface 35 further defines a front upward tongue contact portion 36. The middle section 31b comprises a bottom surface 29. The bottom surface 29 defines a middle downward tongue portion contact portion 37 located between adjacent inactive portions 38a, 38b of the middle section 31b of the sideward tongue 31. The shown middle downward tongue contact portion 37 is at least partially planar, preferably the middle downward tongue contact portion 37 is substantially planar and may extend in horizontal direction or transversal direction of the sideward tongue 31. The adjacent inactive portions 38a, 38b are at least partially upwardly inclined in a direction away from the front section 31a. Preferably, a first upwardly inactive portion 38a is upwardly inclined towards the middle downward tongue contact portion 37. In the shown embodiment, the middle downward tongue contact portion 37 and (at least a part of) the first adjacent inactive portion 38a form a first angle θ. The first angle θ may be between 5-15 degrees, preferably 10-15 degrees, more preferably 12 degrees. Preferably, a second upwardly inactive portion 38b is upwardly inclined in a direction away from the middle section 31b or in a direction away from the middle downward contact portion 37. In the shown embodiment, the middle downward tongue contact portion 37 and (at least a part of) the second adjacent inactive portion 38b form a second angle γ. The second angle γ may be between 5-15 degrees, preferably 8-12 degrees, more preferably 10 degrees. The shown second inactive portion 38b further comprises a kinked portion 38b'.

The rear section 31c comprises a bottom surface 28 and a side surface 27. The shown bottom surface 28 of the rear section 31c is at least partially upwardly inclined in a direction away from the middle section 31b and the front section 31a. The inclined part of the bottom surface 28 defines a rear downward tongue contact portion 39. It is imaginable, in another embodiment, that (also) the side surface 27 of the rear section 31c is at least partially upwardly inclined in a direction away from the middle section 31b and front section 31a. The rear section 31c further comprises an accommodation space 26 configured to accommodate an upwardly protruding locking element 41 of a second coupling part 40 of a further floor board. Preferably, the bottom surface 28 and/or (a lower) side surface 27 comprise a curved transition 25. In the shown embodiment, the accommodation space 26 is provided with two curved transitions 25. In the shown embodiment, the curved transitions 25 are circularly shaped. However, the curved transitions 25 may have a different shape. The curved transitions 25 may have the same radius. It is, however, also imaginable that radius of the curved transitions 25 differ from each other. The (lower) side surface 27 may comprise a lowest side surface 27a that is at least partially downwardly inclined in a direction away from the middle section 31b and front section 31a. It is imaginable that the lowest side surface 27a is located beyond the rear section 31c of the sideward tongue 31.

The second coupling part 40 comprises a recess 42 configured to accommodate at least a part of the sideward tongue 31 of a further floor board. The recess 42 is defined by an upper lip 43 and a lower lip 44. In the shown embodiment, the second coupling part 40 comprises a transition 57 between a bottom surface 58 of the upper lip 43 and a side surface 55 of the upper lip 43. The shown transition 57 comprises two parts 57a, 57b. Wherein a first transition part 57a is at least partially upwardly inclined in a direction towards the middle section 44b and/or rear section 44c of the lower lip 44. The second transition part 57b extends in a substantially vertical direction. The lower lip 44 extends beyond the upper lip 43. The lower lip 44 comprises a front section 44a, a rear section 44c, and a middle section 44b situated in between said front section 44a and said rear section 44c. The upper lip 43 is located above and connects to the front section 44a of the lower lip 44. The lower lip 44 is provided with a upwardly protruding locking element 41 located in the rear section 44c of the lower lip 44. The shown distribution of the different sections 44a-44c of the lower lip 44 may be shifted along the transversal direction of the lower lip 44. It is imaginable that the different sections 44a-44c overlap, in particular that the front section 44a and/or that the rear section 44c overlap with the middle section 44b.

The front section 44a of the lower lip 44 comprises a bottom surface 46 and a side surface 45. In the shown embodiment, the side surface 45 is at least partially curved. It is, however, imaginable that (also) the bottom surface 46 is at least partially curved. The bottom surface 46 of the front section 44a defines a front upward lip contact portion 47. The upper lip 43 of the shown embodiment further comprises a bottom surface 58. The bottom surface 58 is at least partially positioned in an area defined by the front section 44a of the lower lip 44. The bottom surface 58 is inclined downwardly in a direction away from the middle section 44b and rear section 44c of the lower lip 44. The bottom surface 58 of the front section 44a defines a front downward lip contact portion 54. Between the side surface 45 and the bottom surface 58, the front section 44a comprises a curved transition 59. The shape of the curved transition 59 is preferably at least partially complementary to a curved transition between the side surface 34 and top surface 35 of the sideward tongue 31 of a further floor board.

The middle section 44b of the lower lip 44 comprises a top surface 48. The top surface 48 defines a middle upward lip contact portion 49. The middle upward lip contact portion 49 is situated in between adjacent inactive portions 50a, 50b of the middle section 44b of the lower lip 44. It is imaginable that the middle upward lip contact portion 49 is substantially planar, wherein the middle upward lip contact portion 49 extends in a horizontal direction or a transversal direction of the second coupling part 40. Optionally, the top surface 48 is substantially planar, wherein the top surface 48 substantially extends in a horizontal direction or a transversal direction of the second coupling part 40. In the shown embodiment, a first adjacent inactive portion 50a is at least partially upwardly inclined in a direction away from the front section 44a. Preferably, the first upwardly inactive portion 50a is upwardly inclined towards the middle upward lip contact portion 49. In the shown embodiment, the middle upward lip contact portion 49 and (at least a part of) the first adjacent inactive portion 50a form an angle σ. The angle σ may be between 10-35 degrees, preferably 20-30 degrees, more preferably 25 degrees.

The rear section 44c of the lower lip 44 comprises a side surface 52 and a top surface 51. In the shown embodiment, the side surface 52 is at least partially upwardly inclined in a direction away from the middle section 44b and front section 44a of the lower lip 44. The inclined part of the side surface 52 defines a rear upward lip contact portion 53. In the shown embodiment, the top surface 51 of the lower lip 44 is at least partially downwardly inclined in a direction away from the middle section 44b and front section 44a of the lower lip 44. The top surface 51 and/or the side surface 52 of the rear section 44c of the lower lip 44 partially define the upwardly protruding locking element 41.

FIG. 2 further shows that the front sections 31a, 44a of the sideward tongue 31 and the lower lip 44, respectively, are smaller than the middle sections 31b, 41b and/or the rear sections 31c, 44c of the sideward tongue 31 and the lower lip 44, respectively. It is, however, imaginable that the different sections 31a-31c of the sideward tongue 31 and/or the different sections 44a-44c of the lower lip 44 are substantially the same size. The top side surface 56 of the third coupling part 30 has a length D1. The side surface 55 of the upper lip 43 of the fourth coupling part 40 has a length D2. Preferably, the length D1 of the top side surface 56 is substantially equal to the length D2 of the side surface 55. In another embodiment, the sideward tongue may be shifted upwardly towards the upper side 2a of the substrate 2. As a consequence, the length D1 of the top side surface 56 may decrease.

Optionally, the dimensions of the sideward tongue 31 may be adjusted. The thickness of the sideward tongue 31 may be adjusted, preferably the thickness in height direction of the sideward tongue 31 may be adjusted which may result in a variation in length D1. For example, the thickness of the sideward tongue 31 may increase in height resulting in a decrease in length D1. Additionally, the recess 42 and/or the lower lip 44 may be shifted upwardly towards the upper side 2a of the substrate 2. As a consequence, the length of D2 of the side surface 55 may decrease.

Figure 3:
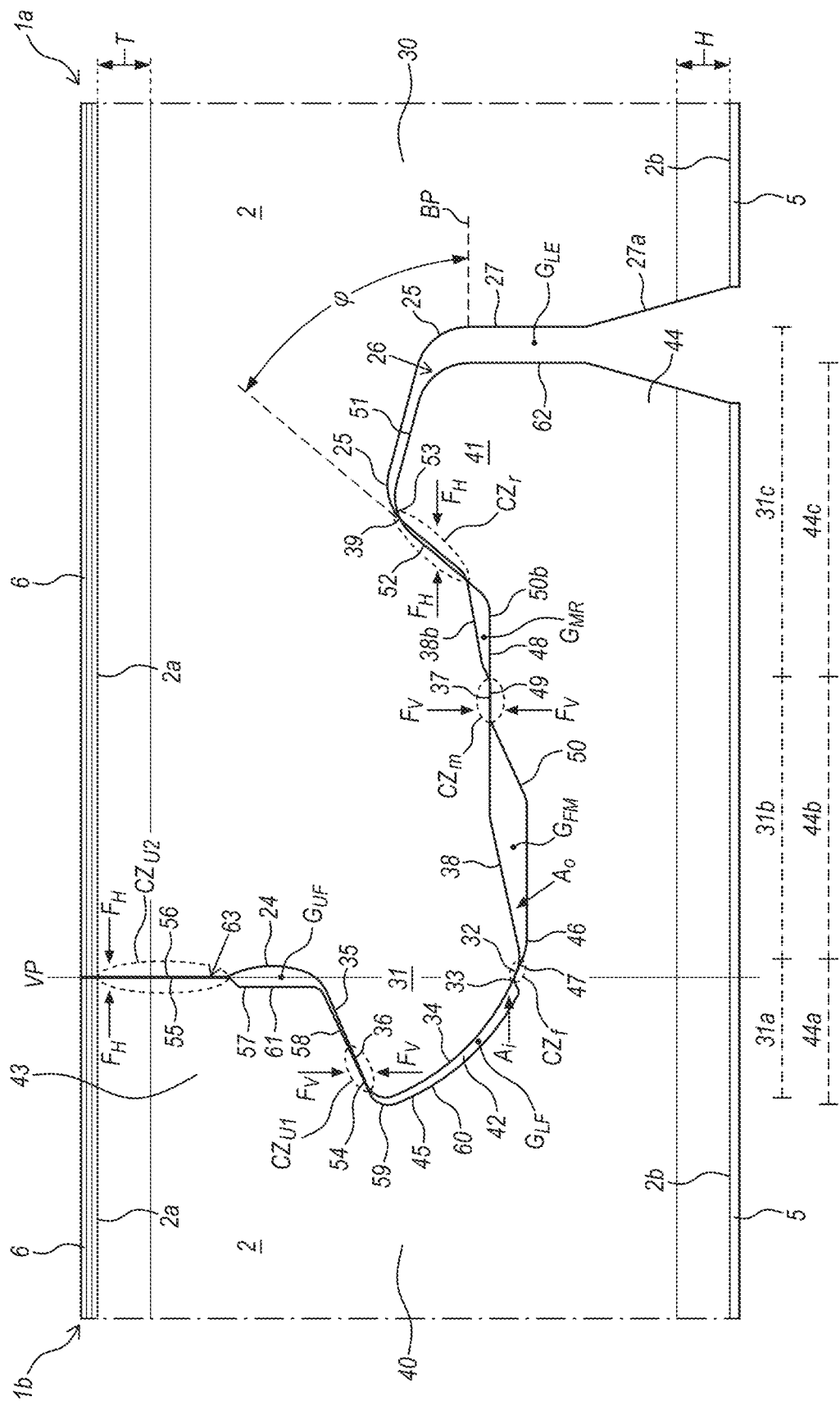
FIG. 3 schematically shows in a transversal cross-section, the side edges of floor boards according to FIG. 2 in coupled condition.

FIG. 3 schematically shows in a transversal cross-section, the respective side edges of floor boards 1a, 1b according to FIG. 2 in coupled condition. The floor boards 1a, 1b comprise a substrate 2 which thickness may be adjustable at the upper side 2a of the substrate 2 with a thickness T, such as 4-6 mm, and/or at the lower side 2b of the substrate 2 with a thickness H, such as 4-10 mm. In the coupled condition, the sideward tongue 31 of the first coupling part 30 is at least partially accommodated in the recess 42 of the second coupling part 40. Furthermore, the upwardly protruding locking element 41 is at least partially accommodated in the accommodation space 26 of the third coupling part 30.

In the shown coupled condition of adjacent floor boards 1a, 1b, the sideward tongue 31 and lower lip 44 define mutually spaced lower contact zones CZf, CZm, CZr.

A front lower contact zone CZf is defined by the co-action between the front downward tongue contact portion 32 of a first floor board 1a and the front upward lip contact portion 47 of another floor board 1b. The front lower contact zone CZf is at least partially, preferably entirely, located in the front section 31a of the sideward tongue 31 and/or at least partially, preferably entirely, located in the front section 44a of the lower lip 44.

A middle lower contact zone CZm is defined by the co-action between the middle downward tongue contact portion 37 of a first floor board 1a and the middle upward lip contact portion 49 of another floor board 1b. The middle lower contact zone CZm is at least partially, preferably entirely, located in the middle section 31b of the sideward tongue 31 and/or at least partially, preferably entirely, located in the middle section 44b of the lower lip 44. In the middle lower contact zone CZm, the middle downward tongue contact portion 37 of the first floor board 1a may be configured to exert a vertical force $F_V$ to the middle upward lip contact portion 49 of another floor board 1b. Optionally, the middle downward tongue contact portion 37 of the first floor board 1a may be configured to exert a force to the middle upward lip contact portion 49 of another floor board 1b, wherein the force comprises a horizontal component and/or a vertical component. It is imaginable that the size of the horizontal component and/or the vertical component of such a force may depend on the size and/or the shape of the middle lower contact zone CZm.

A rear lower contact zone CZr is defined by the co-action between the rear downward tongue contact portion 39 of the first floor board 1a and the rear upward lip contact portion 53 of another floor board 1b. The rear lower contact zone CZr is at least partially, preferably entirely, located in the rear section 31c of the sideward tongue 31 and/or at least partially, preferably entirely, located in the rear section 44c of the lower lip 44. In the shown embodiment, the upwardly protruding locking element 41, in particular the rear upward lip contact portion 35, is configured to exert a horizontal force $F_H$ to the sideward tongue 31 of another floor board 1b. This may cause a second upper contact zone $CZ_{U2}$ to become actively closed and/or this may cause the top side surface 56 of the first coupling part 30 to exert a horizontal force $F_H$ onto the side surface 55 of the upper lip 43. The upwardly protruding locking element 41 may at least be partially oversized with respect to the accommodation space 26 of another floor board 1b. Preferably, at least a part of the inclined part 52 of the top surface 53 and/or side surface 52 of the rear section 44c of the lower lip 44 is oversized with respect to at least a part of the bottom surface 28 of the rear section 31c of the sideward tongue 31 of another floor board 1a. Furthermore, at the rear lower contact zone CZr of the shown embodiment, both the rear downward tongue contact portion 39 and the rear upward lip contact portion 53 are inclined, in particular both the rear downward tongue contact portion 39 and the rear upward lip contact portion 53 run parallel. An inclination angle φ between a board plane BP and each of the rear downward tongue contact portion 39 and the rear upward lip contact portion 53 may be defined, wherein the board plane BP runs substantially parallel to a horizontal direction of the respective floor board(s) 1a, 1b. The inclination angle φ may be situated between and including 45 and 60 degrees, preferably wherein the inclination angle φ is 50 degrees.

In the shown embodiment, the front lower contact zone CZf is smaller than the middle lower contact zone CZm and/or the rear lower contact zone CZr. In the shown embodiment, the rear lower contact zone CZr is larger than the middle lower contact zone CZm and the front lower contact zone CZf. In the shown embodiment, the front lower contact zone CZf is at least partially located lower, or is located closer to the lower side 2b of the substrate 2, than the middle lower contact zone CZm and/or the rear lower contact zone CZr. Preferably, the rear lower contact zone CZr is located higher, or is located closer to the upper side 2a of the substrate 2, than the middle lower contact zone CZm and/or the rear lower contact zone CZr. The shown size and/or location of the front lower contact zone CZf, the middle lower contact zone CZm and the rear lower contact zone CZr are provided in the shown embodiment as an illustrative example. In another embodiment, the size and/or location of the contact zones CZf, CZm and/or CZr may (slightly) differ from the shown figure.

In the shown coupled condition of adjacent floor boards 1a, 1b, the sideward tongue 31 and upper lip 43 define upper contact zones $CZ_{U1}$, $CZ_{U2}$.

A first upper contact zone $CZ_{U1}$ is defined by the co-action between the front upward tongue contact portion 36 of the first floor board 1a and the front downward lip contact portion 54 of another floor board 1b. In the first upper contact zone $CZ_{U1}$, the front upward tongue contact portion 36 and the front downward lip contact portion 54 may be configured to exert a vertical force $F_V$ to each other. Optionally, the front upward tongue contact portion 36 and the front downward lip contact portion 54 may be configured to exert a force to each other which force comprises a horizontal component and/or a vertical component. It is imaginable that the size of the horizontal component and/or the vertical component of such a force may depend on the size and/or the shape of the first upper contact zone $CZ_{U1}$. A second upper contact zone $CZ_{U2}$ is defined by the co-action of a top side surface 56 of the first coupling part 30 of the first floor board 1a, and a side surface 55 of the upper lip 43, located above the front downward lip contact portion 54, of another floor board 1b. In the shown embodiment, the second upper contact zone $CZU_2$ defines a vertical plane VP. The shown vertical plane VP extends vertically at least between top side surface 56 of the first coupling part 30 and a side surface 55 of the upper lip 43. The shown vertical plane VP runs substantially vertically with respect to board plane BP. In the shown embodiment, the front lower contact zone CZf is intersected by said vertical plane VP. The vertical plane VP of the shown embodiment divides the recess 42 in an inner area $A_i$ and an outer area $A_o$. The inner area $A_i$ is enclosed by the upper lip 43 and the lower lip 44. The outer area $A_o$ is located opposite to the inner area $A_i$. In the shown embodiment the portion of the front lower contact zone CZf in outer area $A_o$ is larger than the portion of the front lower contact zone CZf in the inner area $A_i$.

The size of the different contact zones CZr, CZm, CZf, $CZ_{U1}$ may depend on the size or length of the respective contact portions and/or of the degree of complementarity of shape and/or length of the respective surface(s) of the lower lip 44 and the respective surface(s) of the sideward tongue 31. For example, the first upper contact zone $CZ_{U1}$ may depend on the size or length of the front upward tongue contact portion 36 and/or of the size or length of the front downward lip contact portion 54. The size or length of the first upper contact zone $CZ_{U1}$ may (further) depend on the degree of complementary of shape and/or length of the top surface 35 of the front section 31a of the sideward tongue 31 and the bottom surface 58 of the upper lip 43. The size of the second contact zone $CZ_{U2}$ may depend on the size or length of the top side surface 56 of the first coupling part 30 and/or of the size or length of the side surface 55 of the upper lip 43 of the second coupling part 40. The size or length of the second upper contact zone $CZ_{U2}$ may (further) depend on the degree of complementary of shape and/or length of the top side surface 56 of the first coupling part 30 and/or of the size or length of the side surface 55 of the upper lip 43 of the second coupling part 40.

In the shown coupled condition of adjacent floor boards 1a, 1b, the lower lip 44 of the second coupling part 40 and the sideward tongue 31 of the first coupling part mutually enclose different gaps $G_{LF}$, $G_{FM}$, $G_{MR}$, $G_{LE}$.

A lower front gap $G_{LF}$ is formed in between the sideward tongue 31 and an inactive portion 60 of the side surface 45 lower lip 44. Preferably, the lower front gap $G_{LF}$ is located in the inner area of the vertical plane VP. Preferably, the length of the lower front gap $G_{LF}$ is larger than the width of the lower front gap $G_{LF}$. Optionally, the distance between the side surface 34 of the front section 31a of the sideward tongue 31 and the inactive portion 60 of the side surface 45 of the lower lip is smaller than the (shortest) distance between the front lower contact zone CZf and the first upper contact zone $CZ_{U1}$.

A front middle gap $G_{FM}$ is enclosed between the first inactive portion 50a of the lower lip 44 and the first inactive portion 38a of the sideward tongue 31, wherein the first inactive portion 50a is positioned in between the front upward lip contact portion 47 and the middle upward lip contact portion 49, and wherein the first inactive portion 38a is positioned in between the front downward tongue contact portion 32 and the middle downward tongue contact portion 37. The shape of the front middle gap $G_{FM}$ is determined by the shape of the first inactive portions 50a, 38a. In the shown embodiment, the front middle gap $G_{FM}$ is substantially kite shaped or substantially rhombus shaped. However, other shapes are imaginable. Preferably, the length of the front middle gap $G_{FM}$ is larger than the height of the front middle gap $G_{FM}$. Optionally, the distance between the first inactive portions 50a, 38a is smaller than the (shortest) distance between the front lower contact zone CZf and the middle lower contact zone CZm. Preferably, the front middle gap $G_{FM}$ is located in the outer area $A_O$ of the vertical plane VP.

A middle rear gap $G_{MR}$ is enclosed between the a second inactive portion 50b of the lower lip 44 and the second inactive portion 38b of the sideward tongue 31, wherein the second inactive portion 50b is positioned in between the middle upward lip contact portion 49 and the rear upward lip contact portion 53 and wherein the second inactive portion 38b is positioned in between the middle downward tongue contact portion 37 and the rear downward tongue contact portion 39. Preferably, the length of the middle rear gap $G_{MR}$ is larger than the height of the middle rear gap $G_{MR}$. Optionally, the distance between the second inactive portions 50b, 38b is smaller than the (shortest) distance between the middle lower contact zone CZm and the rear lower contact zone CZr. In the shown embodiment, the front middle gap $G_{FM}$ is larger, preferably at least two times larger, than the middle rear gap $G_{MR}$.

A lower end gap $G_{LE}$ is present between a distal end 62 of the upwardly protruding locking element 41 of the second coupling part 40 and a (lower) side surface 27 and/or lowest side surface 27a of the first coupling part 30. The width of the accommodating space 26 exceeds the width of the upwardly protruding locking element 41 providing the lower end gap $G_{LE}$.

In the shown coupled condition of adjacent floor boards 1a, 1b, the side surface 55 of the upper lip 43 and the sideward tongue 31 mutually enclose a upper front gap $G_{UF}$. In particular, the upper front gap Gur is formed in between at least one inactive portion 61 of the side surface 55 of the upper lip 43 and the sideward tongue 31, more in particular between the inactive portion 61 and the indention 24 of the sideward tongue 31. Preferably, the upper front gap Gur extends between the first upper contact zone $CZ_{U1}$ and the second upper contact zone $CZ_{U2}$. In the shown embodiment, the upper front gap Gur is intersected by the vertical plane VP defined by the second upper contact zone $CZ_{U2}$. It is imaginable, that the vertical plane VP of the shown embodiment divides the upper front gap Gur in an inner area $A_i$ and an outer area $A_o$. The inner area $A_i$ of the upper front gap Gur of the shown embodiment has a different shape than the outer area $A_o$ of the upper front gap $G_{UF}$. The outer area $A_o$ of upper front gap Gur of the shown embodiment is substantially curved. The outer area $A_o$ may, however, have another shape.

In the shown coupled condition, the coupled floor boards 1a, 1b mutually enclose a tapered space 63. The shown tapered space 63 is located above the upper front gap Gur. In the shown embodiment, the tapered space 63 is relatively small, however in another embodiment the tapered space or the area or volume covered by the tapered space may be bigger. The tapered space 63 is enclosed by the top side surface 56 of the first coupling part 30 and the side surface 55 of the upper lip 43. In the shown embodiment, the tapered space 63 narrows in upward direction or in the direction of the upper side 2a of the substrate 2. The tapered space 63 may result in the second upper contact zone $CZU_2$ being positioned at the upper surface or upper side 2a of the substrate 2. Optionally, the vertical plane VP intersects the tapered space 63, preferably wherein the vertical plane VP divides the tapered space 63 substantially in half.

Figure 4:
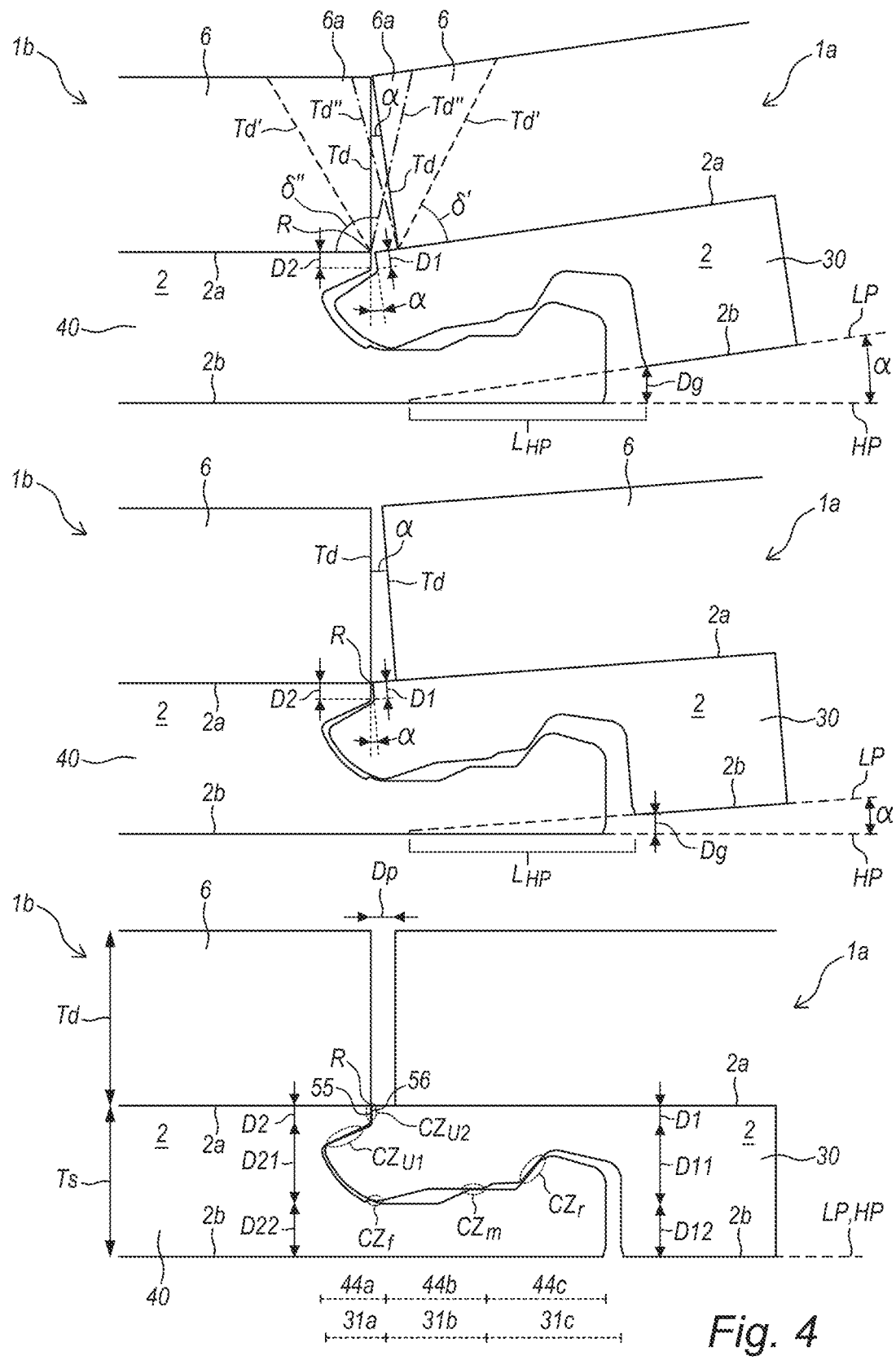
FIG. 4 schematically shows in a transversal cross-section a method to couple the side edges of floor boards according to FIGS. 2 and 3.

FIG. 4 schematically shows a method of coupling of the side edges 3, 4 of floor boards 1*a*, 1*b* according to invention and in correspondence with the shown side edges 3, 4 of FIGS. 2 and 3. The floor boards 1*a*, 1*b* each comprise a substrate 2 with an upper side 2*a* and a lower side 2*b*. A decorative surface layer 6 is, directly or indirectly, affixed to the upper side 2*a* of the substrate 2. The thickness of the decorative surface layer Td may be at least the thickness of the substrate Ts, optionally the thickness of the decorative surface layer Td exceeds the thickness of the substrate Ts. In the shown embodiment, a first floor board 1*a* comprises a first coupling part 30 and the second floor board 1*b* comprises a second coupling part 40. The first coupling part 30 and the second coupling part 40 are coupled via an angling down movement. In particular, an upper side of the second upper contact zone $CZ_{U2}$ defines a point of rotation R during coupling of the floor boards 1*a*, 1*b*. A rotation angle α may be formed by the intersection of the decorative surface layers 6, in particular at a top side of the decorative surface layers 6*a*. A maximum rotation angle α may be at least be partially dependent on the thickness Td of the decorative surface layers 6 of floor boards 1*a*, 1*b* to be coupled. The (maximum) rotation angle α may be defined by $$\cos^{-1}\left(\frac{Td \text{ of a first floor board } 1b}{Td \text{ of a second, adjacent floor board } 1a}\right) = \alpha.$$

The top side surface 56 of the third coupling part 30 has a length D1. The side surface 55 of the upper lip 43 of the fourth coupling part 40 has a length D2. Optionally, the (maximum) rotation angle α may be at least partially be dependent on the mutual proportion of the length D1 and D2. The (maximum) rotation angle α may optionally be defined by $$\alpha = \cos^{-1}\left(\frac{D2}{D1}\right).$$

Furthermore, the (maximum) rotation angle α may at least partially be dependent on a distance Dg between the lower side 2*b* of the substrate 2 of a first floor board 1*a* or between the lower side of a backing layer, directly or indirectly affixed, on the lower side of the substrate 2, in particular at the first coupling part 30, and a horizontal plane HP defined by the floor or the ground onto which the adjacent floor boards 1*a*, 1*b* are (to be) coupled. The lower side 2*b* of the substrate 2 of the first coupling profile 30, or the lower side of a backing layer, directly or indirectly affixed, on the lower side of the substrate 2, may define a lower plane LP. The intersection of the horizontal plane HP and the lower plane LP may form the (maximum) rotation angle α. The horizontal plane HP may define a horizontal plane length LHP which is defined by the distance between the intersection point of the lower plane LP and the horizontal plane HP and the end point of the rear section 31*c* of the sideward tongue 31 of the third coupling part 30. The rotation angle α may be defined by $$\alpha = \tan^{-1}\left(\frac{D_G}{L_{HP}}\right).$$

During the subsequent steps of coupling the first coupling part 30 and the second coupling part 40, the distance Dg may decrease and hence the (maximum) rotation angle α decreases. Upon the subsequent steps of coupling the floor boards 1*a*, 1*b*, as shown from the upper figure to the lower figure, the rotation angle α becomes smaller to eventually become substantially equal to zero. For example, the lower plane LP may overlap with the horizontal plane HP when the first coupling part 30 and second coupling part 40 are in coupled condition. Upon decoupling of the coupled floor boards 1*a*, 1*b*, in particular the first coupling part 30 and the second coupling part 40, the distance Dg may increase and hence the (maximum) rotation angle α increases.

In the shown embodiment, the side edge Td of the decorative surface layer is substantially vertical. However, in another embodiment the side edge of the decorative surface layer 6 may be upwardly inclined Td', Td". Opposite side edges may be oriented parallel or may mutually enclose an angle. The upwardly inclined side edges of the decorative surface layer Td', Td" may form an angle δ' and an angle δ" with the top surface or upper side of the substrate 2*a*, respectively. The angles δ' and δ" of the two adjacent floor boards 1*a*, 1*b* do not have to be equal. The size and the mutual relationship of the angles δ' and δ" of adjacent floor boards 1*a*, 1*b* may influence the size of angle α.

The first coupling part 30 may be divided into three in height distinguishable subsections D1, D11, D12, wherein the sum of the three subsections D1, D11, D12 equals to the thickness of the substrate Ts. The height of the first subsection D1 corresponds to the length D1 of the top side surface 56. The second subsection D11 is defined by the distance between the lowest point of the middle section 31*b* of the sideward tongue and the lower side of the second upper contact zone $CZ_{U2}$. The third subsection D12 is defined by the distance between the lowest point of the middle section 31*b* of the sideward tongue 31 and the lower side 2*b* of the substrate 2 of the floor board 1*a*. Preferably, the second subsection D11 is larger than the first subsection D1 and/or the third subsection D12. Optionally, the first subsection D1 is smaller than the second subsection D11 and/or the third subsection D12. Preferably, the first subsection D1 is smaller than both the second subsection D11 and the third subsection D12.

The fourth coupling part 40 may be divided into three in height distinguishable subsections D2, D21, D22, wherein the sum of the three subsections D1, D11, D12 equals to the thickness of the substrate Ts. The height of the first subsection D2 corresponds to the length D2 of the side surface 55 of the upper lip 43. The second subsection D21 is defined by the distance between the lowest point of the middle section 44*b* of the lower lip 44 and the lower side of the second upper contact zone $CZ_{U2}$. The third subsection D12 is defined by the distance between the lowest point of the middle section 44*b* of the lower lip 44 and the lower side 2*b* of the substrate 2 of the floor board 1*b*. Preferably, the second subsection D21 is larger than the first subsection D2 and/or the third subsection D22. Optionally, the first subsection D2 is smaller than the second subsection D21 and/or the third subsection D22. Preferably, the first subsection D2 is smaller than both the second subsection D21 and the third subsection D22.

In coupled condition of the shown floor boards 1*a*, 1*b*, the decorative surface layer 6 at least partially covers the top surface or upper side 2*a* of the substrate 2. Optionally, at least a part of the side edge of the substrate 2 of at least one coupling part 40, 30 remains uncovered by the decorative surface layer 6. In the shown embodiment, a part of the side edge of the substrate 2 of the first coupling part 30 remains uncovered by the decorative surface layer 6. In coupled condition of the adjacent floor boards 1a, 1b, the shown adjacent decorative surface layers 6 are positioned at a distance Dp from each other to form one or more grout lines.

Figure 5:
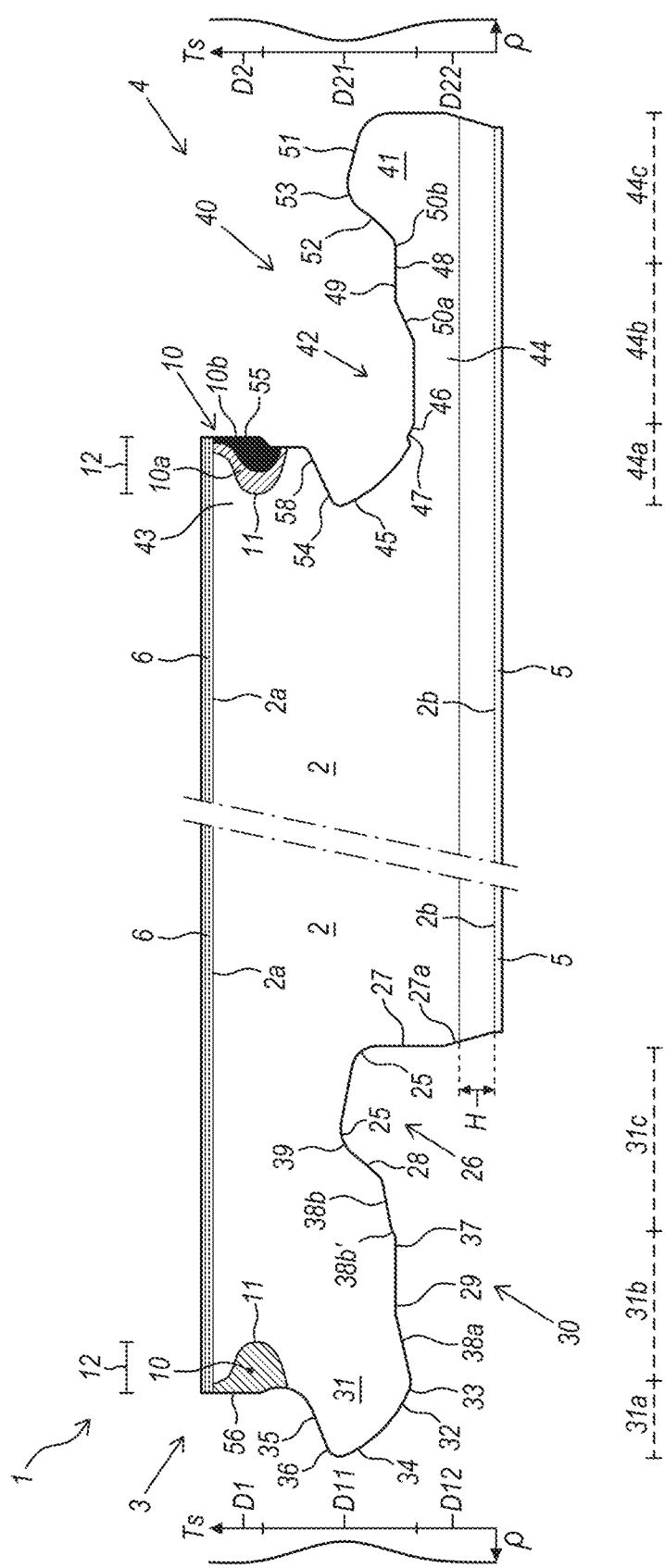
FIG. 5 schematically shows in a transversal cross-section, the side edges of floor boards according to FIG. 2 which are treated with a water barrier agent.

FIG. 5 schematically shows in a transversal cross-section, the side edges 3, 4 of the floor board 1 according to FIG. 2, wherein the shown side edges 3, 4 are treated with a water barrier agent 10. The shown substrate 2 is preferably made from MDF material and/or HDF material and/or wood material. The (average) density p of the MDF material and/or the HDF material and/or wood material of the substrate 2 may variate along the thickness Ts direction of the substrate 2. Thereto, the (average) density p of the MDF material and/or the HDF material and/or wood material of the substrate 2 may define a density profile along the thickness Ts direction of the substrate 2. Optionally, the (average) density p of the MDF material and/or the HDF material and/or wood material close to the upper side 2a of the substrate 2 or near the decorative surface layer 6 may be higher than the average density p close to a centre region of the substrate 2. The (average) density p of the MDF material and/or the HDF material and/or wood material close to the upper side 2a of the substrate 2 or near the decorative surface layer 6 may be part of a higher density region. The (average) density p of the MDF material and/or the HDF material and/or wood material close to a centre region of the substrate 2 may be part of a lower density region. The (average) density p of the MDF material and/or the HDF material and/or wood material close to the lower side 2b of the substrate 2 or near the backing layer 5 may be higher than the average density p close to a centre region of the substrate 2. The (average) density p of the MDF material and/or the HDF material and/or wood material close to the lower side 2b of the substrate 2 or near the backing layer 5 may be part of a higher density region. It is imaginable, that the (average) density p of the MDF material and/or the HDF material and/or wood material of the substrate 2 may differ between the three in height distinguishable subsections D1, D11, D12 of the third coupling part 30, wherein the sum of the three subsections D1, D11, D12 equals to the thickness of the substrate Ts. Optionally, the (average) density p of the MDF material and/or the HDF material and/or wood material of the substrate 2 may differ between the three in height distinguishable subsections D2, D21, D22 of the fourth coupling part 40, wherein the sum of the three subsections D2, D21, D22 equals to the thickness of the substrate Ts. It is imaginable, that the average density p of the MDF material and/or the HDF material and/or wood material of the substrate 2 is higher in subsection D1 and in subsection D2 than in subsection D11 and subsection D21 and/or the average density p is higher in subsection D1 and in subsection D2 than in subsection D12 and subsection D22. Preferably, the average density p of the MDF material and/or the HDF material and/or wood material of the substrate 2 of subsection D11 and D21 is lower than the average density p at the subsections D1, D12; D2, D22, respectively. The centre section or subsection D11 and/or subsection D21 of the substrate 2 may be more porous than a top section or subsection D1 and/or D2 and/or a bottom section or subsection D12 and/or D22 of the substrate 2.

The illustrated distribution of the different subsections D1, D11, D12 of the first coupling part 30 and/or the subsections D2, D21, D22 of the second coupling part 40 may be shifted along the thickness Ts direction of the substrate 2 of the floor board 1. It is imaginable that the different subsections D1, D11, D12 and/or D2, D21, D22, respectively, at least partially or entirely overlap.

The shown side edges 3, 4 of the substrate 2 are treated with a water barrier agent 10. It is imaginable that one of the side edges 3, 4 of the floor board 1 is treated with a water barrier agent 10. The water barrier agent 10 may at least partially be impregnated into the substrate 2, wherein the MDF material and/or HDF material and/or wood material of the substrate may be configured to disperse the water barrier agent 10 throughout at least a part of the substrate 2, in particular throughout at least a part of at least one side edge of the substrate 2. In the shown embodiment, the first side edge 3 is treated with a water barrier agent 10 and the second side edge 4 is treated with two different water barrier agents 10a, 10b. The shown two different water barrier agents 10a, 10b form a laminated coating onto the second side edge 4. In another embodiment, at least one side edge 3, 4 may be treated with more than two different water barrier agents, optionally forming a laminated coating onto the respective side edge. The water barrier agent 10 may have a penetration depth 12 into the substrate 2 defined by the distance between the side edge of the substrate 2 and a water barrier agent edge 11. For example, the penetration depth 12 of the first side edge 3 may be defined by the distance between the top side surface 56 and the water barrier agent edge 11. Likewise, the penetration depth 12 of the second side edge 4 may be defined by the distance between the side surface 55 of the upper lip 44 and the water barrier agent edge 11. The penetration depth 12 of the water barrier agent 10 may variate along the thickness direction of the substrate Ts. The penetration depth 12 of the water barrier agent 10 may depend on the (average) concentration p of the MDF material and/or HDF material and/or wood material of the substrate 2. The penetration depth 12 of the water barrier agent 10 may be higher at a location with a lower (average) density p of the MDF material and/or the HDF material and/or wood material of the substrate 2. Hence, the penetration depth 12 close to the upper side 2a of the substrate 2 or near the decorative surface layer 6 may be lower than at a location close to a centre region of the substrate 2. The concentration of the water barrier agent 10 in a top section of the side edge may be lower than the concentration of in a lower section positioned underneath the top section. Optionally, the concentration follows a parabolic-shaped distribution in the direction of the substrate thickness Ts. In the shown embodiment, the water barrier agent 10 is provided at least in a top section of the side edge 3, 4 or at least partially in the first subsection D1 and D2 of the side edge 3, 4, respectively. It is imaginable that at least a part of a centre section of the side edge 3, 4 or at least a part of the second subsection D11, D21 is (also) treated with the water barrier agent 10. In the shown embodiment, a bottom section of the side edge 3, 4 or the third subsection D12, D22 is free from water barrier agent 10. However, it is imaginable that the bottom section or the third subsection is at least partially treated with at least one water barrier agent 10.

Figure 6:
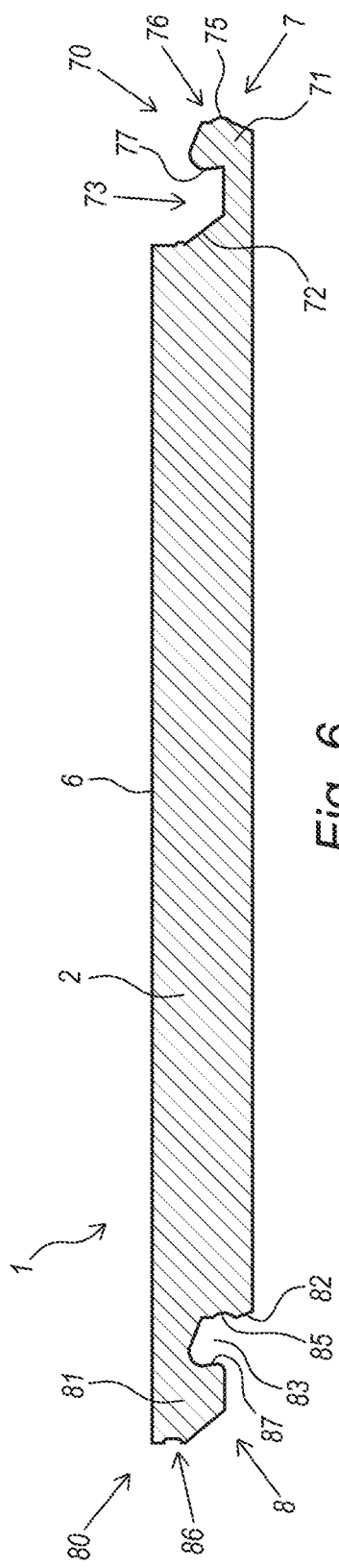
FIG. 6 schematically shows a longitudinal cross-section along line B-B in FIG. 1, of respective side edges.

FIG. 6 schematically shows a longitudinal cross-section along line B-B of the floor board 1 as shown in FIG. 1. The floor board 1, in particular the substrate 2 of the floor board 1, comprises MDF and/or HDF material and/or wood material. The third side edge 7 comprises a third coupling part 70 and the fourth side edge 8 comprises a fourth coupling part 80. The shown third coupling part 70 comprises an upward tongue 71, an upward flank 72 situated at a distance from the upward tongue 71 and an upward groove 73 formed in between the upward tongue 71 and the upward flank 72, wherein the upward groove 73 may be adapted to receive at least a part of a downward tongue 81 of the fourth coupling part 80 of another floor board. The shown side of the upward tongue 71 facing the upward flank 72 is the inside 77 of the upward tongue 71, and the side of the upward tongue 71 facing away from the upward flank 72 is the outside 76 of the upward tongue 71. A first locking element 75 may be provided at an outside of the upward tongue 71 facing away from the upward flank 72. The shown fourth coupling part 80 comprises a downward tongue 81, a downward flank 82 situated at a distance from the downward tongue, and a downward groove 83 formed in between the downward tongue 81 and the downward flank 82, wherein the downward groove 83 may be adapted to receive at least a part of the upward tongue 71 of the third coupling part 70 of another floor board. The side of the downward tongue 81 facing the downward flank 82 is the inside 87 of the downward tongue and the side of the downward tongue 81 facing away from the downward flank 82 is the outside 86 of the downward tongue 81. A second locking element 85 may be adapted for co-action with a first locking element 75 of another floor board, is provided at the downward flank 82. The third and fourth coupling parts 70 and 80 may be coupled to each other when connecting a first floor board and a second floor board to each other. A first floor board may hereby be moved vertically downwards, wherein the coupling parts 70 and 80 engage with each other by receiving upward tongue 71 in downward groove 83 and receiving downward tongue 81 in the upward groove 73.

Figure 7:
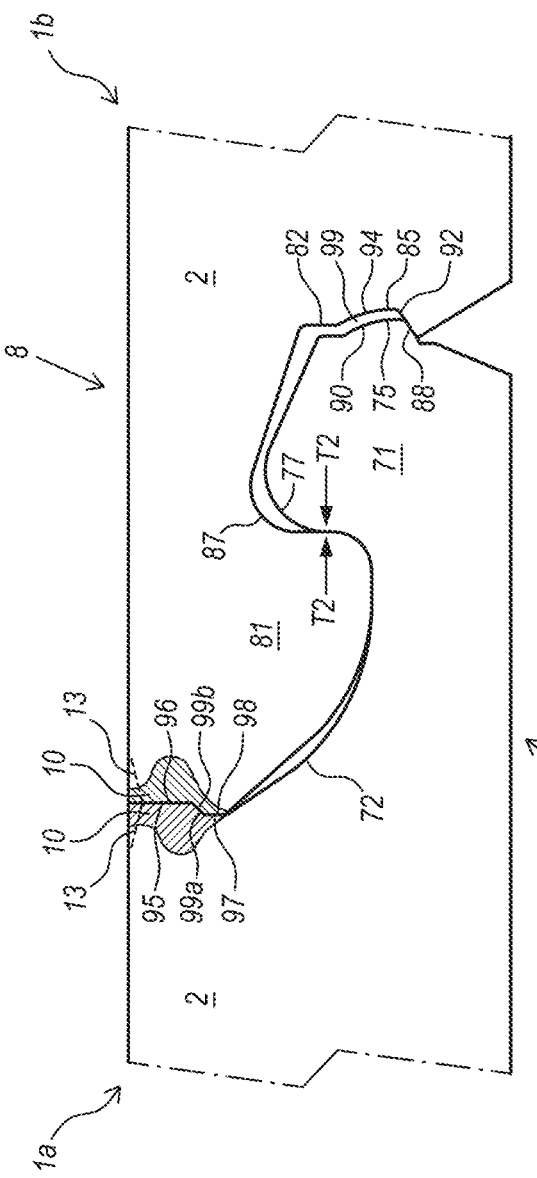
FIG. 7 schematically shows in a longitudinal cross-section, the side edges of floor boards according to FIG. 6 in coupled condition.

FIG. 7 schematically shows in a longitudinal cross-section, the side edges 7, 8 of floor boards 1a, 1b according to FIG. 6 in coupled condition. The side edges 7 and 8 may be coupled by a vertical movement. Preferably, wherein the coupling parts 70 and 80 engage with each other by receiving upward tongue 71 of a first floor board 1a in downward groove 83 of a second floor board 1b and by receiving the downward tongue 81 of the second floor board 1b in the upward groove 73 of the first floor board 1a. It is noted that the side edges 7 and 8 of the embodiment of FIG. 7 contains some slight adaptations over the embodiment shown in FIG. 6, which are directly visible from the figure, and further explained below. As far as FIGS. 6 and 7 have the same features in common, these are indicated by the same reference numerals. In the shown embodiment, the inside 77 of the upward tongue 71 is in contact with the inside 87 of the downward tongue 81 of another floor board 1b, preferably such that the floor boards 1a, 1b create a tension force T2 which forces the side edges 7 and 8 towards each other. The tension force T2 may be a horizontal force. Part of the inside 77 of the upward tongue 71 is inclined towards the upward flank 72, and part of the inside 87 of the downward tongue 81 is inclined towards the downward flank 82, preferably such that the two coupled floor boards 1a, 1b are interlocked in a direction perpendicular to the plane of the panels (i.e. in a vertical direction). Additionally, the first and second locking elements 75 and 85 interlock with each other, further contributing to the vertical interlocking of the coupled floor boards 1a, 1b. The first locking element is a bulge 75, the second locking element is a recess 85. The bulge 75 has an upper portion 90 and an adjoining lower portion 88, wherein the lower portion 88 comprises an inclined locking surface and the upper portion 90 comprises a, preferably curved, guiding surface. The recess 85 comprises an upper portion 94 and an adjoining lower portion 92, wherein the lower portion 92 comprises an inclined locking surface. The respective upper portions 90 and 94 are at a distance from each other, thus allowing for an intermediate space 99. At the upper side of the coupled side edges 7 and 8, the upper contact surfaces 95 and 96 are forced together due to the interaction of the insides 77 and 87. Optionally, the tension force T2 or the horizontal force at the upper contact surfaces 95 and 96 is substantially equal to the tension force T2 or the horizontal force at the insides 77 and 87. In addition, the respective upper contact surfaces 95 and 96 are provided with a bulge 98 and a recess 97, which interlock with each other in the coupled state. Above the bulge 98 and recess 97 respective inclined contact surfaces 99a and 99b are provided which engage with each other. The upper side 2a or top surface of the substrate 2 above the upper contact surfaces 95 and 96 may be provided with a bevel 13. Optionally, a top surface of the bevel 13 is at least partially treated or impregnated with a water barrier agent 10.

At least one of the side edges 7, 8 of the coupled floor boards 1a, 1b may be treated with a water barrier agent 10. In the shown embodiment, both side edges 7, 8 are treated with the water barrier agent 10. The water barrier agent 10, preferably, is provided at a top section of the floor board 1a, 1b. In the shown embodiment, at least a part of the upper contact surfaces 95 and 96 of the side edges 7, 8 of the substrate 2 of the respective floor boards 1a, 1b are treated and/or impregnated with the water barrier agent 10.

Figure 8:
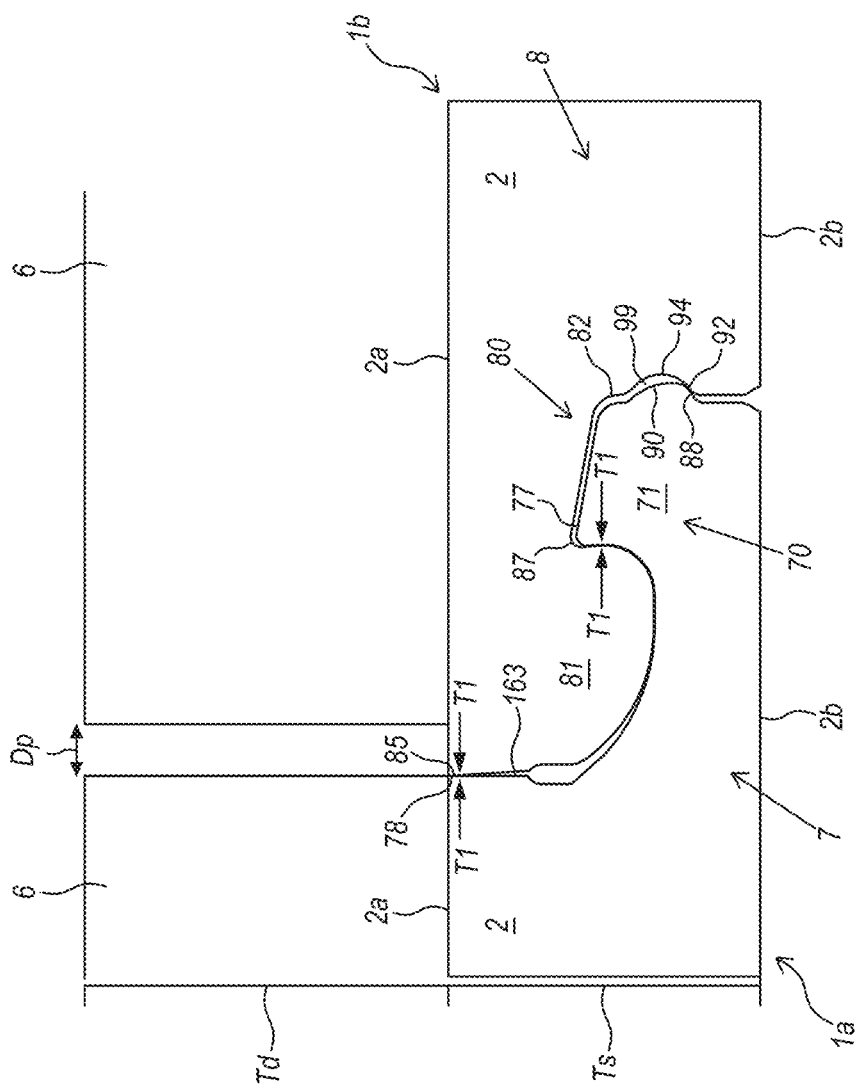
FIG. 8 schematically shows a second embodiment of a longitudinal cross-section along line B-B in FIG. 1 of respective side edges in coupled condition.

FIG. 8 schematically shows in a longitudinal cross-section a second embodiment of the side edges 7, 8 of floor boards 1a, 1b in coupled condition. It is noted that the side edges 7 and 8 of the embodiment of FIG. 8 contains some slight adaptations over the embodiment shown in FIGS. 6 and 7, which are directly visible from the figure, and further explained below. As far as FIGS. 6, 7 and 8 have the same features in common, these are indicated by the same reference numerals. The shown floor boards 1a, 1b, in particular the substrate 2 of the floor boards 1a, 1b may be made from MDF material and/or HDF material and/or wood material. The floor boards 1a, 1b further comprise a decorative surface layer 6 provided on top of the substrate 2 or at the top surface 2a of the substrate 2. The decorative surface layer 6 has a thickness Td which is preferably at least the thickness of the substrate Ts. The decorative surface layer 6 at least partially covers the top surface or upper side 2a of the substrate 2. Optionally, at least a part of the side edge of the substrate 2 of at least one coupling part 70, 80 remains uncovered by the decorative surface layer 6. In the shown embodiment, a part of the side edge of the substrate 2 of the fourth coupling part 40 remains uncovered by the decorative surface layer 6. In coupled condition of the adjacent floor boards 1a, 1b, the shown adjacent decorative surface layers 6 are positioned at a distance Dp from each other to form one or more grout lines. The shown coupling parts 70, 80 mutually enclose a tapered space 163. The shown tapered space 63 is enclosed by the top side surface 78 of the third coupling part 70 and the top side surface 85 of the fourth coupling part 80. In the shown embodiment, the tapered space 63 narrows in upward direction or in the direction of the upper side 2a of the substrate 2. In the shown embodiment, the upward tongue 71 is configured to exert a horizontal force $F_H$ or a tension force F1 to the inside 87 of the downward tongue 81. This may cause an upper side 2a of the substrate, in particular the side surface 78 of the third coupling part 70 and the top side surface 85 of the fourth coupling part 80 to become actively closed and/or this may cause the side surface 78 of the third coupling part 70 to exert a horizontal force $F_H$ or a tension force T1 onto top side surface 85 of the fourth coupling part 80.

Figure 9:
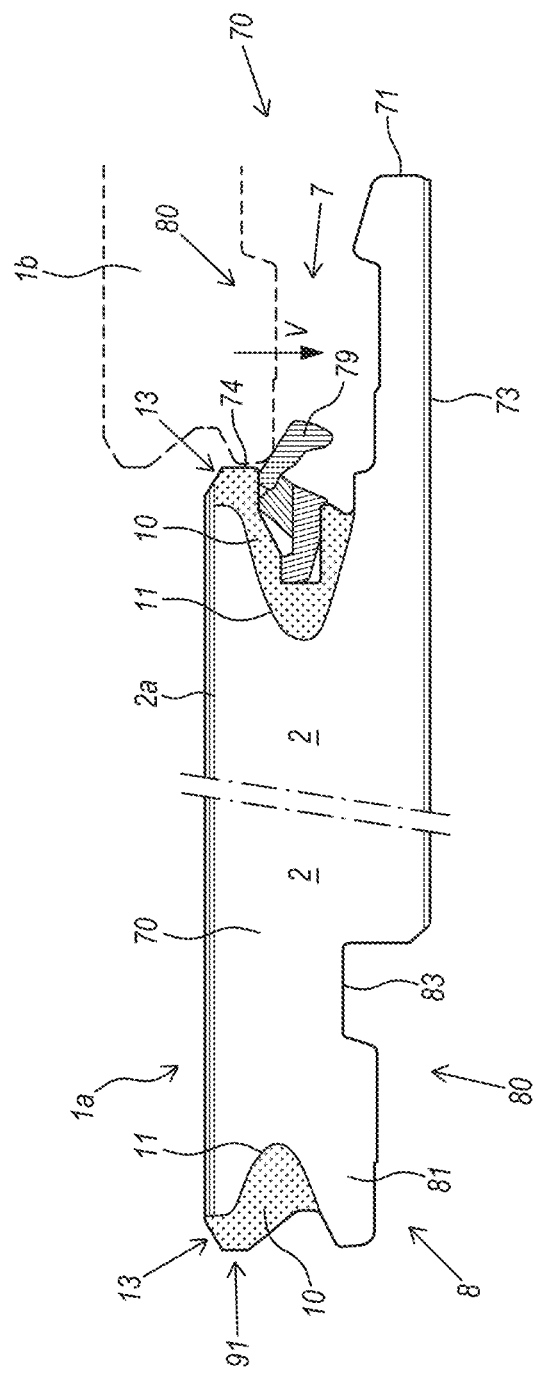
FIG. 9 schematically shows a third embodiment of a longitudinal cross-section along line B-B in FIG. 1 of respective side edges in coupled condition.

FIG. 9 schematically shows a third embodiment of a longitudinal cross-section along line B-B in FIG. 1 of respective side edges 7, 8, wherein the side edges 7,8 comprise a third coupling part 70 and a fourth coupling part 80, respectively. The floor boards 1a, 1b are preferably at least partially made from MDF material and/or HDF material and/or wood material. The third coupling part 70 and the fourth coupling part 80 of a first floor board 1a and a second floor board 1b may be coupled by means of a vertical movement V or a downward movement. The coupling parts 70 and 80 engage with each other by receiving upward tongue 71 of a first floor board 1a in downward groove 83 of another floor board and by receiving the downward tongue 81 of another floor board in the upward groove 73 of the first floor board 1a. The third coupling part 70 further comprises an insert 79 configured to provide a locking of coupled floor boards 1a, 1b in a perpendicular direction to the floor board plane direction, preferably in a substantially vertical direction. It is, however, imaginable that the fourth coupling part 80 comprises an insert 79. The side edges 7, 8 may comprise a chamfer 13 or a bevel 13 at the upper side 2a or top surface of the substrate 2, preferably at a top side surface 91 of the fourth coupling part 80 or fourth side edge 8 and/or at a top side surface 74 of the third coupling part 70 or third side edge 7. The shown side edges 7, 8 are treated with a water barrier agent 10. Preferably, at least an upper section of the side edges 7, 8 are treated with the water barrier agent 10. The water barrier agent 10 may have a penetration depth into the substrate 2 which may be defined by the distance between the side edge 91, 74 of the substrate 2 and a water barrier agent edge 11.

Preferably, the water barrier agent edge 11 follow a parabolic-shaped distribution in the direction of the substrate thickness.

Figure 10:
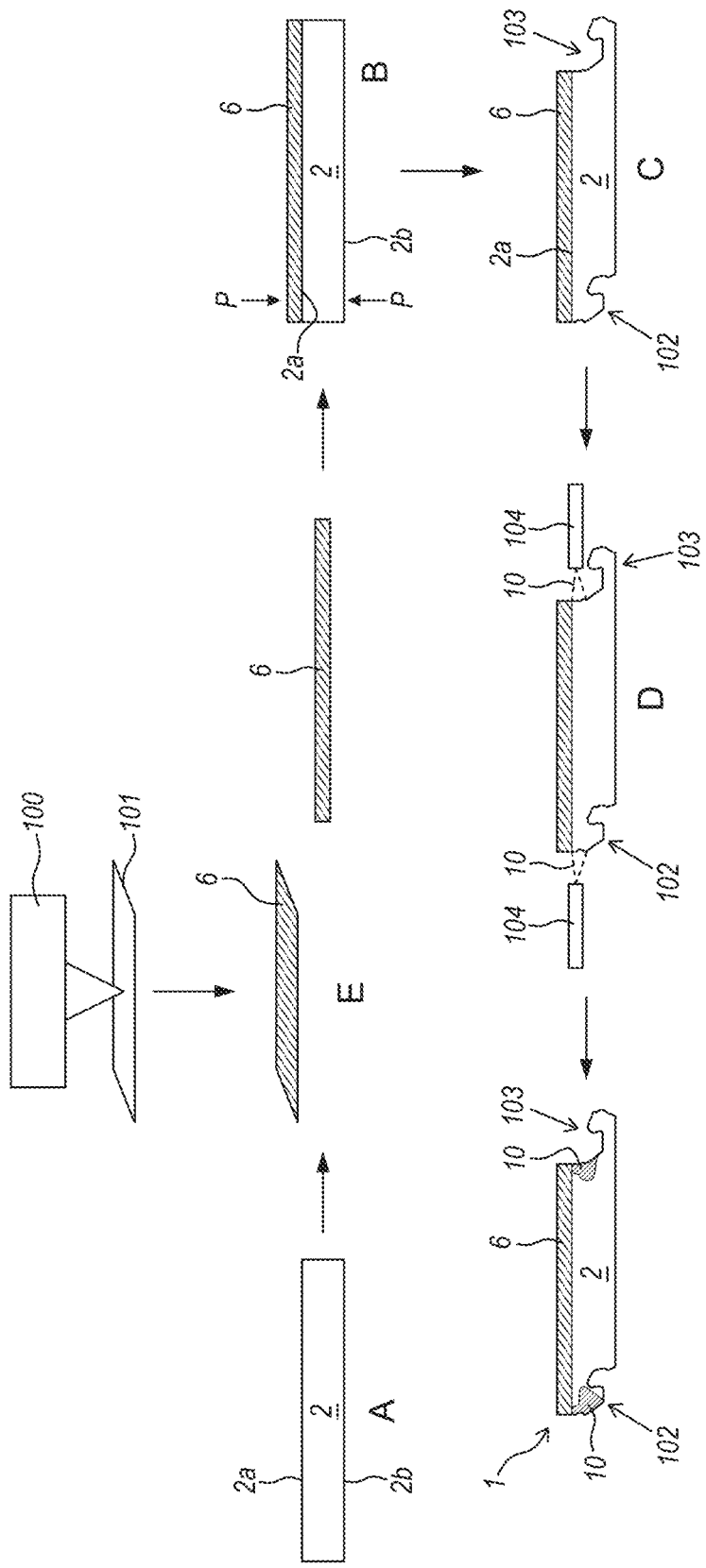
FIG. 10 schematically shows a method for producing a floor board according to the invention.

FIG. 10 schematically shows a method for manufacturing a floor board 1 according to the invention. In step A, a substrate 2 is provided. The substrate 2 may comprise MDF material and/or HDF material and/or wood material. The substrate comprises an upper side 2a or a top surface and a lower side 2b or a bottom surface. In step E, a decorative surface layer 6 may be prepared. In this embodiment, the decorative surface layer 6 comprises a decorative print layer. The decorative print layer is prepared by printing a décor onto a carrier layer 101. The carrier layer 101 may be a paper layer or polymer layer. The décor is printed onto the carrier layer or carrier film 101 by means of a (digital) printer 101. Subsequently, the printed ink layer may be cured and/or dried (not shown). It is, however, imaginable that the decorative surface layer 6 comprises a plurality of sublayers, including a decorative print layer. Onto the decorative print layer at least one translucent or transparent protective layer covering said decorative print layer may be applied. In step B, the decorative surface layer 6 is, directly or indirectly, affixed on top of or on the upper side 2a the substrate 2. The decorative surface layer 6 may be adhered to the substrate 2. The decorative surface layer 6 may be adhered to the substrate 2 by applying heat and pressure P on both the decorative surface layer 6 and the substrate 2. Optionally, in step B use is made of heated calendaring rollers (not shown) to affix the decorative surface layer 6 onto the top side of the substrate 2. In step C a first substrate edge 102 and a second substrate edge 103 are profiled and form a first coupling part and a second coupling part to allow adjacent floor boards to interlock upon coupling. The specifications of the coupling parts may be obtained in FIGS. 2-9. The profiling of the side edges 102, 103 may for example be performed by (laser) cutting the substrate 2. In step D at least on side edge 102, 103 is treated with at least one water barrier agent 10. In the shown embodiment, both side edges 102, 103 are treated with at least one barrier agent 10. It is imaginable, not shown, that at least one side edge 102, 103 is treated with two or more water barrier agents, which may result in a laminated coating. Preferably, at least a top side of the side edge 102, 103 is treated with the water barrier agent 10. The water barrier agent 10 may be applied to the respective side edge 102, 103 of the substrate 2 by for example spraying or impregnating. In the shown embodiment, the water barrier agent 10 is applied to at least one side edge 102, 103 by using a spray 104. Optionally, a primer layer may be applied to the side edges 102, 103 prior to applying one or more water barrier agents 10. Instead of or along with treating at least one side edge 102, 103 with a water barrier agent 10, at least one side edge of the substrate may be subjected to a thermal searing or ironing step to sear said edge at least partially (not shown) to make the substrate 2 more water-resistant or waterproof. Optionally, (not shown), a top section of at least one side edge 102, 103 is provided with a bevel. The bevel may for example be pressed in the substrate 2, preferably also in the decorative surface layer 6. Subsequently, the bevel may be provided with a water barrier agent 10 or may be exposed to a thermal searing or ironing step to sear the bevel to make the bevelled part more water-resistant or waterproof.

Figure 11:
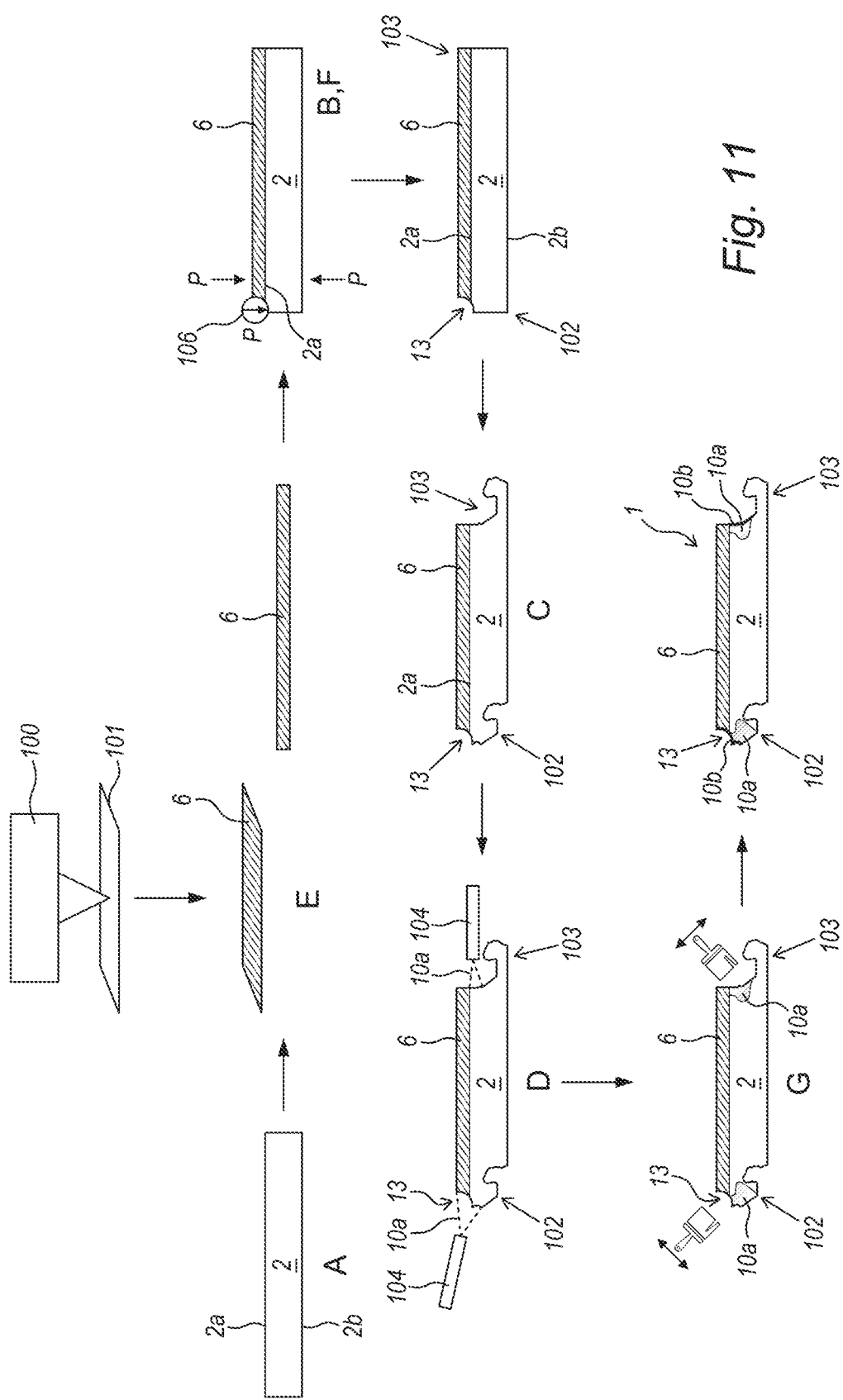
FIG. 11 schematically shows another embodiment of a method for producing a floor board according to the invention.

FIG. 11 schematically shows another embodiment of a method for manufacturing a floor board 1 according to the invention. The shown embodiment of FIG. 11 shows some similarities with the method shown in FIG. 10. FIG. 11 also shows some optional additional steps to the method as shown in FIG. 10. These optional additional steps will be elucidated in more detail below. FIG. 11 shows the method comprises step F pressing at least one bevel 13 in at least a part of a top surface or an upper side 2a of the substrate 2 the floor board, preferably pressing at least one bevel 13 at least at one side edge 102, 103 of the substrate 2. In the shown embodiment, step F is performed simultaneously with step B, covering the upper side of the substrate 2 with a decorative surface layer 6. It is however imaginable that step F is performed prior to step B or after step B. Step F may be performed after step C, prior to step C or simultaneously with step C. The shown bevel 13 has a substantially curved form, however the bevel 13 may be substantially straight. The shape of the bevel 13 may be dependent on the shape of the pressing element 106 and the magnitude of the pressure exerted on the substrate 2. Optionally, the pressing element 106 is heated to hot press at least one bevel 13 at least in the substrate 2. This is advantageous since it simultaneously provides a thermal treatment to locally close pores or other openings in the substrate surface of the bevel 13. Therewith the substrate surface of the bevel 13 may be closed, decreasing the water permeability of the substrate surface of the bevel 13 and optionally resulting in (more) water resistant or waterproof surface. It is imaginable that the bevel 13 is at least partially covered by the decorative surface layer 6 or the bevel 13 may be left uncovered by the decorative surface layer 6.

FIG. 11 further shows an additional optional method step G coating at least one side edge 102, 103 with at least one coating 10b. Preferably, also the bevel 13 is coated with at least one coating 10b. The coating 10b may for example be applied in liquid state, for example by smearing 105 or lubricating the (protective) coating 10b on the desired portions of the substrate 2. The (protective) coating 10b may be applied in liquid state and cured, preferably UV cured, afterwards. It is imaginable that the water barrier agent 10a is configured to act as primer layer to facilitate and/or improve adhesion of the (protective) coating 13 applied on top. Alternatively or additionally, the coating is not applied in liquid state, but is applied in solid state, for example by means of transfer printing. In the shown embodiment, step G is performed after treating the side edges 102, 103, and preferably the bevel 13, with the water barrier agent 10a. It is, however, also imaginable that the coating 10b is applied before treating the side edges 102, 103 with the water barrier agent 10a. In the shown embodiment, the penetration depth of the coating 10b is smaller than the penetration depth of the water barrier agent 10a due to the order of application of the coating 10b and the water barrier agent 10a and/or due to the chemical composition and the degree of absorption of the respective chemical by the wood material and/or MDF material and/or HDF material of the substrate 2. It is, however, imaginable that the penetration depth of the coating 10b and the water barrier agent 10a is substantially equal or that the penetration depth of the coating 10b is larger than the penetration depth of the water barrier agent 10a. In the shown embodiment, a layered coating may be observed. It is, however, possible that the water barrier agent 10a and the coating 10b blend or to some degree.

Figure 12:
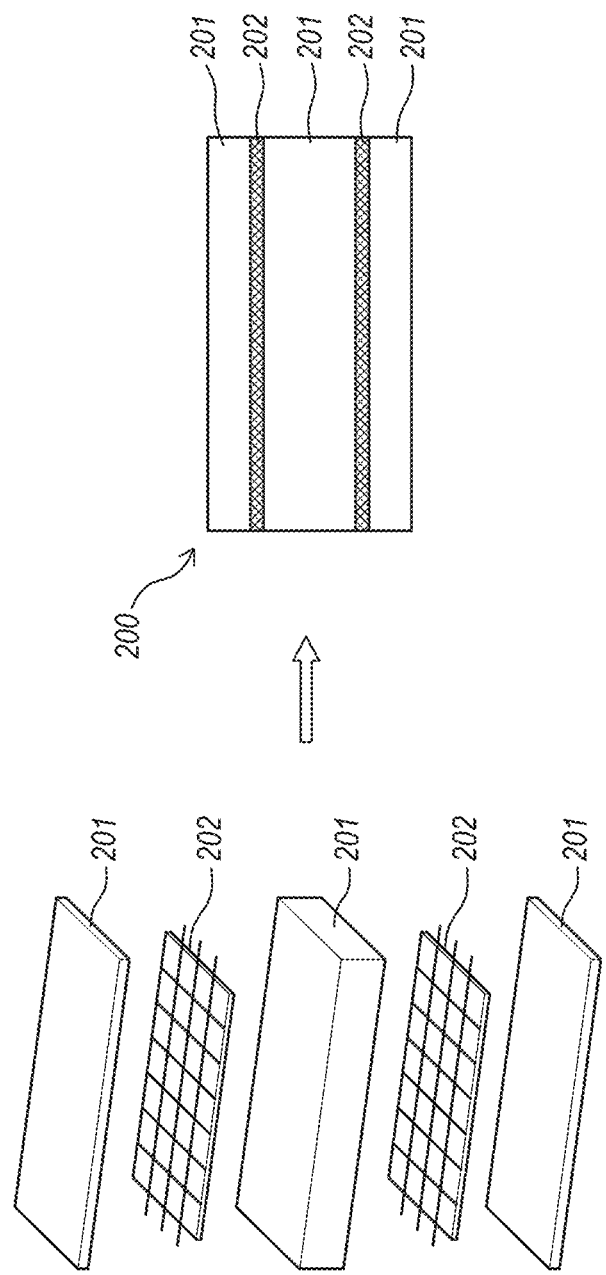
FIG. 12 schematically shows an embodiment of the composition of the substrate of a floor board according to the invention.

FIG. 12 schematically shows an embodiment of the composition of the substrate 200 of a floor board according to the invention. In the shown embodiment, the substrate 200 comprises a plurality of substrate layers 201. The substrate layers 201 preferably comprise HDF material and/or MDF material and/or wood material. In the shown embodiment, the substrate 200 comprises three substrate layers 201. Preferably, at least between two adjacent substrate layers 201 an intermediate layer 202 is provided. The shown embodiment comprises an intermediate layer 201 between each adjacent substrate layer. Preferably, the intermediate layer 202 is a reinforcement layer. The reinforcement layer 202 may be adhered to the substrate layers 201 by means of gluing. The shown reinforcement layer 202 is a mesh or has a net-like structure to allow an adhesive to penetrate through the open structures of the reinforcement layer 202. The reinforcement layer is configured to strengthen the substrate and may prevent that the substrate will deform upon moisture absorption in an upward direction and/or downward direction.

Figures 13A, 13B:
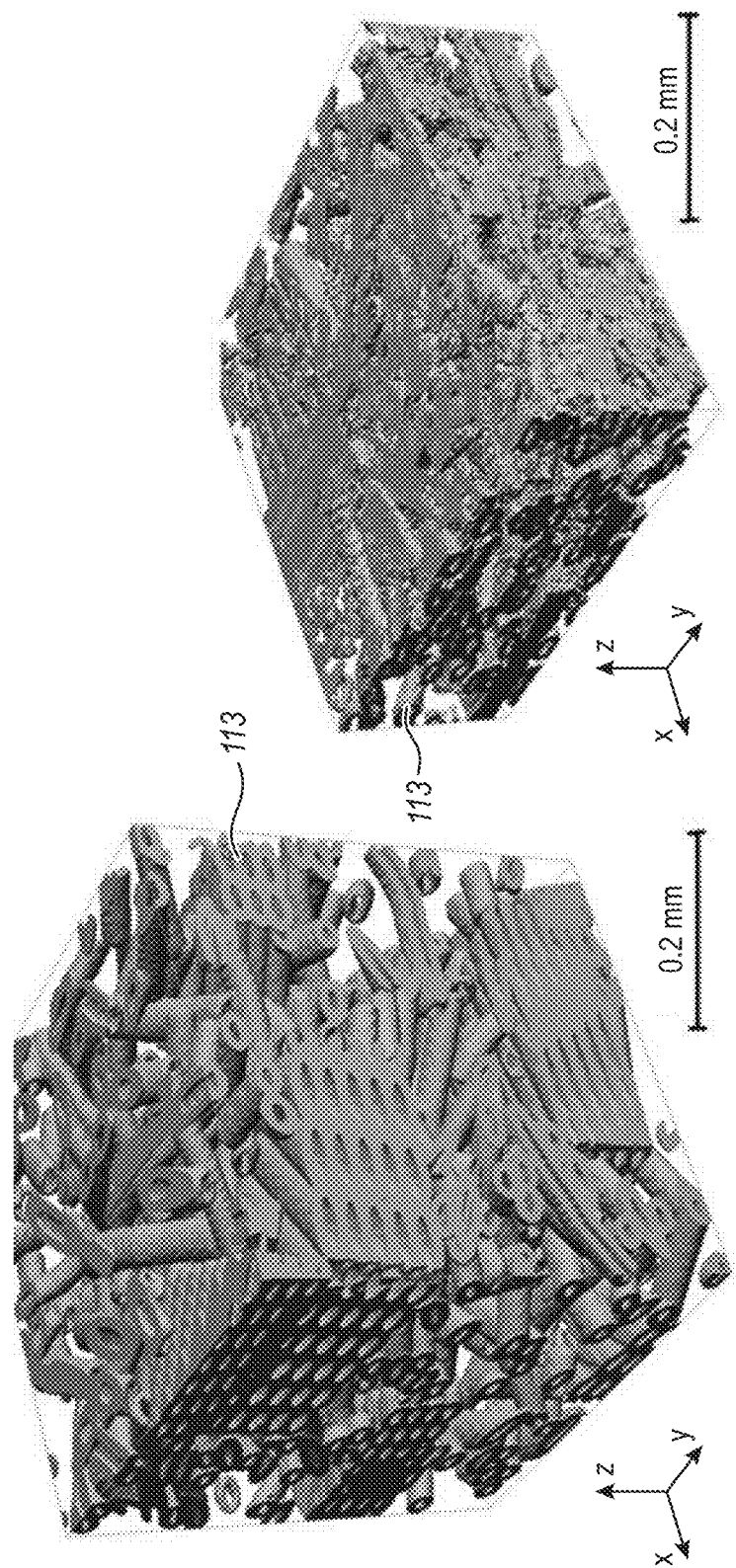
FIGS. 13a and 13b schematically show an enlarged view of the side edges of the substrate material of a floor board according to the invention.

FIG. 13a and FIG. 13b schematically show an enlarged detailed view of a wood fiber composition of a slab of MDF or HDF material in FIG. 13a and of a compressed slab of MDF or HDF material in FIG. 13b. A slab of MDF or HDF material can be formed by a well-known production process, comprising wood fibers 113 in a matrix of glue and/or wax and/or resin and/or air. The slab of MDF or HDF material may be pressed by a pressure element, such as pressure roles, and subsequently be cut or sawn into separate oblong panels or boards. After pressing the slab a substrate of a floor board according to the invention may be retrieved. As can be observed, the compressed slab or substrate (FIG. 13b) is compressed compared to the slab (FIG. 13a). Hence, the slab is larger in height direction or vertical (z-direction) compared to the substrate. Optionally, after applying more pressure on a portion of (compressed) slab or the substrate, a bevel may be formed comprising a further compressed portion. The bevel may be smaller in height direction or vertical direction (z-direction) than the slab (FIG. 13a) and the substrate (FIG. 13b). The slab and the substrate comprise wood fibers 113 in between which air and/or wax and/or resin may be present. In the shown embodiment, a majority of the wood fibers 113 are oriented (aligned). This can for example be realized by applying an electric field during manufacturing of the substrate and/or by physical manipulation during manufacturing of the substrate. As can be observed, the wood fibers 113 are mainly horizontal, in-plane orientated (x,y-plane) or orientated in a longitudinal direction of the slab or substrate. Optionally, at least a part of the wood fibers 113 are aligned along the x-direction and/or along the y-direction. A fraction of the wood fibers 113 may extend in a vertical (z) direction or in a transversal direction of the slab or substrate. Upon exposure to water or moisture, the wood fibers 113 may swell in a transversal direction or z-direction rather than in a longitudinal direction or x, y-direction. Preferably, coupling parts of a long side of a substantially oblong substrate (and oblong floor board) are running in a direction perpendicular to the orientation of the majority of the wood fibers 113. In the shown figures, the coupling parts of the long side of the oblong substrate are preferably provided in the y,z-plane. The coupling parts of a short side of the substantially oblong substrate (and oblong floor board) are preferably running in a direction parallel to the orientation of the majority of wood fibers 113. In the shown figures, the coupling parts of the short side of the oblong substrate are therefore preferably provided in the x,z-plane.

Figure 14:
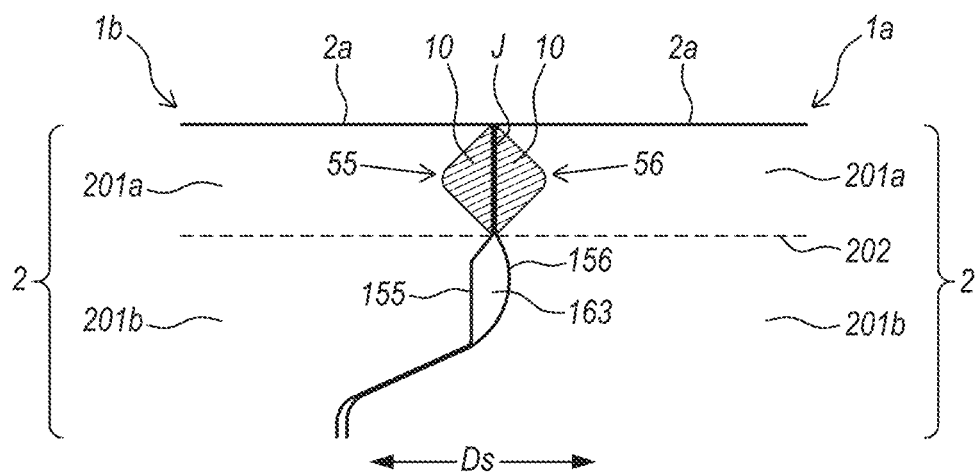
FIG. 14 schematically shows an enlarged view of the rectangle of FIG. 3.

FIG. 14 schematically shows an enlarged cross-sectional view of an upper section of coupled floor boards 1a, 1b. In the shown embodiment a top side surface 56 of a first coupling part is at least partially treated with at least one water barrier agent 10. The side surface 55 of an upper lip of a second coupling part is at least partially treated with at least one water barrier agent 10. It is imaginable that the (top) side surfaces 56, 55 have a slightly different shape. For example, the (top) side surfaces 56, 55 may be upwardly inclined. Optionally, above the (top) side surfaces 55, 56 the substrate is provided with a bevel or a chamfer. In the shown embodiment, the penetration profile of the water barrier agent 10 is at least partially parabolically shaped. It is imaginable that a portion below the (top) side surfaces 55, 56 of the substrate are free from a water barrier agent 10. It is imaginable that the substrate 2 comprises substrate layers, wherein a lower substrate layer 201b is located below a top substrate layer 201a. The lower substrate layer 201b of the shown embodiment is substantially free from a water barrier agent 10 and/or is not treated by a water barrier agent. Preferably, a reinforcement layer 202 or an intermediate layer is provided between the substrate layers 201a, 201b. If water or another fluid or liquid seeps through the seam or the joint J formed in between adjacently installed, preferably interconnected, floor boards 1a, 1b and would come in contact with a substrate layer 201b, the respective side edges 155, 156 may swell. In that case, the side edges 155, 156 may swell. When at least one reinforcement layer is positioned between the substrate layers 201a, 201b, in particular above the lower substrate layer 201b, the swelling of the wood fibers and subsequently the substrate 2 will predominantly occur in a swelling direction Ds, being in an in-plane direction or board plane direction. In the shown embodiment, the swelling direction Ds, which is parallel to the board plane direction and the in-plane direction, of the lower substrate layer 201b occurs in a substantially horizontal direction. Preferably, below the joint J a space 163 is present allowing at least a part of the substrate 2, in particular at least a part of the lower substrate layer 201b, to expand or swell along the swelling direction Ds or along the in-plane or board plane direction. Over time water or fluid or liquid may evaporate causing the respective side edges 155, 156 to shrink back to their original configuration. This in-plane swelling causes reduces the distance between the side edges 155, 156. Resulting in a further closing and optionally even sealing the adjacent floor boards 1a, 1b further. This may result in the creation of an additional water barrier in between said floor boards. Hence, by applying at least one reinforcement layer, the swelling direction of the lower substrate layer(s) can be controlled to some extent and normally to sufficient extent.

Figure 15:
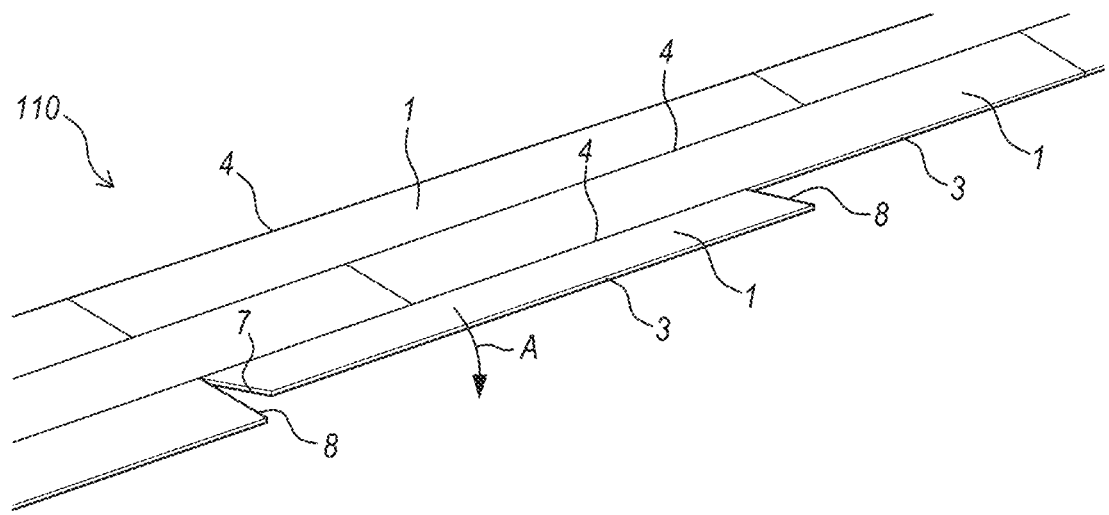
FIG. 15 schematically shows a floor board covering according to the invention. Within these figures, similar reference numbers correspond to similar or equivalent elements or features.

FIG. 15 schematically shows a floor covering 110 comprising a plurality of interconnected floor boards 1. The shown floor boards 1 comprise a first pair of opposite edges 3, 4 and a second pair of opposite edges 7, 8. The floor boards 1 are interconnected to form a floor covering 110. The first side edge 3 may be coupled with the second side edge 4 of another floor board 1 and the third side edge 7 may be coupled with the fourth side edge 8 of another floor board 1. The first side edge 3 and the second side edge 4 may be defined by the side edges provided on the long side of the oblong floor board 1. Preferably, the first side edge 3 and second side edge 4 are coupled by means of an angling down movement A or a rotational movement. The third side edge 7 and the second side edge 8 may be defined by the side edges provided on the short side of the oblong floor board 1. The third side edge 7 and the fourth side edge 8 are preferably coupled or interconnected by means of a lowering movement or horizontal shifting movement. The floor boards 1 become locked both in a vertical direction perpendicular to the board plane defined by intercoupled floor boards, as well as in the horizontal direction parallel to the board plane.

The verb "comprise" and conjugations thereof used in this patent publication are understood to mean not only "comprise", but are also understood to mean the phrases "contain", "substantially consist of", "formed by" and conjugations thereof.

The ordinal numbers used in this document, like "first", "second", "third" and "fourth", are used only for identification purposes. Hence, the use of the expression "third coupling part" does therefore not necessarily require the co-presence of a "first coupling part". And likewise, the use of the expressions "third locking element" and "second locking element" does therefore not necessarily require the co-presence of a "first locking element". By "horizontal", it is meant as a direction which extends parallel to a plane defined by the floor board, and which may intersect a substrate of the floor board. By "vertical", it is meant as a direction which is perpendicular to said plane defined by the floor board. By "complementary" coupling parts, it is meant that these coupling parts of adjacent floor boards can cooperate with each other. However, to this end, the complementary coupling parts do not necessarily have to have fully complementary forms (inverted designs). By "proximal side", it is meant a side which is positioned closest to a body of the floor board, while by "distal side", it is meant as a side which is positioned farther from a body of the floor board than said proximal side. The proximal side may face said floor board body, while the distal side may face away from said floor board body.

The verb "comprise" and conjugations thereof used in this patent publication are understood to mean not only "comprise", but are also understood to mean the phrases "contain", "substantially consist of", "formed by" and conjugations thereof.

The invention claimed is:

1. A floor board, comprising:
a substrate having side edges and a decorative surface layer applied to said substrate, and
at least one side edge together with a side edge opposite thereto forming a first pair of opposite side edges of said substrate, wherein said first pair of opposite side edges comprises mechanical first and second coupling parts, respectively, allowing said floor board to couple at the respective side edges with a similar floor board by means of an angling down motion such that, in a coupled condition, said floor board and the similar floor board become locked as intercoupled floor boards both in a vertical direction perpendicular to a board plane defined by the intercoupled floor boards, as well as in a horizontal direction parallel to said board plane,
wherein said first coupling part comprises a sideward tongue,
wherein said second coupling part comprises a recess for accommodating at least a part of the sideward tongue of a further floor board, said recess being defined by an upper lip and a lower lip, wherein the lower lip extends beyond the upper lip, and
wherein the decorative surface layer is substantially rigid, wherein a thickness of the decorative surface layer is at least 4 mm, and wherein a height of a side surface of the upper lip and/or a height of the upper lip at a distal end is either smaller than 1 mm and/or less than 20% of a thickness of the substrate.

2. The floor board according to claim 1, wherein the decorative surface layer is at least partially made of at least one material chosen from a group consisting of: ceramic, stone, concrete, mineral porcelain, glass, mosaic, granite, limestone, marble, linoleum, and carpet.

3. The floor board according to claim 1, wherein the thickness of the decorative surface layer is at least the thickness of the substrate.

4. The floor board according to claim 1, wherein the decorative surface layer partially covers a top surface of the substrate, wherein at least one uncovered portion of the top surface of the substrate is configured to form a grout line and/or wherein, in a coupled condition of adjacent floor boards, adjacent decorative surface layers are positioned at a distance from each other to form one or more grout lines.

5. The floor board according to claim 1, wherein said sideward tongue comprises a front section, a rear section, and a middle section situated in between said front section and said rear section,
wherein a bottom surface and/or a side surface of said front section of said sideward tongue is at least partially curved, wherein said bottom surface of said front section defines a front downward tongue contact portion,
wherein a top surface of the front section of said sideward tongue is at least partially inclined downwardly in a direction away from the middle section and rear section, wherein said top surface of said front section defines a front upward tongue contact portion,
wherein a bottom surface of said middle section of said sideward tongue defines a middle lower contact portion situated in between adjacent inactive portions of the middle section of the sideward tongue,
wherein a bottom surface and/or a side surface of said rear section of said sideward tongue is at least partially upwardly inclined in a direction away from the middle section and front section, wherein said inclined part of said bottom surface and/or said side surface of said rear section defines a rear downward tongue contact portion,
wherein said rear section is configured to accommodate an upwardly protruding locking element of a second coupling part of a further floor board,
and wherein said lower lip comprises a front section, a rear section, and a middle section situated in between said front section and said rear section, wherein said upper lip is located above and connects to the front section of the lower lip, and wherein the lower lip being provided with a upwardly protruding locking element being located in the rear section of the lower lip, wherein a bottom surface and/or a side surface of said front section of said lower lip is at least partially curved, wherein said bottom surface of said front section of said lower lip defines a front upward lip contact portion, wherein a bottom surface of the upper lip is at least partially inclined downwardly in a direction away from the middle section and rear section of the lower lip, wherein said bottom surface of said front section defines a front downward lip contact portion, wherein a top surface of said middle section of said lower lip defines a middle upward lip contact portion situated in between adjacent inactive portions of the middle section of the lower lip, wherein a top surface and/or a side surface of said rear section of said lower lip is at least partially upwardly inclined in a direction away from the middle section and front section of said lower lip, wherein said inclined part of said top surface and/or said side surface of said rear section defines a rear upward lip contact portion, and wherein said top surface and/or said side surface of said rear section of said lower lip partially defines said upwardly protruding locking element, wherein, in coupled condition of adjacent floor boards, the sideward tongue and lower lip define at least three mutually spaced lower contact zones, wherein:

a front lower contact zone is defined by the co-action between the front downward tongue contact portion of said floor board and the front upward lip contact portion of another floor board, a middle lower contact zone is defined by the co-action between the middle downward tongue contact portion of said floor board and the middle upward lip contact portion of another floor board, and a rear lower contact zone is defined by the co-action between the rear downward tongue contact portion of said floor board and the rear upward lip contact portion of another floor board, and wherein, in coupled condition of adjacent floor boards, the sideward tongue and upper lip define at least two mutually spaced upper contact zones, wherein:

a first upper contact zone is defined by the co-action between the front upward tongue contact portion of said floor board and the front downward lip contact portion of another floor board, second upper contact zone is defined by the co-action of a top side surface of the first coupling part of said floor board, and a side surface of the upper lip, located above the front downward lip contact portion, of another floor board.

6. The floor board according to claim 5, wherein a height level of the middle lower contact zone is positioned in between a lower height level of the front lower contact zone and a higher height level of the rear lower contact zone.

7. The floor board according to claim 5, wherein both the middle upward lip contact portion and the middle downward tongue contact portion are planar and together define a planar middle lower contact zone.

8. The floor board according to claim 5, wherein the middle lower contact zone is larger than the front contact zone and/or wherein the middle lower contact zone is smaller than the rear contact zone and/or wherein the front lower contact zone is smaller than the rear contact zone.

9. The floor board according to claim 5, wherein the height of the front lower contact zone is smaller than the height of the rear lower contact zone.

10. The floor board according to claim 5, wherein the width of each of the inactive portions of the middle section of the lower lip is larger than the width of the middle upward lip contact portion.

11. The floor board according to claim 5, wherein the inactive portion of the middle section of the lower lip, which is positioned in between the front upward lip contact portion and the middle upward lip contact portion, is a kinked inactive portion, and/or comprises at least one concavely shaped portion, and/or wherein the inactive portion of the middle section of the lower lip, which is positioned in between the middle upward lip contact portion and the rear upward lip contact portion, is a kinked inactive portion, and/or comprises at least one concavely shaped portion, and/or wherein the inactive portion of the middle section of the sideward tongue, positioned in between the front downward tongue contact portion and the middle downward tongue contact portion, is a kinked inactive portion and/or comprises at least one concavely shaped portion and/or wherein the inactive portion of the middle section of the sideward tongue, positioned in between the middle downward tongue contact portion and the rear downward tongue contact portion, is a kinked inactive portion and/or comprises at least one concavely shaped portion.

12. The floor board according to claim 5, wherein the inactive portion of the middle section of the lower lip, which is positioned in between the front upward lip contact portion and the middle upward lip contact portion, is configured to enclose an front middle gap with the inactive portion of the middle section of the sideward tongue positioned in between the front downward tongue contact portion and the middle downward tongue contact portion and wherein the inactive portion of the middle section of the lower lip, which is positioned in between the middle upward lip contact portion and the rear upward lip contact portion, is configured to enclose an middle rear gap with the inactive portion of the middle section of the sideward tongue positioned in between the middle downward tongue contact portion and the rear downward tongue contact portion.

13. The floor board according to claim 5, wherein the side surface of the lower lip connecting to the upper lip comprises at least one inactive portion, such that, in coupled condition of adjacent floor boards, at least one lower front gap is formed in between the sideward tongue and said inactive portion of the lower lip and/or wherein the side surface of the upper lip comprises at least one inactive portion, such that, in coupled condition of adjacent floor boards, at least one upper front gap is formed in between the sideward tongue and said inactive portion of the upper lip.

14. The floor board according to claim 5, wherein the top side surface of the first coupling part of said floor board, and the side surface of the upper lip, located above the front downward lip contact portion are configured to mutually enclose a tapered space which narrows in upward direction, which tapered space results in the second upper contact zone being positioned at the upper surface of the substrate.

15. The floor board according to claim 5, wherein the floor board is configured, to have the upwardly protruding locking element to exert a horizontal force to sideward tongue of another floor board, in coupled condition of adjacent floor boards, causing the second upper contact zone to become actively closed and/or causing the top side surface of the first coupling part to exert a horizontal force onto the side surface of the upper lip.

16. The floor board according to claim 5, wherein, at the rear lower contact zone, both the rear downward tongue contact portion and the rear upward lip contact portion are inclined, wherein an inclination angle between the board plane and each of the rear downward tongue contact portion and the rear upward lip contact portion is situated between and including 45 and 60 degrees.

17. The floor board according to claim 5, wherein the side surface of the upper lip comprises a substantially vertical top section and a bottom section positioned beneath said top section, wherein at least a part of said top section is configured to co-act with the top side surface of the first coupling part to define the second upper contact zone, wherein said bottom section of said side surface is positioned inwardly with respect to said top section of said side surface.

18. The floor board according to claim 5, wherein an upper side of the second upper contact zone defines a point of rotation during coupling of the floor boards, wherein the maximum rotation angle during coupling is determined by the thickness of the decorative surface layer and is situated between 3 and 10 degrees.

19. The floor board according to claim 1, wherein the substrate comprises a second pair of opposite side edges, wherein said second pair of opposite side edges also comprises first and second coupling parts, respectively or wherein the substrate comprises a second pair of opposite side edges, wherein said second pair of opposite side edges also comprises third and fourth coupling parts, respectively, allowing to couple said floor board at the respective side edges with a similar floor board by means of a lowering movement or horizontal shifting movement such that, in a coupled condition, said floor board and a further floor board become locked both in a vertical direction perpendicular to a board plane defined by the intercoupled floor boards, as well as in a horizontal direction parallel to said board plane and/or wherein one of the third and fourth coupling part is identical to the second coupling part.

20. The floor board according to claim 1, wherein said substrate comprises MDF and/or HDF material and/or wood material.

21. The floor board according to claim 1, wherein at least one side edge of the substrate is treated with at least one water barrier agent.

22. The floor board according to claim 1, wherein at least one side edge of the substrate is provided with both at least one first reactant and at least one second reactant, wherein the first reactant and second reactant are configured to react with each other upon contact with each other to consequently form a water barrier agent onto and/or into said at least one said edge.

23. A floor board covering consisting of a plurality of floor boards according to claim 1.

* * * * *